(12) United States Patent
Sasson et al.

(10) Patent No.: US 8,884,757 B2
(45) Date of Patent: Nov. 11, 2014

(54) ANTI-TAMPERING PROTECTION ASSEMBLY

(75) Inventors: Efi Sasson, Kfar Tavor (IL); Yuval Ben-Zion, Shoam (IL); Ofer Itshakey, Tel Aviv (IL)

(73) Assignee: Verifone, Inc., San Jose, CA (US)

( * ) Notice: Subject to any disclaimer, the term of this patent is extended or adjusted under 35 U.S.C. 154(b) by 524 days.

(21) Appl. No.: 13/180,123

(22) Filed: Jul. 11, 2011

(65) Prior Publication Data

US 2013/0015972 A1    Jan. 17, 2013

(51) Int. Cl.
    *G08B 21/00*      (2006.01)
    *G06F 21/86*      (2013.01)

(52) U.S. Cl.
    CPC ........................................ *G06F 21/86* (2013.01)
    USPC ....... 340/540; 340/5.7; 340/521; 340/539.31; 340/546; 340/547; 340/551; 340/568.1; 340/571; 340/679; 340/686.1; 340/687

(58) Field of Classification Search
None
See application file for complete search history.

(56) References Cited

U.S. PATENT DOCUMENTS

| | | |
|---|---|---|
| 3,466,643 A | 9/1969 | Moorefield |
| 3,735,353 A | 5/1973 | Donovan et al. |
| 3,772,674 A | 11/1973 | Jackson |
| 3,818,330 A | 6/1974 | Hiroshima et al. |
| 4,254,410 A | 3/1981 | Virkus |
| 4,486,637 A | 12/1984 | Chu |
| 4,527,030 A | 7/1985 | Oelsch |
| 4,593,384 A | 6/1986 | Kleijne |
| 4,749,368 A | 6/1988 | Mouissie |
| 4,807,284 A | 2/1989 | Kleijne |
| 4,847,595 A | 7/1989 | Okamoto |
| 4,937,851 A | 6/1990 | Lynch et al. |
| 5,086,292 A | 2/1992 | Johnson et al. |
| 5,117,222 A | 5/1992 | McCurdy et al. |
| 5,117,457 A | 5/1992 | Comerford |
| 5,175,443 A | 12/1992 | Tabuchi |
| 5,237,307 A | 8/1993 | Gritton |
| 5,239,664 A | 8/1993 | Verrier et al. |
| 5,298,884 A | 3/1994 | Gilmore |
| 5,353,350 A | 10/1994 | Unsworth et al. |
| 5,506,566 A | 4/1996 | Oldfield et al. |
| 5,559,311 A | 9/1996 | Gorbatoff |
| 5,586,042 A | 12/1996 | Pisau et al. |
| 5,627,520 A | 5/1997 | Grubbs et al. |

(Continued)

FOREIGN PATENT DOCUMENTS

| | | |
|---|---|---|
| DE | 601 01 096 T2 | 7/2004 |
| EP | 0 375 545 A1 | 6/1990 |

(Continued)

OTHER PUBLICATIONS

An International Preliminary Report on Patentability dated Jul. 19, 2011 which issued during the prosecution of Applicant's PCT/IL2009/000724.

(Continued)

*Primary Examiner* — Curtis King
(74) *Attorney, Agent, or Firm* — Sughrue Mion, PLLC

(57) ABSTRACT

An anti-tampering protection assembly for sensing tampering with at least one conductor, the anti-tampering protection assembly including unpredictably varying signal generating circuitry, connected to the at least one conductor, for providing unpredictably varying signals on the at least conductor and tampering sensing circuitry for sensing tampering with the at least one conductor.

52 Claims, 56 Drawing Sheets

(56) References Cited

U.S. PATENT DOCUMENTS

| | | | |
|---|---|---|---|
| 5,675,319 A | 10/1997 | Rivenberg et al. | |
| 5,861,662 A | 1/1999 | Candelore | |
| 5,877,547 A | 3/1999 | Rhelimi | |
| 5,998,858 A | 12/1999 | Little et al. | |
| 6,288,640 B1 | 9/2001 | Gagnon | |
| 6,355,316 B1 | 3/2002 | Miller | |
| 6,359,338 B1 | 3/2002 | Takabayashi | |
| 6,396,400 B1 | 5/2002 | Epstein, III et al. | |
| 6,414,884 B1 | 7/2002 | DeFelice et al. | |
| 6,438,825 B1 | 8/2002 | Kuhn | |
| 6,463,263 B1 | 10/2002 | Feilner et al. | |
| 6,466,118 B1 | 10/2002 | Van Zeeland et al. | |
| 6,563,488 B1 | 5/2003 | Rogers et al. | |
| 6,646,565 B1 | 11/2003 | Fu et al. | |
| 6,669,100 B1 | 12/2003 | Rogers et al. | |
| 6,710,269 B2 | 3/2004 | Kunigkeit | |
| 6,830,182 B2 | 12/2004 | Izuyama | |
| 6,853,093 B2 | 2/2005 | Cohen et al. | |
| 6,874,092 B1 | 3/2005 | Motoyama et al. | |
| 6,912,280 B2 | 6/2005 | Henry | |
| 6,917,299 B2 | 7/2005 | Fu et al. | |
| 6,921,988 B2 | 7/2005 | Moree | |
| 6,936,777 B1 | 8/2005 | Kawakubo | |
| 6,995,353 B2 | 2/2006 | Beinhocker | |
| 7,065,656 B2 | 6/2006 | Schwenck et al. | |
| 7,170,409 B2 | 1/2007 | Ehresvard et al. | |
| 7,270,275 B1 | 9/2007 | Moreland et al. | |
| 7,283,066 B2 | 10/2007 | Shipman | |
| 7,351,919 B1* | 4/2008 | Knoke et al. | 174/382 |
| 7,403,115 B2 | 7/2008 | Yuzik | |
| 7,675,413 B2 | 3/2010 | Watts et al. | |
| 7,723,998 B2 | 5/2010 | Doi | |
| 7,832,628 B2 | 11/2010 | Mittler | |
| 7,843,339 B2 | 11/2010 | Kirmayer | |
| 7,859,406 B2 | 12/2010 | Fosty et al. | |
| 7,898,413 B2 | 3/2011 | Hsu et al. | |
| 2003/0009683 A1* | 1/2003 | Schwenck et al. | 713/194 |
| 2004/0031673 A1 | 2/2004 | Levy | |
| 2004/0118670 A1 | 6/2004 | Park et al. | |
| 2004/0120101 A1* | 6/2004 | Cohen et al. | 361/654 |
| 2005/0081049 A1 | 4/2005 | Nakayama et al. | |
| 2005/0184870 A1 | 8/2005 | Galperin et al. | |
| 2006/0049255 A1 | 3/2006 | Von Mueller et al. | |
| 2006/0049256 A1 | 3/2006 | Von Mueller et al. | |
| 2006/0066456 A1 | 3/2006 | Jonker et al. | |
| 2006/0192653 A1 | 8/2006 | Atkinson et al. | |
| 2007/0040674 A1 | 2/2007 | Hsu | |
| 2007/0102272 A1 | 5/2007 | Sano et al. | |
| 2007/0152042 A1 | 7/2007 | Mittler | |
| 2007/0204173 A1 | 8/2007 | Kuhn | |
| 2007/0273522 A1* | 11/2007 | Dembo et al. | 340/572.1 |
| 2008/0135617 A1 | 6/2008 | Aviv | |
| 2008/0180245 A1* | 7/2008 | Hsu et al. | 340/571 |
| 2008/0278353 A1 | 11/2008 | Smith et al. | |
| 2009/0109633 A1* | 4/2009 | Rajala et al. | 361/726 |
| 2010/0072989 A1* | 3/2010 | Graff | 324/207.25 |
| 2010/0181999 A1* | 7/2010 | Sudai et al. | 324/239 |
| 2011/0022771 A1 | 1/2011 | Foerster | |
| 2011/0063109 A1 | 3/2011 | Ostermoller | |
| 2011/0122563 A1* | 5/2011 | Hsu et al. | 361/679.31 |
| 2011/0215938 A1 | 9/2011 | Neo et al. | |
| 2011/0248860 A1 | 10/2011 | Avital et al. | |
| 2011/0279279 A1* | 11/2011 | Mirkazemi-Moud et al. | 340/635 |
| 2012/0106113 A1 | 5/2012 | Kirmayer et al. | |
| 2012/0180140 A1 | 7/2012 | Barrowman | |

FOREIGN PATENT DOCUMENTS

| | | |
|---|---|---|
| EP | 0558222 | 8/1999 |
| EP | 1421549 | 5/2004 |
| EP | 1 432 031 A1 | 6/2004 |
| EP | 03257680 | 6/2004 |
| EP | 1589405 | 10/2005 |
| FR | 2911000 | 7/2008 |
| GB | 892198 | 3/1962 |
| GB | 1 369 739 | 10/1974 |
| GB | 8608277 | 5/1986 |
| GB | 2372363 | 8/2002 |
| JP | 2002108711 | 4/2002 |
| JP | 2003100169 | 4/2003 |
| WO | 89/00318 | 1/1989 |
| WO | WO 01/63994 A2 | 8/2001 |
| WO | 2005/086546 | 9/2005 |
| WO | 2009/091394 | 7/2009 |

OTHER PUBLICATIONS

A Notice of Allowance dated Sep. 10, 2010, which issued during the prosecution of Applicant's U.S. Appl. No. 11/845,435.

Van Ess, Dave; "Capacitive touch switches for automotive applications", http://www.automotivedesignline.com/, Feb. 2006.

Victor Kremin, et al., "Capacitive sensing—waterproof capacitance sensing", Cypress Perform, Dec. 2006.

An Office Action dated Apr. 10, 2012, which issued during the prosecution of U.S. Appl. No. 12/758,150.

An International Search Report and a Written Opinion both dated Apr. 30, 2012, which issued during the prosecution of Applicant's PCT/US2012/020142.

An Office Action dated Aug. 10, 2012, which issued during the prosecution of U.S. Appl. No. 12/848,471.

An International Search Report and a Written Opinion both dated Oct. 23, 2012, which issued during the prosecution of Applicant's PCT/IL12/00275.

An Office Action dated Oct. 26, 2012, which issued during the prosecution of U.S. Appl. No. 12/985,898.

Notice of Allowability dated Oct. 26, 2004, which issued during the prosecution of U.S. Appl. No. 10/326,726.

Office Action dated May 28, 2004, which issued during the prosecution of U.S. Appl. No. 10/326,726.

* cited by examiner

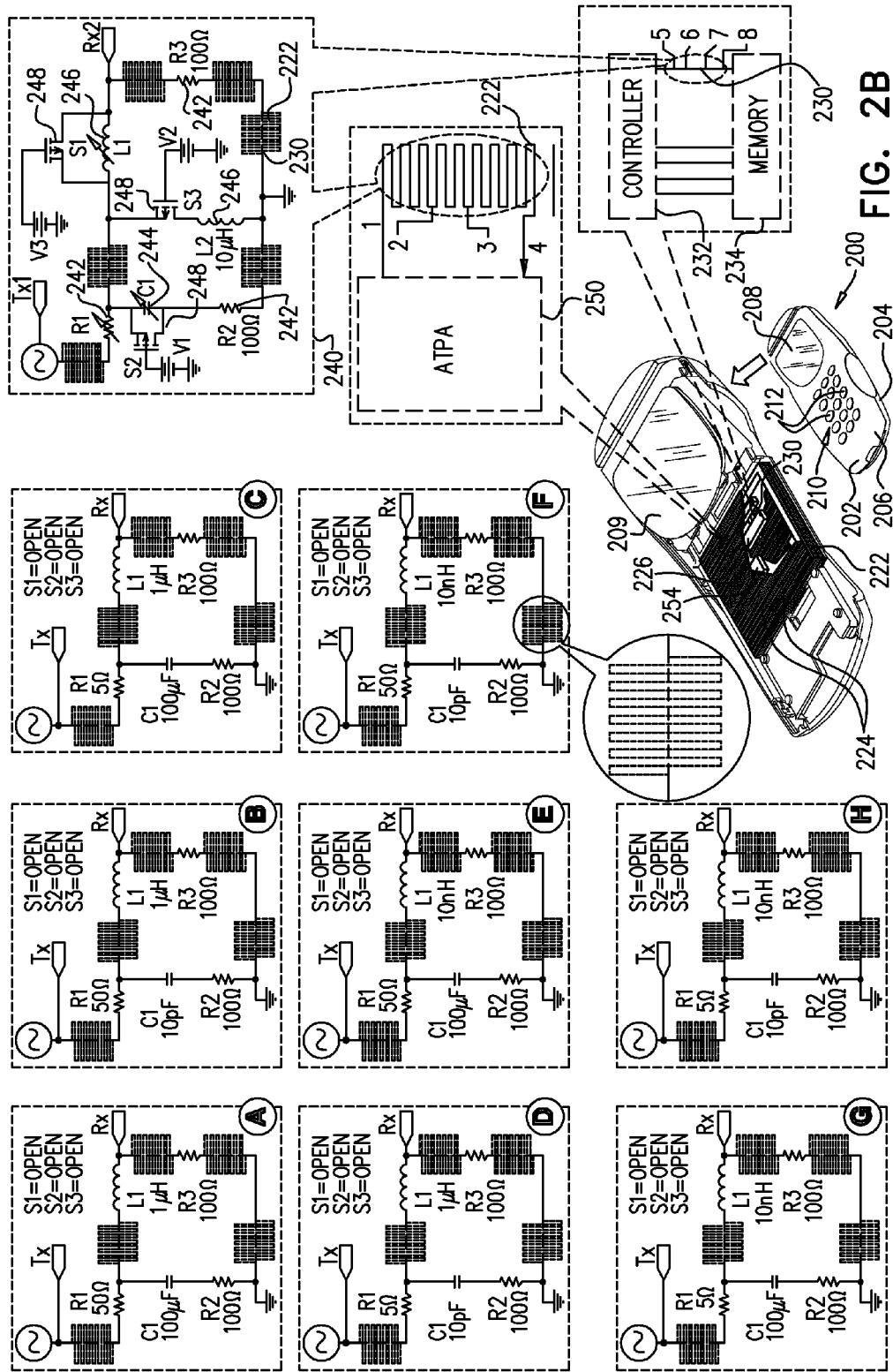

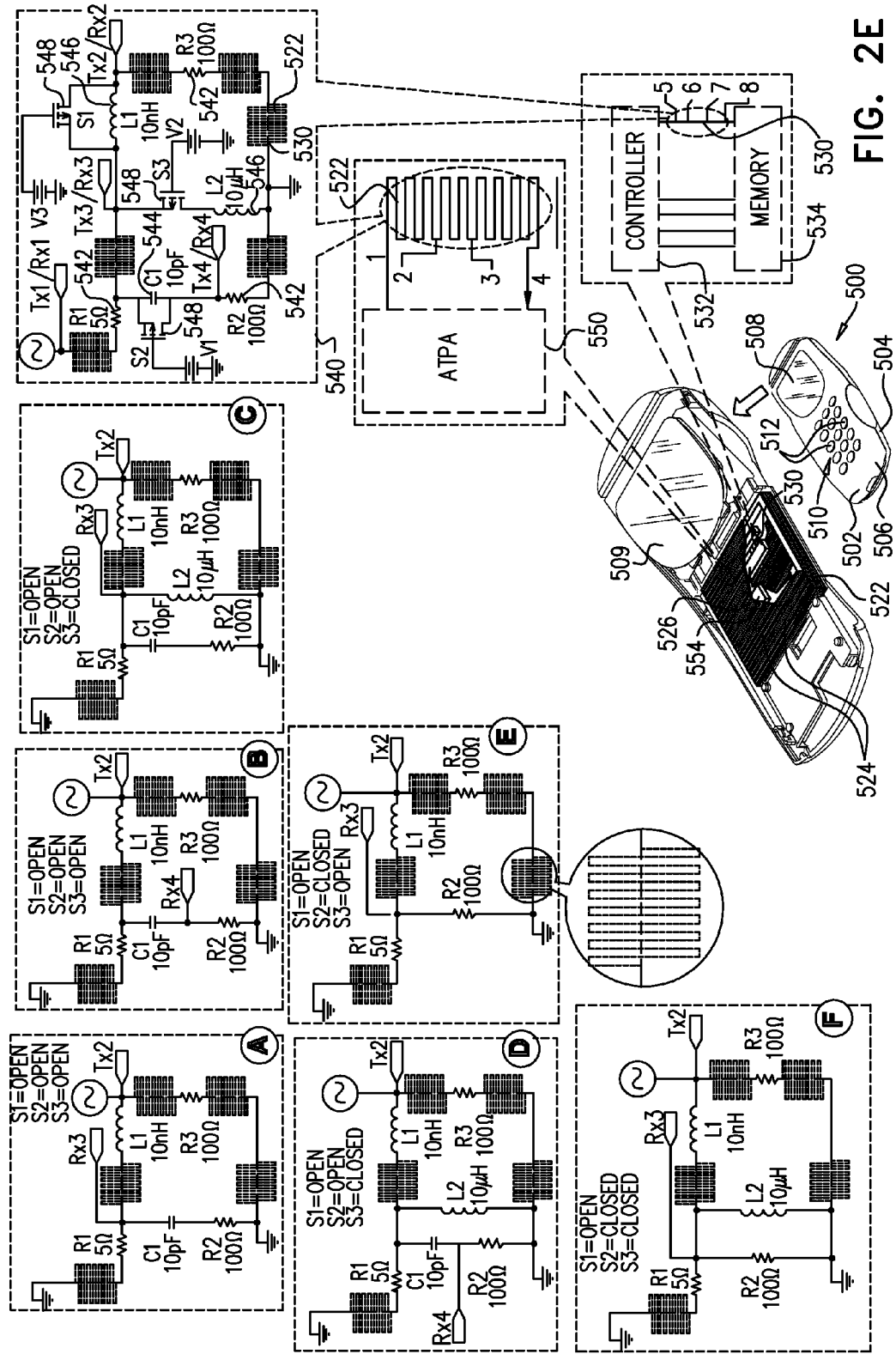

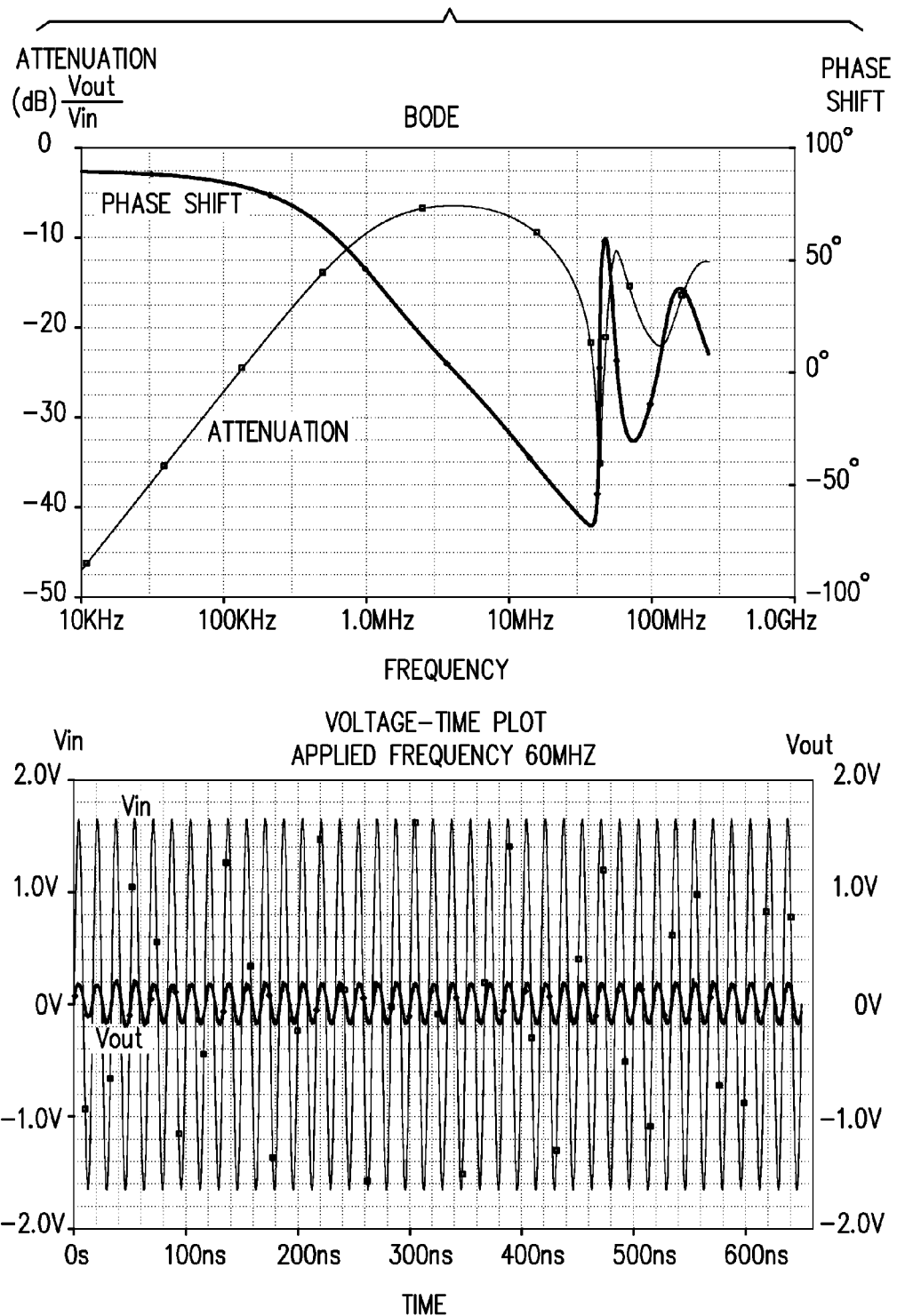

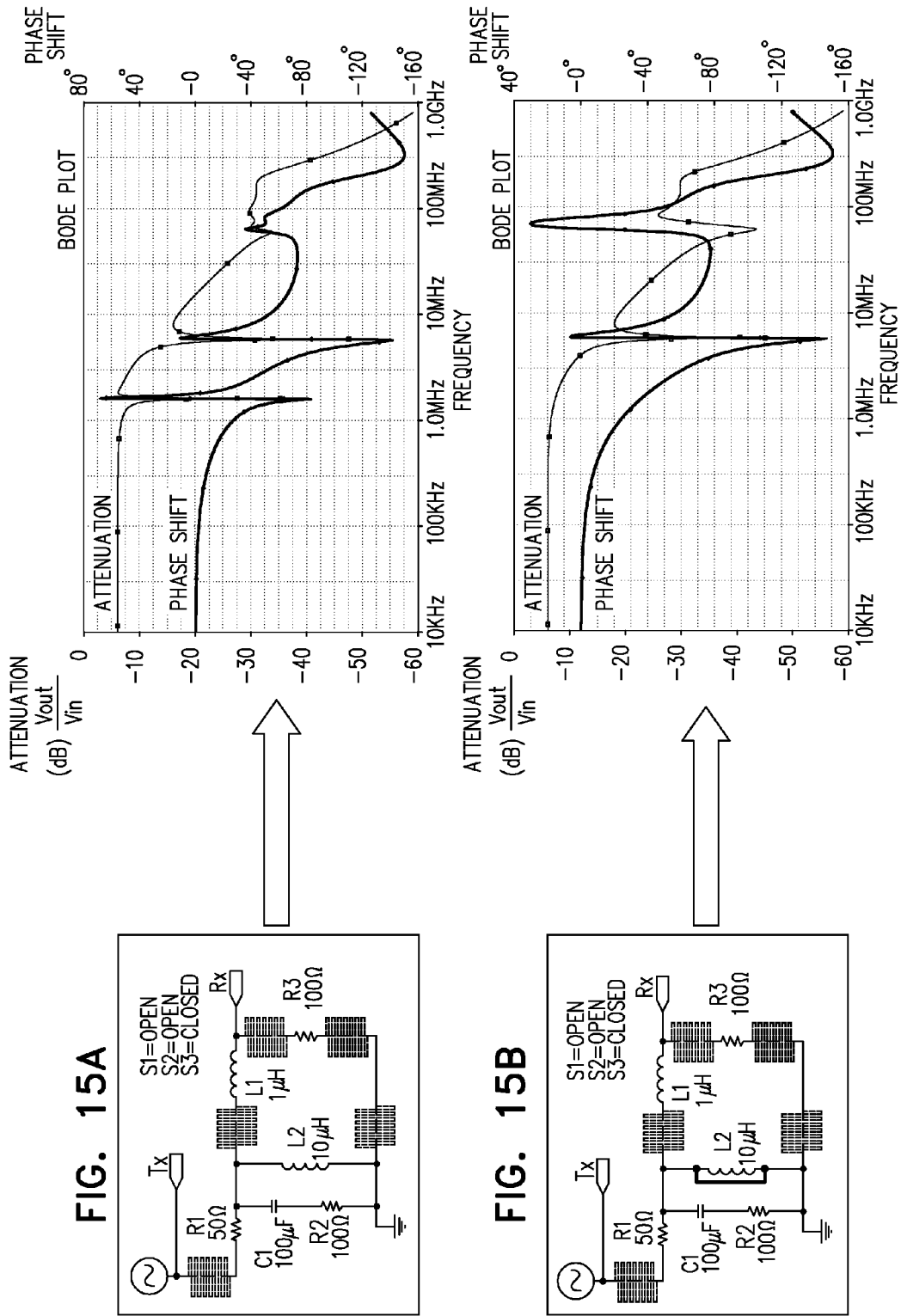

ANTI-TAMPERING PROTECTION ASSEMBLY

FIELD OF THE INVENTION

The present invention relates to tamper protection of objects, such as circuits containing sensitive data, and galvanic data links.

BACKGROUND OF THE INVENTION

The following patent publications are believed to represent the current state of the art:
U.S. Pat. Nos. 7,898,413; 6,853,093 and 6,646,565.

SUMMARY OF THE INVENTION

The present invention seeks to provide improved apparatus and methodologies for tamper protection of objects, such as circuits containing sensitive data, and galvanic data links.

There is thus provided in accordance with a preferred embodiment of the present invention an anti-tampering protection assembly for sensing tampering with at least one conductor, the anti-tampering protection assembly including unpredictably varying signal generating circuitry, connected to the at least one conductor, for providing unpredictably varying signals on the at least conductor and tampering sensing circuitry for sensing tampering with the at least one conductor.

Preferably, the unpredictably varying signal generating circuitry applies the unpredictably varying signals at various locations along the at least one conductor. In a preferred embodiment of the present invention the unpredictably varying signals include analog signals.

In accordance with a preferred embodiment of the present invention the tampering sensing circuitry senses tampering with the at least one conductor by sensing changes in the unpredictably varying signals resulting from the tampering.

Preferably, the unpredictably varying signal generating circuitry operates by at least one of changing the topology of the unpredictably varying signal generating circuitry and changing at least one applied signal applied thereto. Additionally, the unpredictably varying signal generating circuitry includes circuitry wherein at least one of the following is supplied to the tampering sensing circuitry: circuit components, circuit component values, ground connections, locations at which the at least one applied signal is applied, locations from which an unpredictable signal is supplied to the at least one conductor, locations at which an unpredictable signal is supplied to the at least one conductor and locations from which at least one received signal is received.

In accordance with a preferred embodiment of the present invention the unpredictably varying signal generating circuitry includes signal generation circuitry having unpredictable input signal generation functionality. Additionally, the signal generation circuitry includes circuitry wherein selection of least one of a signal generator and at least one specific signal to be generated are unpredictably variable.

Preferably, at least one of signal shape, amplitude, frequency and phase of the at least one specific signal is variable. Additionally, the at least one specific signal includes at least a first signal and a second signal, wherein the first signal is different from the second signal and wherein the first signal is applied at a first location and the second signal is applied at a second location. Alternatively, the at least one specific signal includes consecutive plural different signals at consecutive different times.

In accordance with a preferred embodiment of the present invention the at least one conductor includes multiple disparate grids located at various locations in the unpredictably varying signal generating circuitry. Preferably, the at least one conductor includes a multiplicity of closely spaced conductors.

In accordance with a preferred embodiment of the present invention at least part of the at least one conductor forms part of at least one of a protective circuit, data line and control line. Preferably, at least part of the at least one conductor forms part of at least one of an integrated circuit and a printed circuit board.

Preferably, the tampering sensing circuitry includes a library of stored expected received signals.

In accordance with a preferred embodiment of the present invention the tampering sensing circuitry includes calculation functionality for calculating expected received signals. Additionally, the calculation functionality employs Simulation Program with Integrated Circuit Emphasis (SPICE) functionality.

Preferably, the tampering sensing circuitry includes a comparator which ascertains a difference between an expected received signal and an actual received signal. Additionally, the difference is applied to a threshold which represents a difference which is indicative of tampering. In accordance with a preferred embodiment of the present invention the assembly is operative in response to exceedance of the threshold to generate a tampering alarm.

In accordance with a preferred embodiment of the present invention the at least one conductor is physically arranged to at least partially surround an object to be protected and to impede physical access thereto. Preferably, wherein the at least one conductor is connected to the tampering sensing circuitry. In accordance with a preferred embodiment of the present invention the at least one conductor is arranged on a protective enclosure in which or on which are located at least one of security-sensitive components storing sensitive data and data lines carrying security-sensitive information.

In accordance with a preferred embodiment of the present invention the unpredictably varying signal generating circuitry is embodied in circuitry which includes discrete active components. Additionally or alternatively, the unpredictably varying signal generating circuitry is embodied in circuitry which includes discrete passive components. Alternatively or additionally, the unpredictably varying signal generating circuitry is embodied in circuitry which includes analog components. Additionally or alternatively, the unpredictably varying signal generating circuitry is embodied in circuitry which includes digital components.

Preferably, the unpredictably varying signal generating circuitry is embodied in a secure keypad device. Additionally, at least part of the unpredictably varying signal generating circuitry is embodied in circuitry which is incorporated in a controller which controls the operation of the secure keypad device.

BRIEF DESCRIPTION OF THE DRAWINGS

The present invention will be understood and appreciated more fully from the following detailed description, taken in conjunction with the drawings in which:

FIGS. 2A-2F are simplified partially pictorial, partially schematic illustrations of tamper protection for a secure keypad device in accordance with a preferred embodiment of the present invention;

FIGS. 6A-6F are simplified signal diagrams corresponding to effective circuits A-F illustrated in FIG. 2D for a simple time-varying applied signal;

FIGS. 15A & 15B are Bode plots and corresponding circuit diagrams for an exemplary effective circuit in respective non-tampered and tampered states.

DETAILED DESCRIPTION OF PREFERRED EMBODIMENTS

Figure 1:
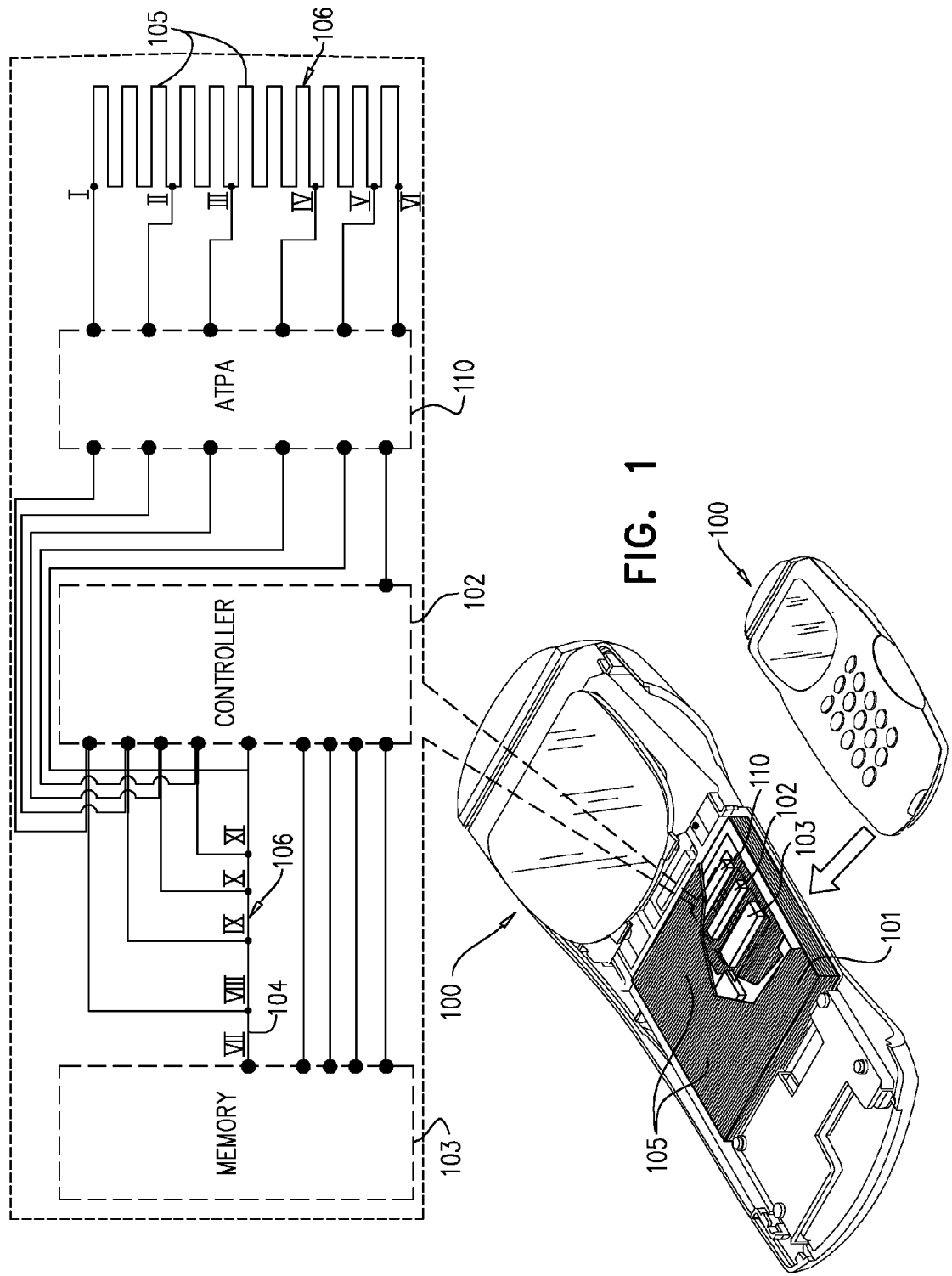
FIG. 1 is a simplified illustration of a secure keypad device constructed and operative in accordance with a preferred embodiment of the present invention.

Reference is now made to FIG. 1, which is a simplified illustration of a secure keypad device constructed and operative in accordance with a preferred embodiment of the present invention. The secure keypad device may be a PIN pad, a point of sale device, a cash register, an ATM or any other input device adapted to receive sensitive data.

As seen in FIG. 1, there is provided a secure keypad device 100, such as the point of sale device illustrated in FIG. 1, preferably including a protected enclosure 101 in which or on which are located security-sensitive components, such as a controller 102, a memory 103 storing personal data, encryption keys and the like, and data lines 104 carrying security-sensitive information, for example between controller 102 and memory 103. The protected enclosure 101 preferably includes one or more wires, traces or other grid elements 105, preferably arranged in a closely spaced arrangement such as a dense grid. An anti-tampering protection assembly (ATPA) 110 is provided for sensing tampering with either or both data lines 104 and grid elements 105. Hereinafter, one or more data lines 104 and/or one or more grid elements 105 are collectively referred to as conductors 106.

The anti-tampering protection assembly 110 may be embodied in circuitry which includes discrete active and/or passive, analog and/or digital components or alternatively may be embodied in an integrated circuit or in a hybrid circuit. All or part of the anti-tampering protection assembly 110 may be incorporated in controller 102, which controls the operation of the secure keypad device 100. Alternatively, the anti-tampering protection assembly 110 may be partially or completely separate from the controller 102.

In accordance with a preferred embodiment of the present invention, the anti-tampering protection assembly 110 includes unpredictably varying signal generating circuitry, connected to conductors 106, for providing unpredictably varying signals on conductors 106, and tampering sensing circuitry, for sensing tampering with conductors 106. The term "unpredictably varying signals" refers to one or more signals applied at one or more locations, which are unpredictable in the sense that a potential tamperer could not ascertain what they are in sufficient time to enable him to emulate them.

In accordance with a preferred embodiment of the present invention, the unpredictably varying signals are supplied to conductors 106 at various locations therealong. It is appreciated that conductors 106 may be in the form of one or more grids and/or data lines which are distributed at various locations in the secure keypad device 100.

For example, as seen in FIG. 1, unpredictably varying signals may be supplied to grid elements 105 at one or more of locations designated by Roman numerals I, II, III, IV, V and VI and may be supplied to data lines 104 at one or more of locations designated by Roman numerals VII, VIII, IX, X and XI.

It is a particular feature of the present invention that the tampering sensing circuitry senses tampering with conductors 106 by sensing changes in the unpredictably varying signals resulting from tampering. This is preferably achieved by comparing the expected received signal from the unpredictably varying signals with the actual received signals. It is noted that the expected received signals resulting from the unpredictable signals is known to the tampering sensing circuitry, but not to the tamperer.

Preferably, the unpredictably varying signal generating circuitry operates by at least one of changing its topology and by changing at least one input signal applied thereto.

In accordance with one embodiment of the present invention, the unpredictably varying signal generating circuitry includes circuitry having unpredictably variable topology. In this circuitry, preferably at least one of circuit components, circuit component values, ground connections and signal injection locations are variable.

Reference is now made to FIGS. 2A-2F, which are simplified partially pictorial, partially schematic illustrations of tamper protection for a secure keypad device in accordance with a preferred embodiment of the present invention.

Figure 2A:
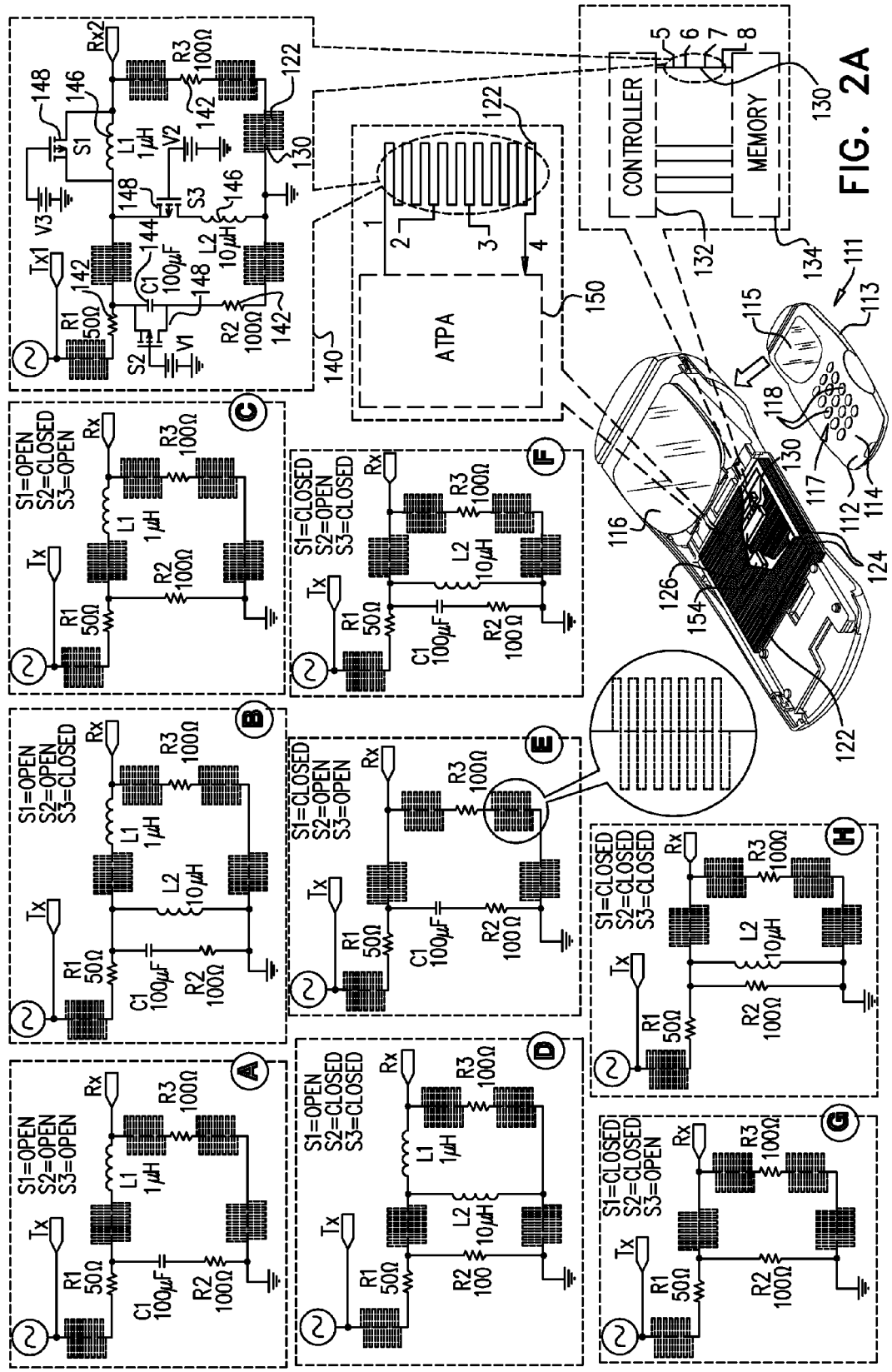

As seen in FIG. 2A, a secure keypad device 111 includes a housing, preferably including a top housing element 112 and a bottom housing element 113. Top housing element 112 includes, on a top surface 114 thereof, a display window 115 through which a display 116 may be viewed. An array 117 of keys 118 is engageable on top surface 114.

An anti-tampering grid 122, preferably formed of a multiplicity of anti-tampering dense electrical conductors 124, is preferably provided to define a protective enclosure within the housing. Alternatively or additionally, a protective enclosure may be defined within a secure integrated circuit 126, which may be within or outside the protective enclosure defined by grid 122.

One or more galvanic data links 130, preferably formed as one or more conductors, may be provided in the secure keypad device for carrying sensitive data, typically between a controller 132, which corresponds to controller 102 in FIG. 1, and a memory 134, which corresponds to memory 103 in FIG. 1.

In accordance with a preferred embodiment of the present invention, at least one of anti-tampering grid 122 and one or more galvanic data links 130 form part of an electrical circuit 140. Electrical circuit 140 preferably includes at least one of a plurality of circuit components, preferably including at least one of a resistance, a capacitance and an inductance, here respectively indicated by reference numerals 142, 144 and 146.

Further in accordance with a preferred embodiment of the invention, preferably at least one or more, preferably plural, circuit switches 148, preferably Field-Effect Transistors (FETs) or Bipolar Junction Transistors (BJTs), are arranged in circuit with the grid 122 and/or galvanic data link 130, defining an electrical circuit therewith which is characterized in that its circuit functionality is selectable. In the illustrated embodiment of FIG. 2A, the circuit switches 148 are identified by designators S1, S2 and S3.

In accordance with a preferred embodiment of the present invention, an anti-tampering protection assembly (ATPA) 150, which corresponds to ATPA 110 (FIG. 1), is provided to apply a signal, hereinafter termed an applied signal, to one or more of the conductors constituting the grid 122 or galvanic data link 130. As noted above with respect to FIG. 1, ATPA 150 may be embodied in controller 132. The applied signal may be selectably applied at a first location selected from one or more of a plurality of selectable locations along the grid 122, here designated by numerals, 1, 2, 3 & 4 along grid 122 and correspondingly by numerals 5, 6, 7 and 8 along galvanic data link 130. In the illustrated embodiment of FIG. 2A, the signal is applied at location 1, designated Tx1, which corresponds to location 5 along galvanic data link 130.

Further in accordance with a preferred embodiment of the present invention, the ATPA 150 is also operative to receive at least one signal, hereinafter referred to as a received signal, which corresponds to the applied signal at at least a second location along the at least one conductor in circuit 140. In the illustrated embodiment of FIG. 2A, the received signal is received at location 2 along grid 122 and designated Rx2, corresponding to location 6 along galvanic data link 130.

Additionally, in accordance with a preferred embodiment of the present invention, the ATPA 150 has additional tamper detection functionality including circuit selection functionality operative to select at least one of the first location, the second location and at least one circuit function of at least one of said plurality of circuit components.

In the illustrated embodiment of FIG. 2A, the at least one circuit function is selected by the ATPA 150 by selecting the open/closed state of the plural circuit switches 148.

The ATPA 150 preferably also includes signal correlation functionality operative to receive the received signal from the second location and to correlate the received signal with the applied signal thereby to ascertain whether the conductor has been tampered with and more preferably the region at which the tampering occurred. Perceived tampering responsive circuitry 154, preferably located within the protective grid 122 or embodied in a secure integrated circuit, is operative in response to an output of the ATPA 150 or forms part of the ATPA, and preferably provides an alarm indication of tampering and/or is operative to disable some or all of the functions of the secure keypad device 111.

It is appreciated from a consideration of FIG. 2A, that there exist eight combinations of open/closed status of the switches S1, S2 and S3. Each of the eight illustrated combinations produces a different effective electrical circuit. The eight different effective electrical circuits are each illustrated in FIG. 2A and are designated by letters A, B, C, D, E, F, G & H.

It is noted that for the purposes of simplicity of illustration of effective circuits A-H and clarity of description, switches S1, S2 and S3 are here indicated as theoretical switches, which are either fully open (infinite resistance) or fully closed (zero resistance). Switches S1, S2 and S3 are each preferably a model MTD2955/ON manufactured by ON Semiconductor of Phoenix Ariz.

For example, when all of switches S1, S2 and S3 are open, electrical circuit 140 appears as shown at A. Effective electrical circuits designated by letters B-H each include an indication of the respective open/closed status of the switches S1, S2 and S3.

Reference is now made to FIG. 2B, which illustrates a secure keypad device 200, which includes a housing, preferably including a top housing element 202 and a bottom housing element 204. Top housing element 202 includes, on a top surface 206 thereof, a display window 208, through which a display 209 may be viewed. An array 210 of keys 212 is engageable on top surface 206.

An anti-tampering grid 222, preferably formed of a multiplicity of anti-tampering dense electrical conductors 224, is preferably provided to define a protective enclosure within the housing. Alternatively or additionally, a protective enclosure may be defined within a secure integrated circuit 226, which may be within or outside the protective enclosure defined by grid 222.

One or more galvanic data links 230, preferably formed as one or more conductors, may be provided in the secure keypad device for carrying sensitive data, typically between a controller 232, which corresponds to controller 102 in FIG. 1, and a memory 234, which corresponds to memory 103 in FIG. 1.

In accordance with a preferred embodiment of the present invention at least one of anti-tampering grid 222 and one or more galvanic data links 230 form part of an electrical circuit 240. Electrical circuit 240 preferably includes at least one of a plurality of circuit components, preferably including at least one of a variable resistance, a variable capacitance and a variable inductance, here respectively indicated by reference numerals 242, 244 and 246.

A preferred embodiment of a selectably variable resistance 242 is an ACAC 0612 commercially available from Vishay Intertechnology, Inc. A preferred embodiment of a selectably variable capacitance 244 is a X90100 digital variable capacitor commercially available from Intersil Americas Inc. of Milpitas, Calif.

Selectably variable inductance 246 may be realized by employing a conventional gyrator having a selectably variable resistance and capacitance.

At least one or more, preferably plural, circuit switches 248, preferably FETs or BJTs, are arranged in circuit with the grid 222 and/or the galvanic data link 230. In the illustrated embodiment of FIG. 2B, the circuit switches are identified by designators S1, S2 and S3 and switches S1, S2 and S3 are open. Alternatively, switches S1, S2 and S3 and the circuit portions including them may be eliminated.

In accordance with a preferred embodiment of the present invention, an anti-tampering protection assembly (ATPA) 250, which corresponds to ATPA 110 (FIG. 1), is provided to apply a signal, hereinafter termed an applied signal, to one or more of the conductors constituting the grid 222 or galvanic data link 230. As noted above with respect to FIG. 1, ATPA 250 may be embodied in controller 232. The applied signal may be selectably applied at a first location selected from one or more of a plurality of selectable locations along the grid 222, here designated by numerals, 1, 2, 3 & 4 along grid 222 and correspondingly by numerals 5, 6, 7 and 8 along galvanic data link 230. In the illustrated embodiment of FIG. 2B, the signal is applied at location 1 and designated as Tx1, which corresponds to location 5 along galvanic data link 230.

Further in accordance with a preferred embodiment of the present invention, the ATPA 250 is also operative to receive at least one signal, hereinafter referred to as a received signal, which corresponds to the applied signal at at least a second location along the at least one conductor in circuit 240. In the illustrated embodiment of FIG. 2B, the received signal is received at location 2 along grid 222 and designated as Rx2, corresponding to location 6 along galvanic data link 230.

Additionally in accordance with a preferred embodiment of the present invention, the ATPA 250 has additional tamper detection functionality including circuit selection functionality operative to select at least one of the first location, the second location and at least one circuit function of at least one of said plurality of circuit components.

In the illustrated embodiment of FIG. 2B, the at least one circuit function is selected by the ATPA 250 by selecting the values of the plurality of selectably variable circuit components, such as components 242, 244 and 246.

The ATPA 250 preferably also includes signal correlation functionality operative to receive the received signal from the second location and to correlate the received signal with the applied signal thereby to ascertain whether the conductor has been tampered with and more preferably the region at which the tampering occurred. Perceived tampering responsive circuitry 254, preferably located within the protective grid 222 or embodied in a secure integrated circuit, is operative in response to an output of the ATPA 250 or forms part of the ATPA 250, and preferably, provides an alarm indication of tampering and/or is operative to disable some or all of the functions of the secure keypad device 200.

It is appreciated from a consideration of FIG. 2B, that there exist multiple combinations of values of the plurality of selectably variable circuit components. Each of the eight illustrated combinations produces a different effective electrical circuit. The eight different effective electrical circuits are each illustrated in FIG. 2B and are designated by letters A, B, C, D, E, F, G & H.

It is noted that for the purposes of simplicity of illustration of effective circuits A-H and clarity of description, switches S1, S2 and S3 are here indicated as theoretical switches, which are either fully open (infinite resistance) or fully closed (zero resistance). Switches S1, S2 and S3 are each preferably a model MTD2955/ON manufactured by ON Semiconductor of Phoenix Ariz. In circuits A-H of FIG. 2B, switches S1, S2 and S3 are open.

For example, when the values of the variable components are R1=50Ω, L1=1 μH and C1=100 μF, electrical circuit 240 appears as shown at A. Effective electrical circuits designated by letters B-H each have differing values of at least one of the variable components and each include an indication of the values of the circuit components.

Figure 2C:
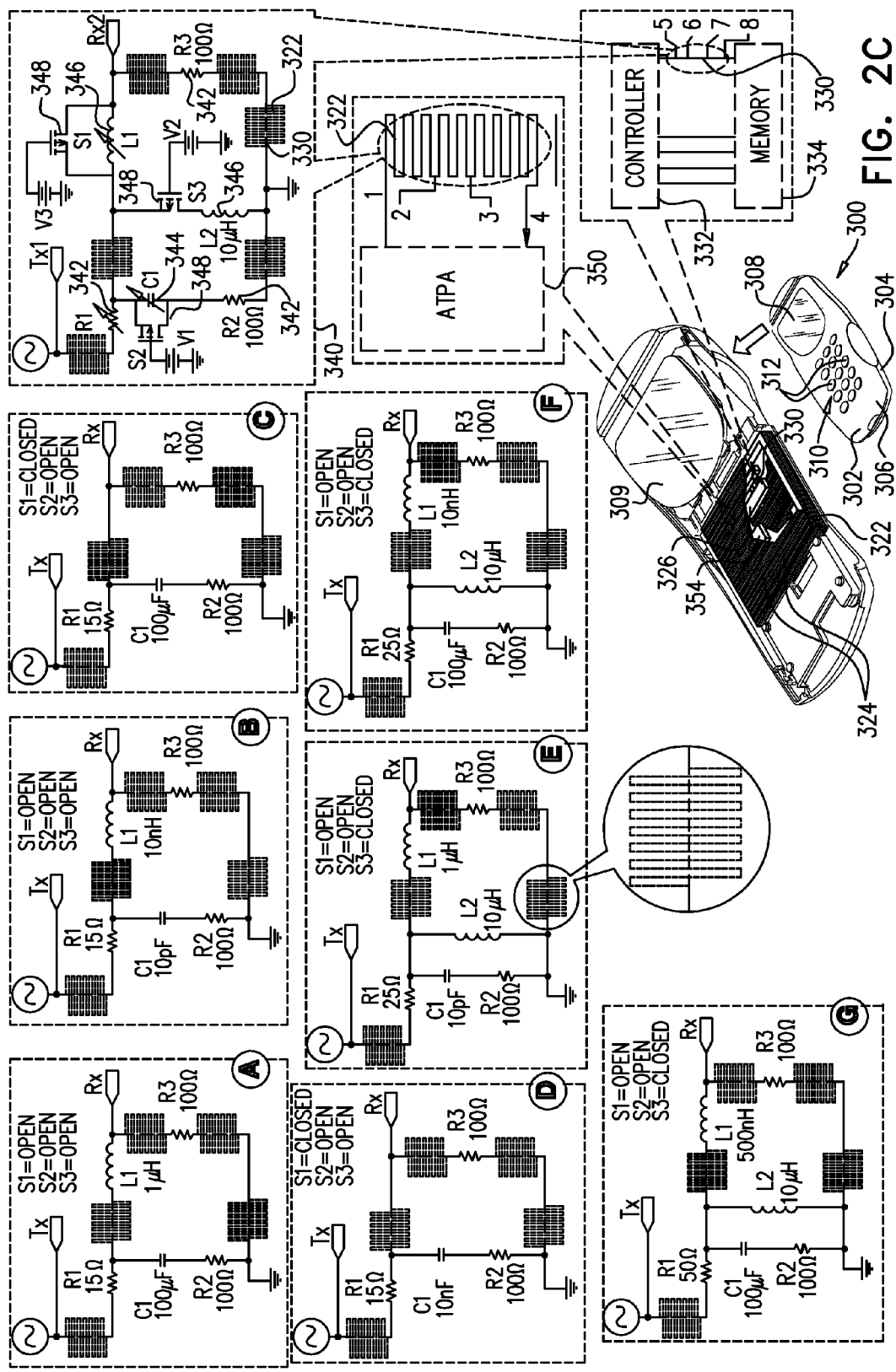

Reference is now made to FIG. 2C, which illustrates a secure keypad device 300, which includes a housing, preferably including a top housing element 302 and a bottom housing element 304. Top housing element 302 includes, on a top surface 306 thereof, a display window 308, through which a display 309 may be viewed. An array 310 of keys 312 is engageable on top surface 306.

An anti-tampering grid 322, preferably formed of a multiplicity of anti-tampering dense electrical conductors 324, is preferably provided to define a protective enclosure within the housing. Alternatively or additionally, a protective enclosure may be defined within a secure integrated circuit 326, which may be within or outside the protective enclosure defined by grid 322.

One or more galvanic data links 330, preferably formed as one or more conductors, may be provided in the secure keypad device for carrying sensitive data, typically between a controller 332, which corresponds to controller 102 in FIG. 1, and a memory 334, which corresponds to memory 103 in FIG. 1.

In accordance with a preferred embodiment of the present invention at least one of anti-tampering grid 322 and one or more galvanic data links 330 form part of an electrical circuit 340. Electrical circuit 340 preferably includes at least one of a plurality of circuit components, preferably including at least one of a variable resistance, a variable capacitance and a variable inductance, here respectively indicated by reference numerals 342, 344 and 346.

A preferred embodiment of a selectably variable resistance 342 is an ACAC 0612 commercially available from Vishay Intertechnology, Inc. A preferred embodiment of a selectably variable capacitance 344 is a X90100 digital variable capacitor commercially available from Intersil Americas Inc. of Milpitas Calif.

Selectably variable inductance 346 may be realized by employing a conventional gyrator having a selectably variable resistance and capacitance.

Additionally, in accordance with a preferred embodiment of the present invention, one or more, preferably plural, circuit switches 348, preferably FETs or BJTs, are arranged in circuit with the grid 322 and/or the galvanic data link 330. In the illustrated embodiment of FIG. 2C, the circuit switches are identified by designators S1, S2 and S3.

In accordance with a preferred embodiment of the present invention, an anti-tampering protection assembly (ATPA), 350, which corresponds to ATPA 110 (FIG. 1), is provided to apply a signal, hereinafter termed an applied signal, to one or more of the conductors constituting the grid 322 or galvanic data link 330. As noted above with respect to FIG. 1, ATPA 350 may be embodied in controller 332. The applied signal may be selectably applied at a first location selected from one or more of a plurality of selectable locations along the grid 322, here designated by numerals, 1, 2, 3 and 4 along grid 322 and correspondingly by numerals 5, 6, 7 and 8 along galvanic data link 330. In the illustrated embodiment of FIG. 2C, the signal is applied at location 1, designated Tx1, which corresponds to location 5 along galvanic data link 330.

Further in accordance with a preferred embodiment of the present invention, the ATPA 350 is also operative to receive at least one signal, hereinafter referred to as a received signal, which corresponds to the applied signal at at least a second location along the at least one conductor in circuit 340. In the illustrated embodiment of FIG. 2C, the received signal is received at location 2 along grid 322, and designated Rx2, corresponding to location 6 along galvanic data link 330.

Additionally in accordance with a preferred embodiment of the present invention, the ATPA 350 has additional tamper detection functionality including circuit selection functionality operative to select at least one of the first location, the second location and at least one circuit function of at least one of said plurality of circuit components.

In the illustrated embodiment of FIG. 2C, the at least one circuit function is selected by the ATPA 350 by selecting the values of the plurality of selectably variable circuit components, such as components 342, 344 and 346 and by selecting the open/closed state of the plural circuit switches 348.

The ATPA 350 preferably also includes signal correlation functionality operative to receive the received signal from the second location and to correlate the received signal with the applied signal thereby to ascertain whether the conductor has been tampered with and more preferably the region at which the tampering occurred. Perceived tampering responsive circuitry 354, preferably located within the protective grid 322 or embodied in a secure integrated circuit, is operative in response to an output of the ATPA 350 or forms part of the ATPA 350, and preferably provides an alarm indication of tampering and/or is operative to disable some or all of the functions of the secure keypad device 300.

It is appreciated from a consideration of FIG. 2C, that there exist multiple combinations of values of the plurality of selectably variable circuit components and of open/closed states of the plural circuit switches 348. Each of the seven illustrated combinations produces a different effective electrical circuit. The seven different effective electrical circuits are each illustrated in FIG. 2C and are designated by letters A, B, C, D, E, F, & G.

It is noted that for the purposes of simplicity of illustration of effective circuits A-G and clarity of description, switches S1, S2 and S3 are here indicated as theoretical switches, which are either fully open (infinite resistance) or fully closed (zero resistance). Switches S1, S2 and S3 are each preferably a model MTD2955/ON manufactured by ON Semiconductor of Phoenix Ariz.

For example, when the values of the variable components are R1=15Ω, C1=100 µF and L1=1 µH and the open/closed states of the plural circuit switches 348 are S1=open, S2=open and S3=open, electrical circuit 340 appears as shown at A. Effective electrical circuits designated by letters B-G each have differing values of at least one of the variable components and open/close status of the switches S1, S2 and S3 and each include an indication of the values of circuit components.

Figure 2D:
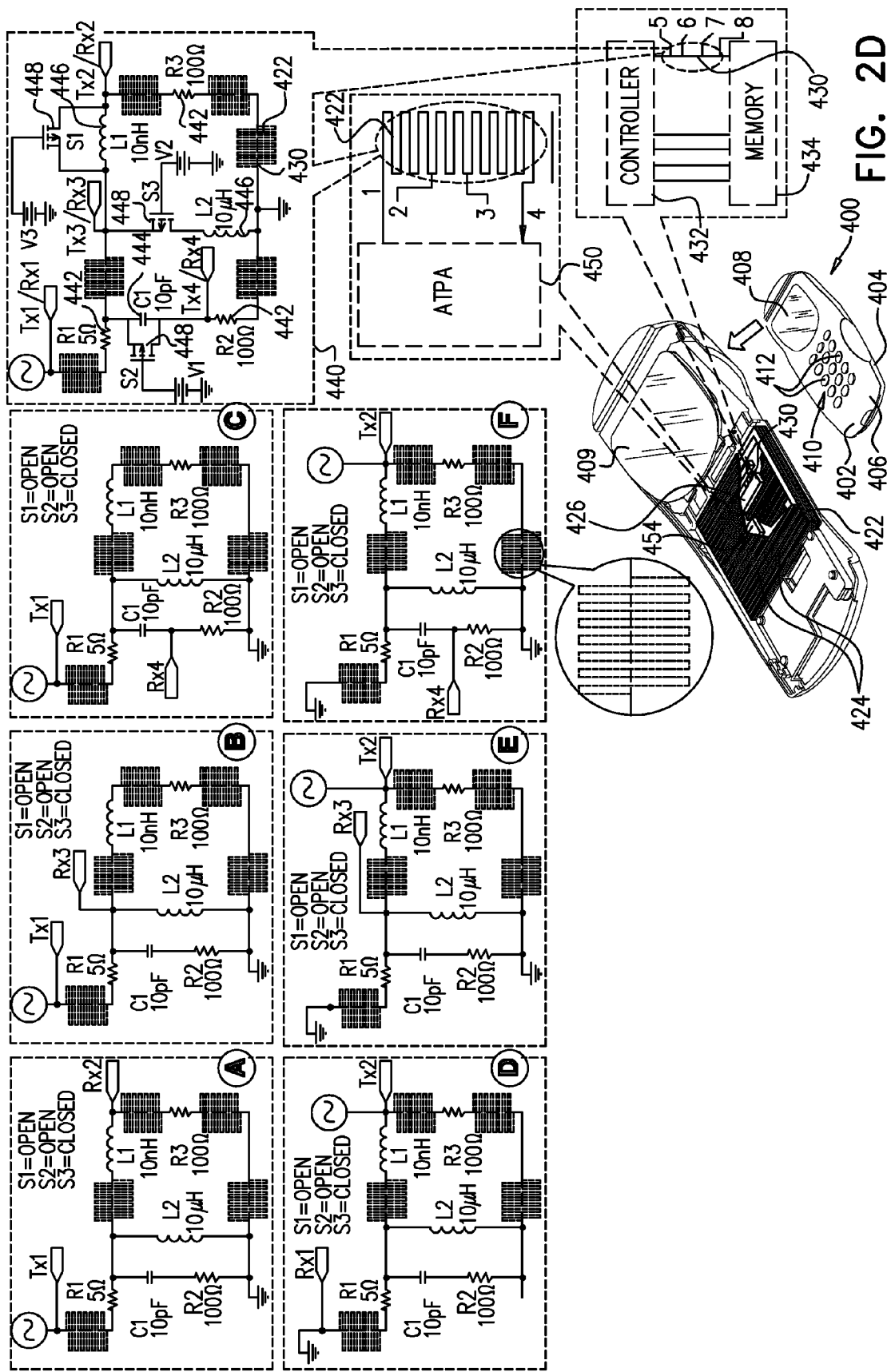

Reference is now made to FIG. 2D, which illustrates a secure keypad device 400, which includes a housing, preferably including a top housing element 402 and a bottom housing element 404. Top housing element 402 includes, on a top surface 406 thereof, a display window 408, through which a display 409 may be viewed. An array 410 of keys 412 is engageable on top surface 406.

An anti-tampering grid 422, preferably formed of a multiplicity of anti-tampering dense electrical conductors 424, is preferably provided to define a protective enclosure within the housing. Alternatively or additionally, a protective enclosure may be defined within a secure integrated circuit 426, which may be within or outside the protective enclosure defined by grid 422.

One or more galvanic data links 430, preferably formed as one or more conductors, may be provided in the secure keypad device for carrying sensitive data, typically between a controller 432, which corresponds to controller 102 in FIG. 1, and a memory 434, which corresponds to memory 103 in FIG. 1.

In accordance with a preferred embodiment of the present invention at least one of anti-tampering grid 422 and one or more galvanic data links 430 form part of an electrical circuit 440. Electrical circuit 440 preferably includes at least one of a plurality of circuit components, preferably including at least one of a resistance, a capacitance and an inductance, here respectively indicated by reference numerals 442, 444 and 446. The values of the plurality of circuit components may be variable, but are not required to be in this embodiment.

Additionally, one or more, preferably plural, circuit switches 448, preferably FETs or BJTs, may be arranged in circuit with the grid 422 and/or the galvanic data link 430. In the illustrated embodiment of FIG. 2D, the circuit switches are identified by designators S1, S2 and S3 and switches S1 and S2 are open and switch S3 is closed. Alternatively, switches S1 and S2 may be replaced by conductors and switch S3 and the circuit portion including switch S3, which is parallel to inductor 446 is eliminated.

In accordance with a preferred embodiment of the present invention, an anti-tampering protection assembly (ATPA) 450, which corresponds to ATPA 110 (FIG. 1), is provided to apply a signal, hereinafter termed an applied signal, to one or more of the conductors constituting the grid 422 or galvanic data link 430. As noted above with respect to FIG. 1, ATPA 450 may be embodied in controller 432.

The applied signal may be selectably applied at a first location selected from one or more of a plurality of selectable locations along the grid 422, here designated by numerals, 1, 2, 3 &4 along grid 422 and correspondingly by numerals 5, 6, 7 & 8 along galvanic data link 430.

Further in accordance with a preferred embodiment of the present invention, the ATPA 450 is also operative to receive at least one signal, hereinafter referred to as a received signal, which corresponds to the applied signal at at least a second location along the at least one conductor in circuit 440.

Additionally in accordance with a preferred embodiment of the present invention, the ATPA 450 has additional tamper detection functionality including circuit selection functionality operative to select at least one of the first location, the second location and at least one circuit function of at least one of said plurality of circuit components.

In the illustrated embodiment of FIG. 2D, the at least one circuit function is selected by selecting the at least one of the first location and by selecting the at least one of the second location.

The ATPA 450 preferably also includes signal correlation functionality operative to receive the received signal from the second location and to correlate the received signal with the applied signal thereby to ascertain whether the conductor has been tampered with and more preferably the region at which the tampering occurred.

Perceived tampering responsive circuitry 454, preferably located within the protective grid 422 or embodied in a secure integrated circuit, is operative in response to an output of the ATPA 450 or forms part of the ATPA 450, and preferably provide an alarm indication of tampering and/or is operative to disable some or all of the functions of the secure keypad device 400.

It is appreciated from a consideration of FIG. 2D, that there exist multiple combinations of locations at which the applied signal is applied and the received signal is received. Each of the six illustrated combinations produces a different effective electrical circuit. The six different effective electrical circuits are each illustrated in FIG. 2D and are designated by letters A, B, C, D, E &F.

It is noted that for the purposes of simplicity of illustration effective electrical circuits A-F and clarity of description, switches S1, S2 and S3 are here indicated as theoretical switches, which are either fully open (infinite resistance) or fully closed (zero resistance). Switches S1, S2 and S3 are each preferably a model MTD2955/ON manufactured by ON Semiconductor of Phoenix Ariz. Switches S1 and S2 are open and S3 is closed in the six different effective electrical circuits A-F of FIG. 2D.

For example, when the applied signal is applied at location 1, designated by Tx1, and the received signal is received at location 2, designated by Rx2, electrical circuit 440 appears as shown at A. Effective electrical circuits designated by letters B-F, each have differing values of at least one of the location at which the applied signal is applied and the location at which the received signal is received and each include an indication of the values of circuit components.

Reference is now made to FIG. 2E, which illustrates a secure keypad device 500, which includes a housing, preferably including a top housing element 502 and a bottom housing element 504. Top housing element 502 includes, on a top surface 506 thereof, a display window 508, through which a display 509 may be viewed. An array 510 of keys 512 is engageable on top surface 506.

An anti-tampering grid 522, preferably formed of a multiplicity of anti-tampering dense electrical conductors 524, is preferably provided to define a protective enclosure within the housing. Alternatively or additionally, a protective enclosure may be defined within a secure integrated circuit 526, which may be within or outside the protective enclosure defined by grid 522.

One or more galvanic data links 530, preferably formed as one or more conductors, may be provided in the secure keypad device for carrying sensitive data, typically between a controller 532, which corresponds to controller 102 in FIG. 1, and a memory 534, which corresponds to memory 103 in FIG. 1.

In accordance with a preferred embodiment of the present invention at least one of anti-tampering grid 522 and one or more galvanic data links 530 form part of an electrical circuit 540. Electrical circuit 540 preferably includes at least one of a plurality of circuit components, preferably including at least one of a resistance, a capacitance and an inductance, here respectively indicated by reference numerals 542, 544 and 546. The values of the plurality of circuit components may be variable, but are not required to be variable in this embodiment.

Additionally, one or more, preferably plural, circuit switches 548, preferably FETs or BJTs, are preferably arranged in circuit with the grid 522 and/or the galvanic data link 530. In the illustrated embodiment of FIG. 2E, the circuit switches are identified by designators S1, S2 and S3.

In accordance with a preferred embodiment of the present invention, an anti-tampering protection assembly (ATPA) 550, which corresponds to ATPA 110 (FIG. 1), is provided to apply a signal, hereinafter termed an applied signal, to one or more of the conductors constituting the grid 522 or galvanic data link 530. As noted above with respect to FIG. 1, ATPA 550 may be embodied in controller 532.

The applied signal may be selectably applied at a first location selected from one or more of a plurality of selectable locations along the grid 522, here designated by numerals, 1, 2, 3 & 4 along grid 522 and correspondingly by numerals 5, 6, 7 & 8 along galvanic data link 530.

Further in accordance with a preferred embodiment of the present invention, the ATPA 550 is also operative to receive at least one signal, hereinafter referred to as a received signal, which corresponds to the applied signal at at least a second location along the at least one conductor in circuit 540.

Additionally, in accordance with a preferred embodiment of the present invention, the ATPA 550 has additional tamper detection functionality including circuit selection functionality operative to select at least one of the first location, the second location and at least one circuit function of at least one of said plurality of circuit components.

In the illustrated embodiment of FIG. 2E, the at least one circuit function is selected by selecting the open/closed state of the plural circuit switches 548 and by selecting the at least one second location.

The ATPA 550 preferably also includes signal correlation functionality operative to receive the received signal from the second location and to correlate the received signal with the applied signal thereby to ascertain whether the conductor has been tampered with and more preferably the region at which the tampering occurred.

Perceived tampering responsive circuitry 554, preferably located within the protective grid 522 or embodied in a secure integrated circuit, is operative in response to an output of the ATPA 550 or forms part of the ATPA 550, and preferably provides an alarm indication of tampering and/or is operative to disable some or all of the functions of the secure keypad device 500.

It is appreciated from a consideration of FIG. 2E, that there exist multiple combinations of locations at which the applied signal is applied and the received signal is received and of open/closed states of the switches S1, S2 and S3. Each of the six illustrated combinations produces a different effective electrical circuit. The six different effective electrical circuits are each illustrated in FIG. 2E and are designated by letters A, B, C, D, E & F.

It is noted that for the purposes of simplicity of illustration of effective circuits A-F and clarity of description, switches S1, S2 and S3 are here indicated as theoretical switches, which are either fully open (infinite resistance) or fully closed (zero resistance). Switches S1, S2 and S3 are each preferably a model MTD2955/ON manufactured by ON Semiconductor of Phoenix Ariz.

For example, when the received signal is received at location 3, designated by Rx3, and when all switches S1, S2 and S3 are open, electrical circuit 540 appears as shown at A. Effective electrical circuits designated by letters B-F each include at least one of differing locations at which the received signal is received and the open/close status of the switches S1, S2 and S3 and each include an indication of the values of the circuit components.

Figure 2F:
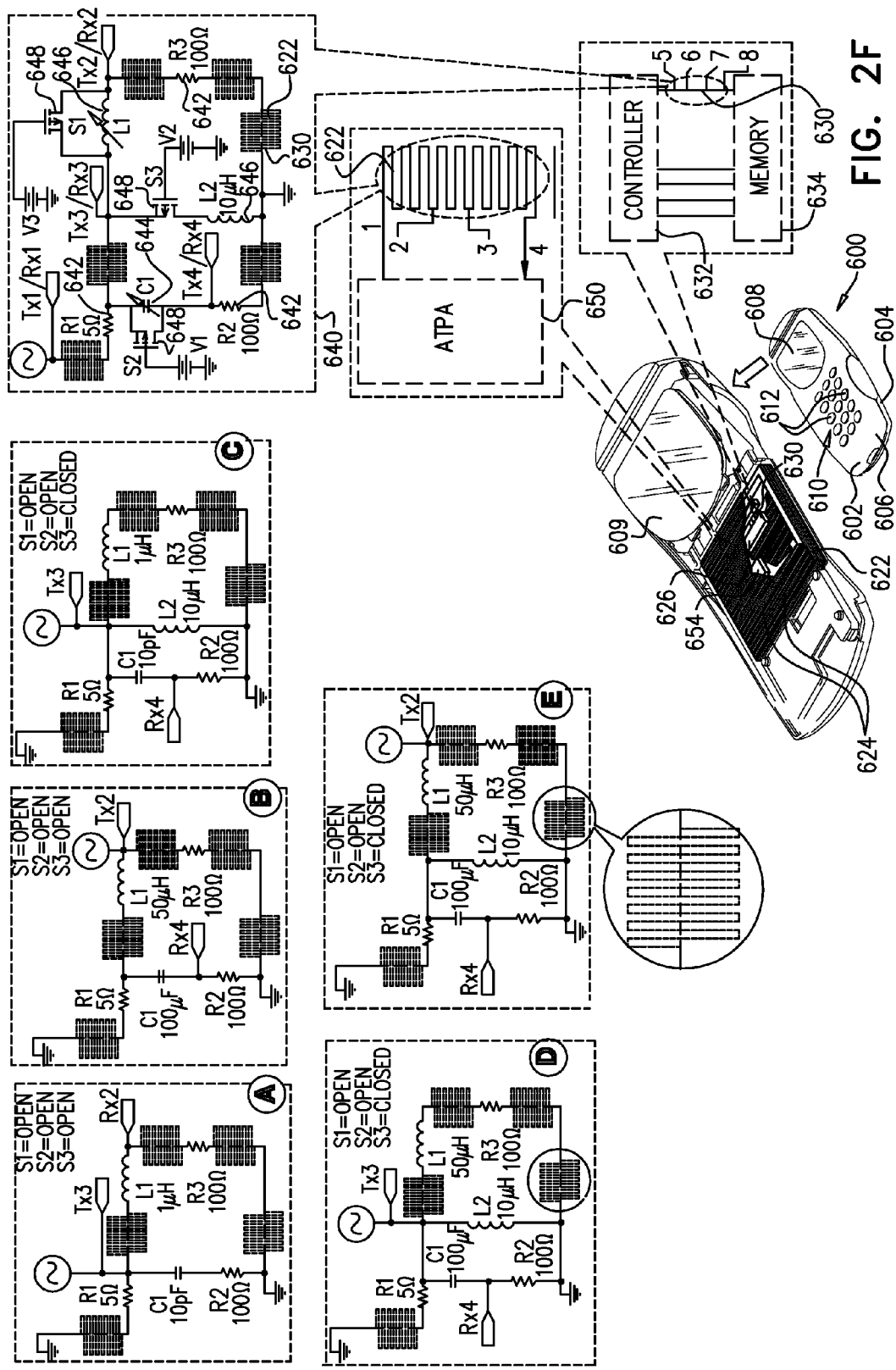
Figure 3A:
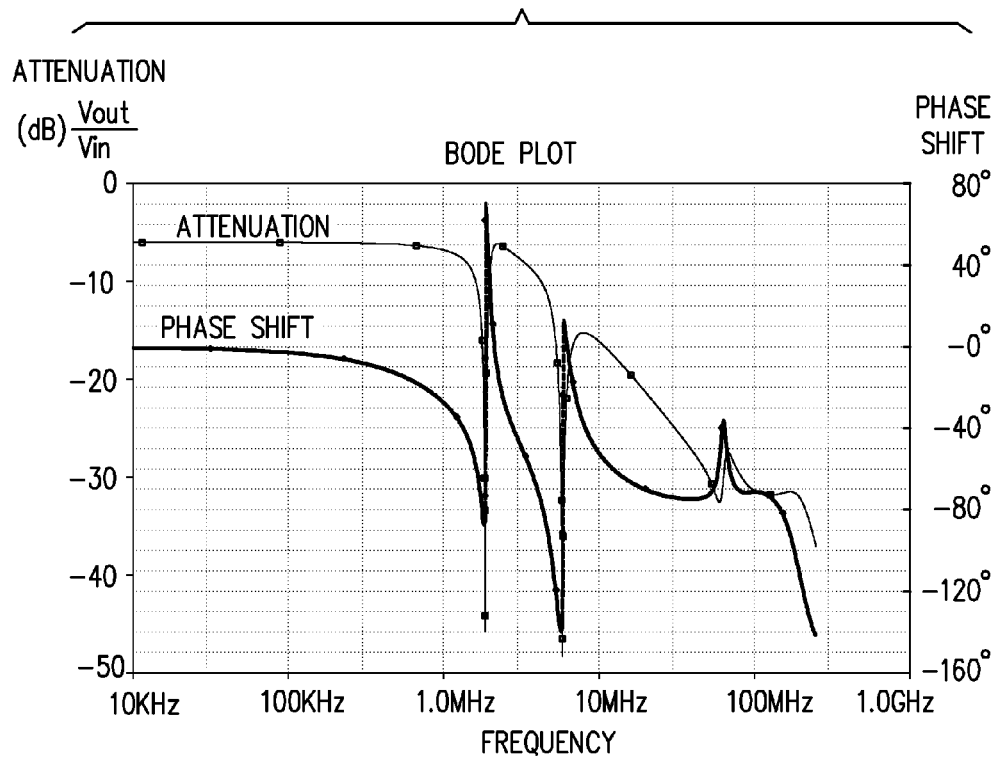
FIGS. 3A-3H are simplified signal diagrams corresponding to effective circuits A-H illustrated in FIG. 2A for a simple time-varying applied signal.
Figure 3A:
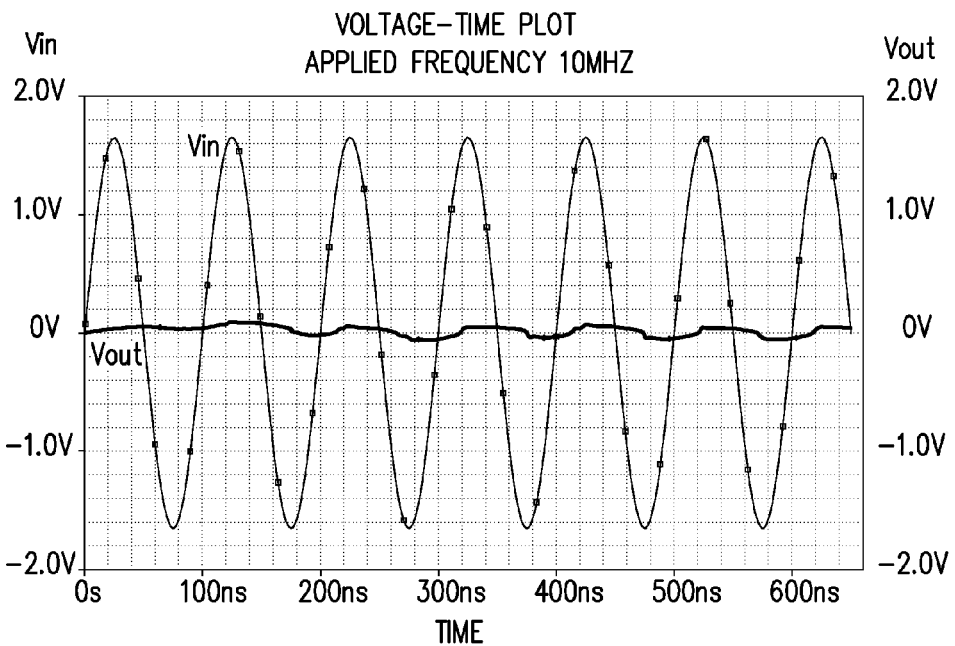
Figure 3B:
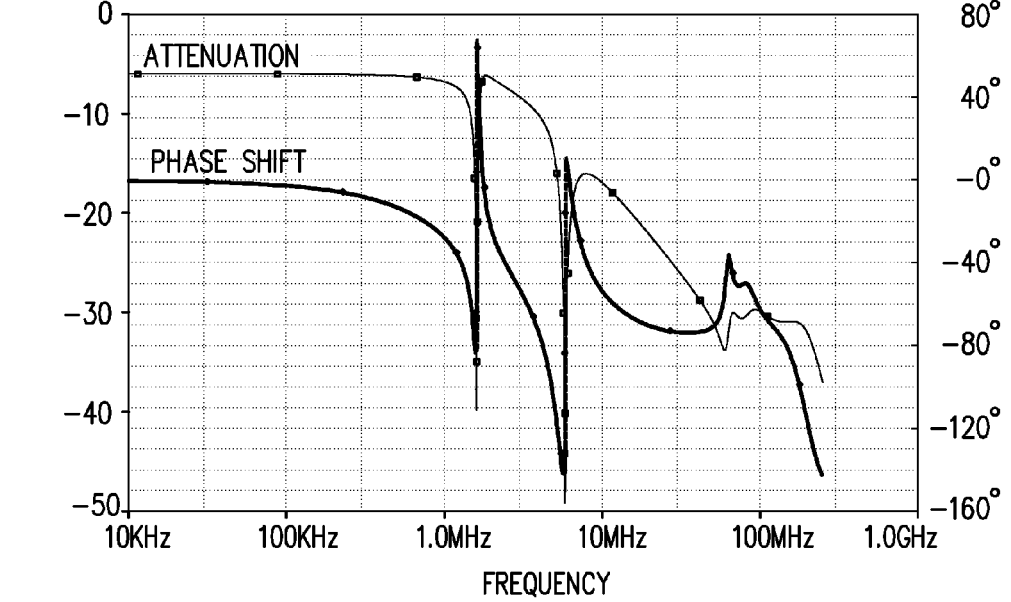
Figure 3B:
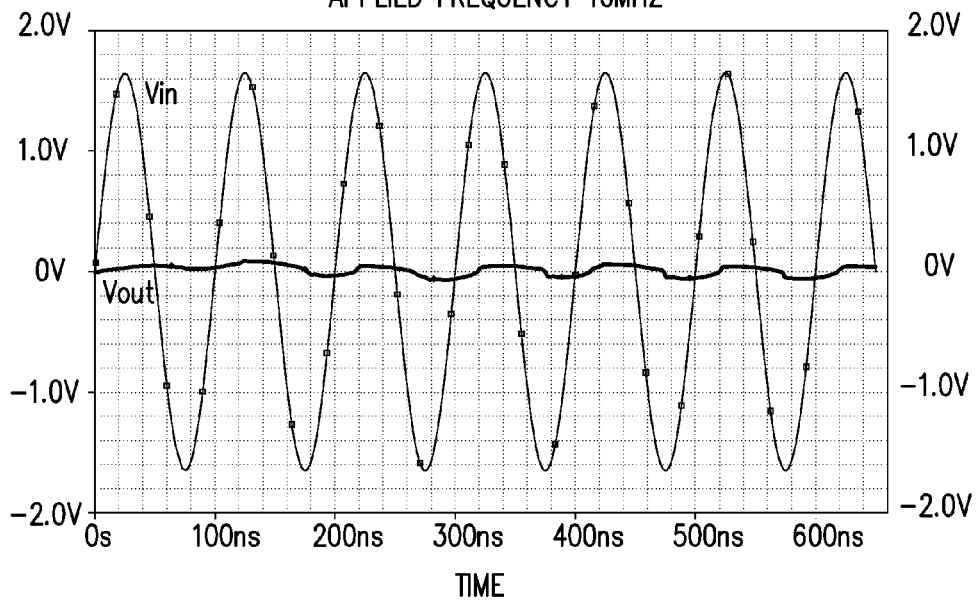
Figure 3C:
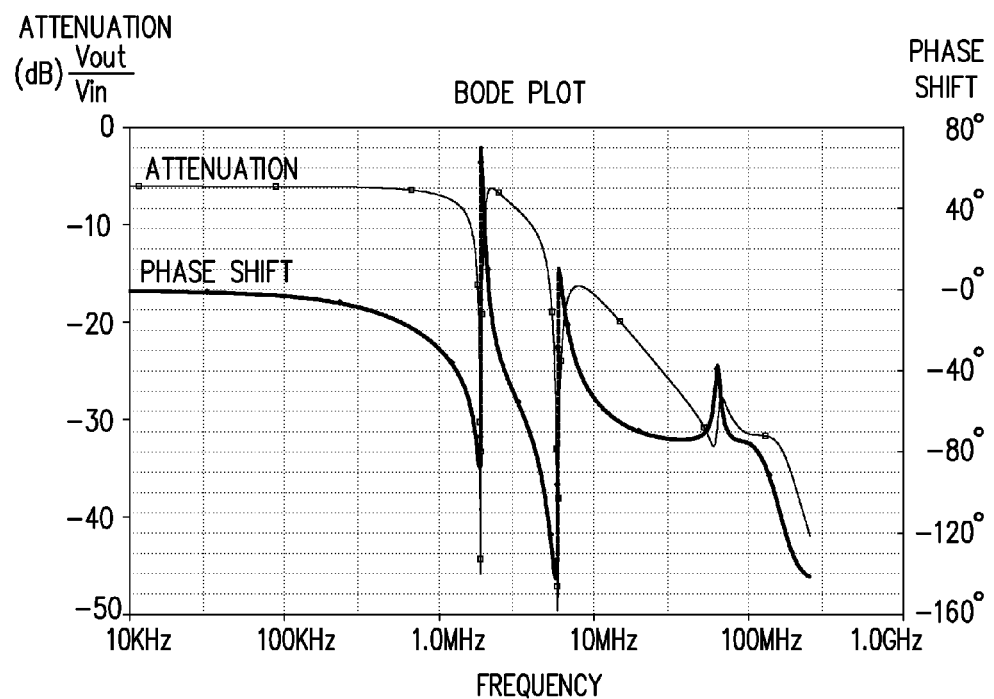
Figure 3C:
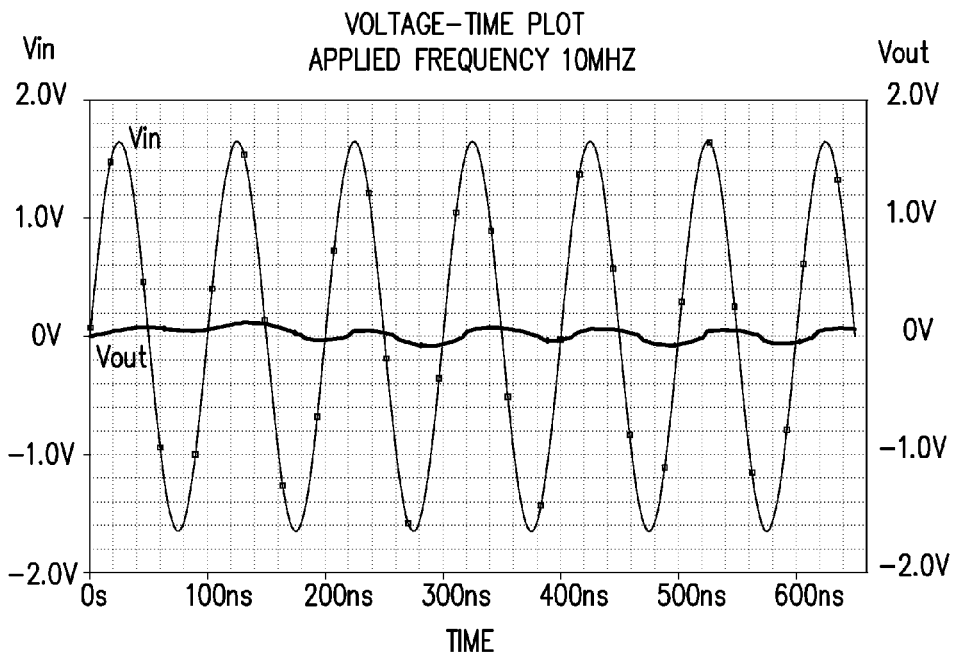
Figure 3D:
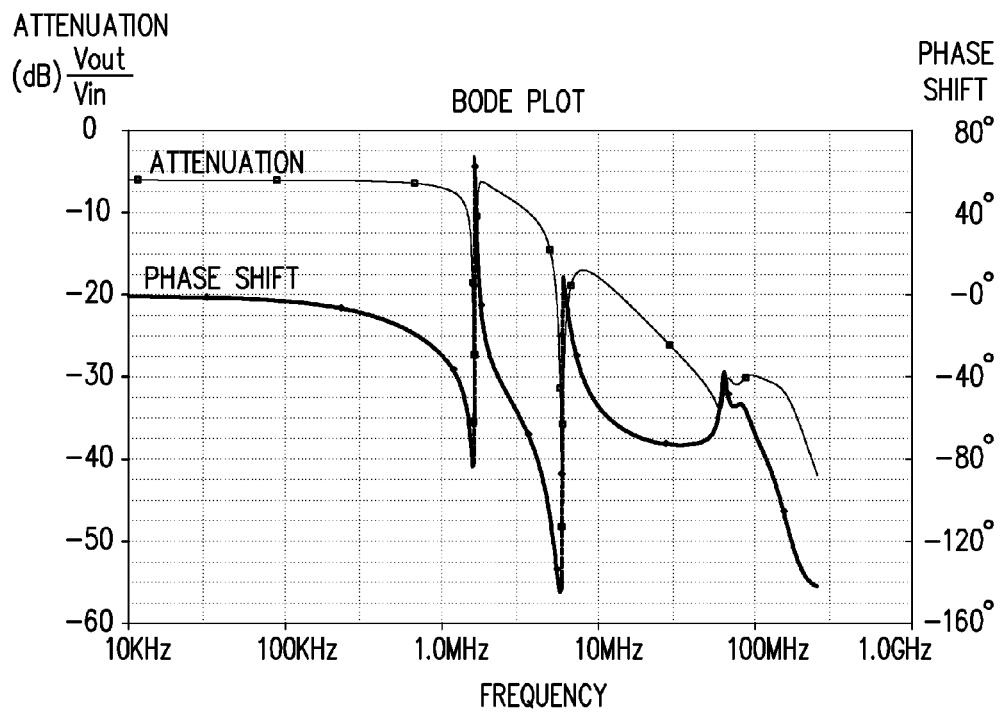
Figure 3D:
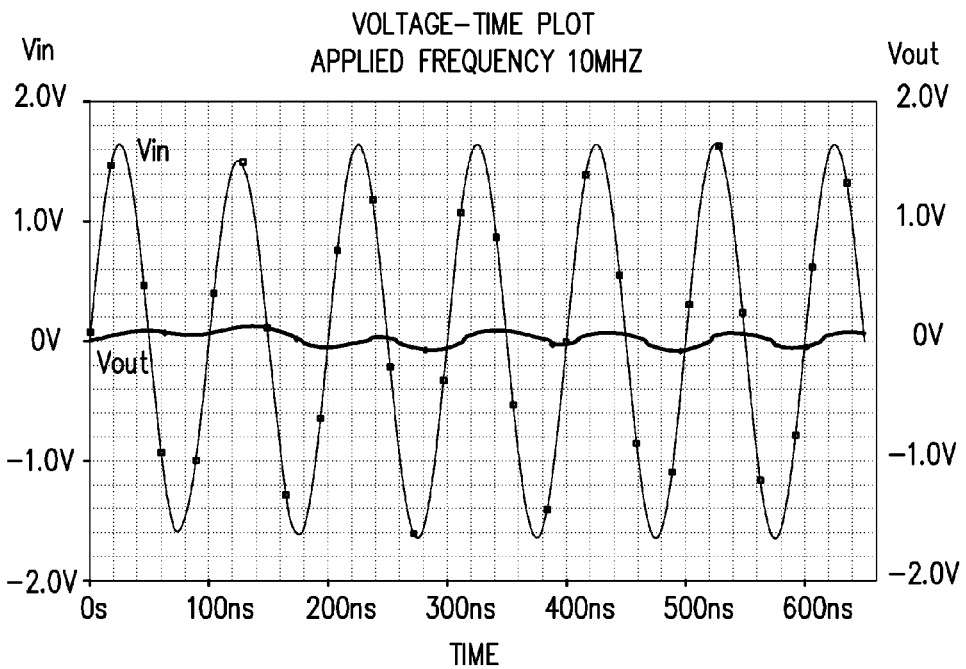
Figure 3E:
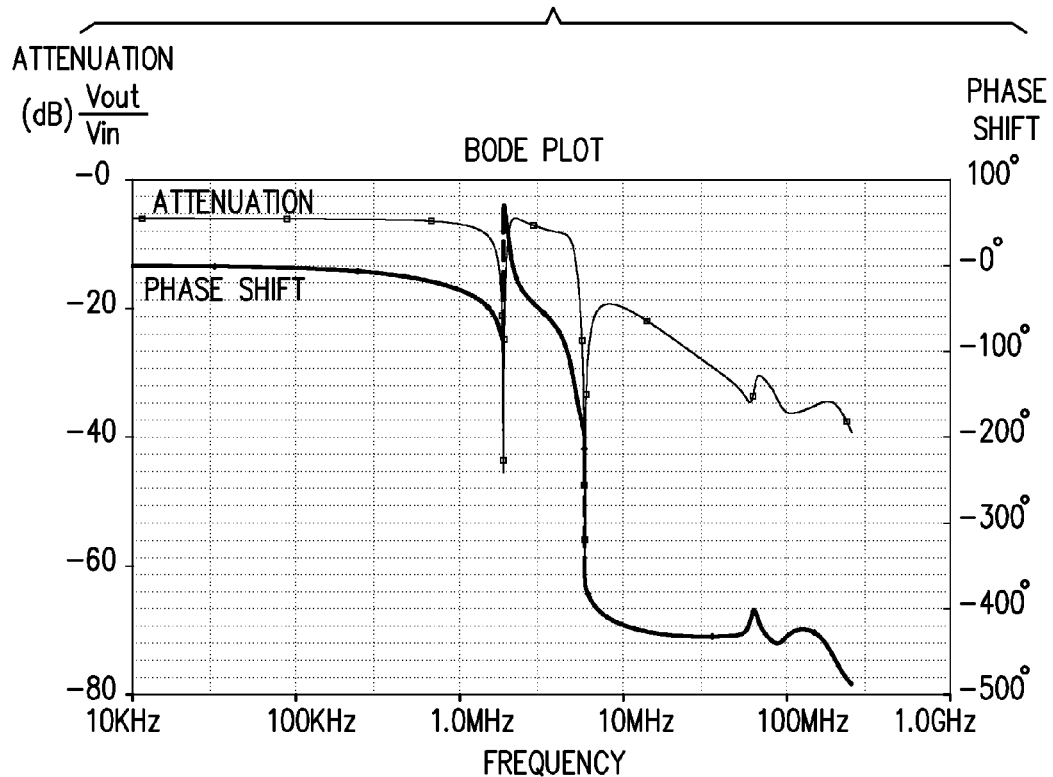
Figure 3E:
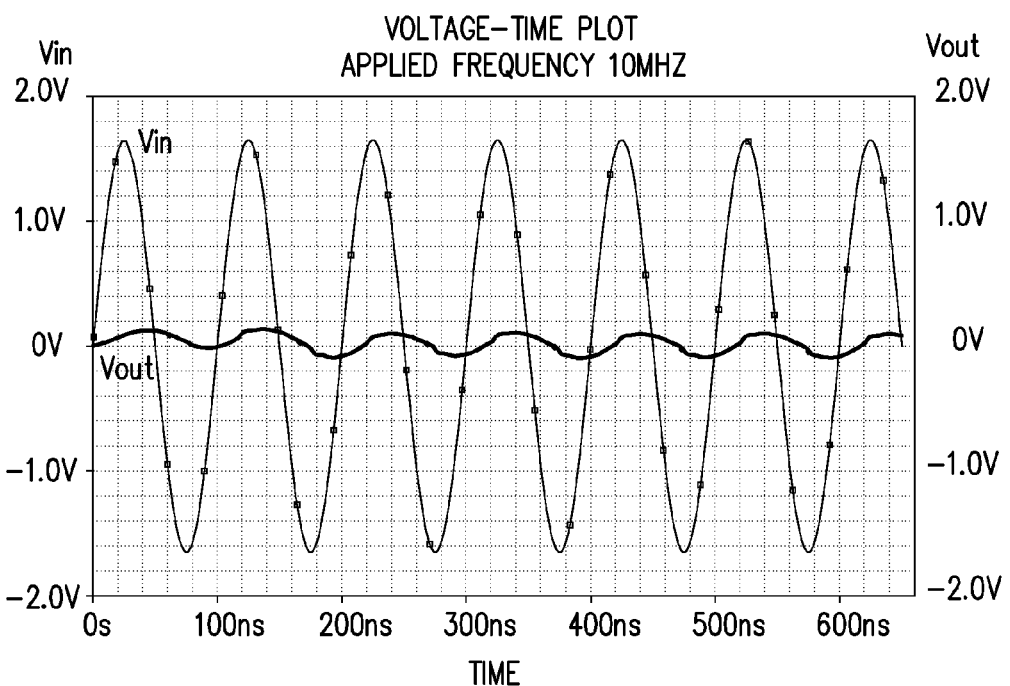
Figure 3F:
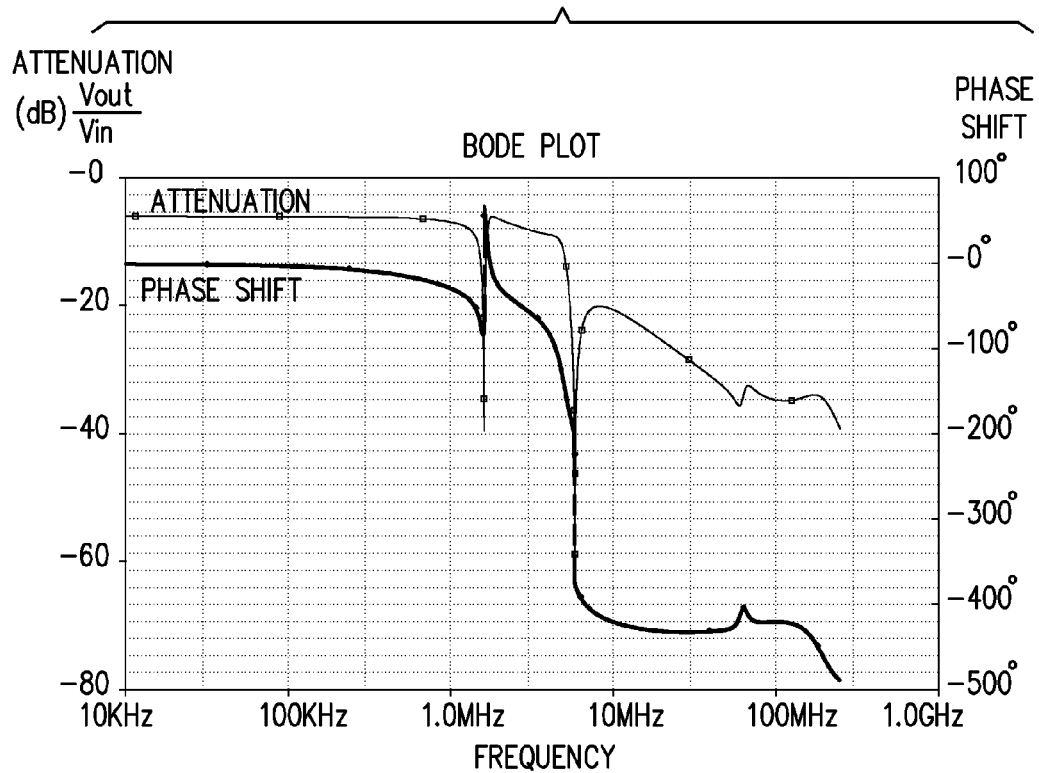
Figure 3F:
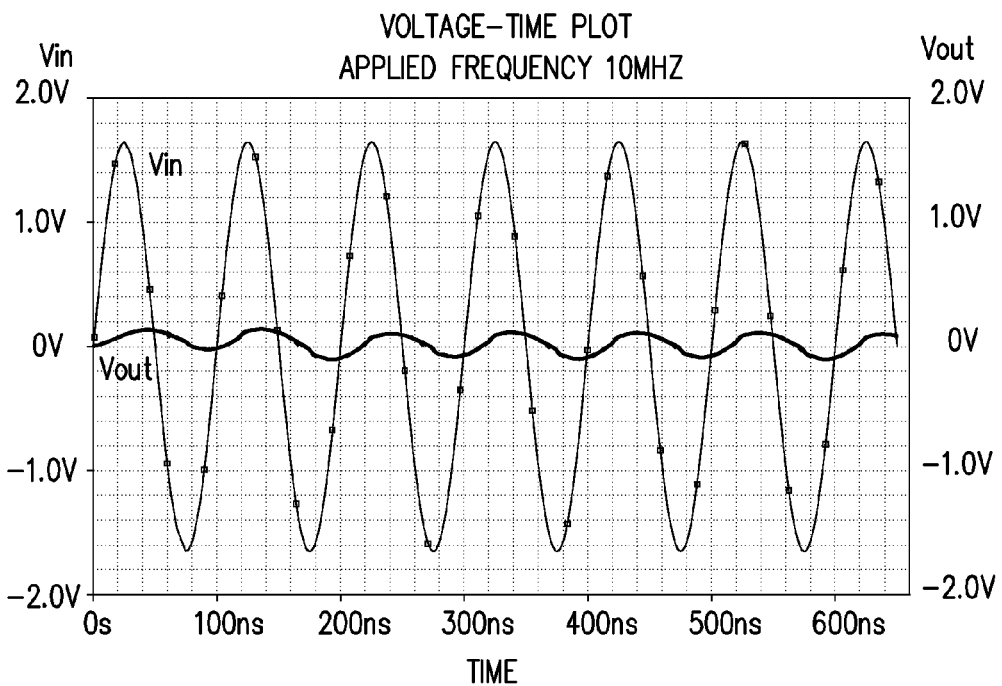
Figure 3G:
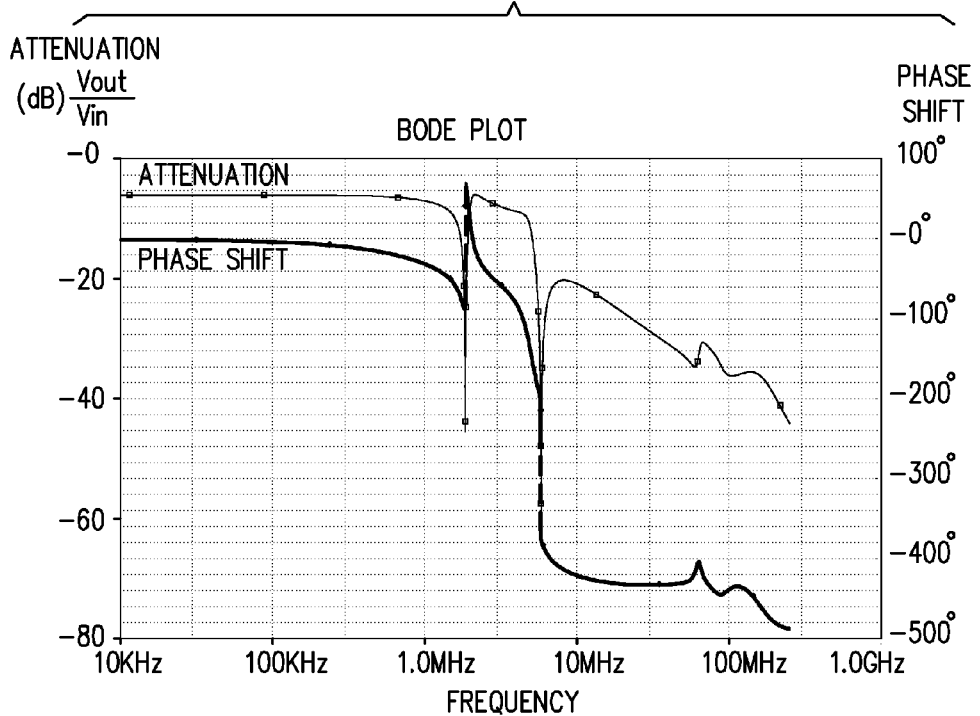
Figure 3G:
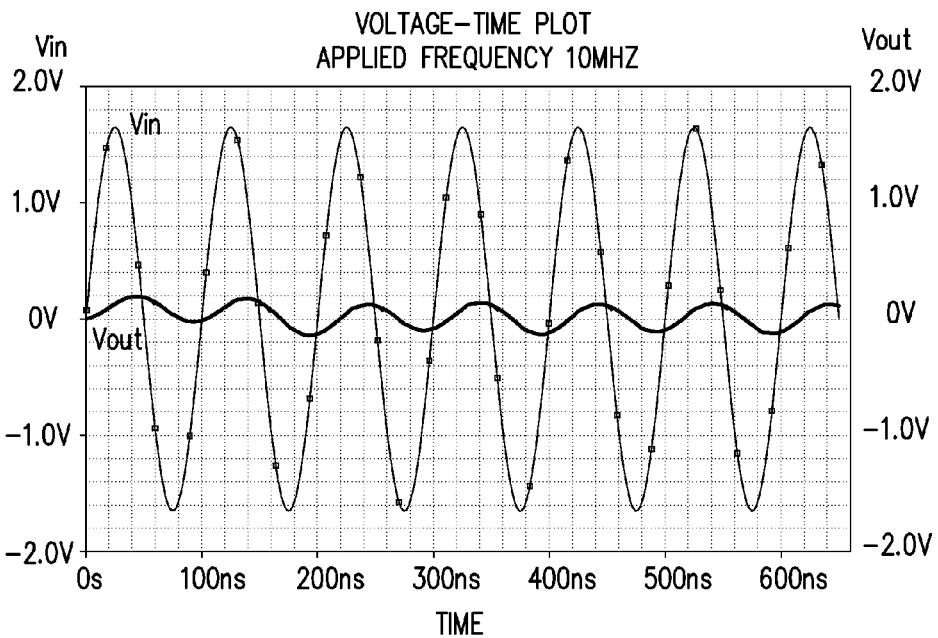
Figure 3H:
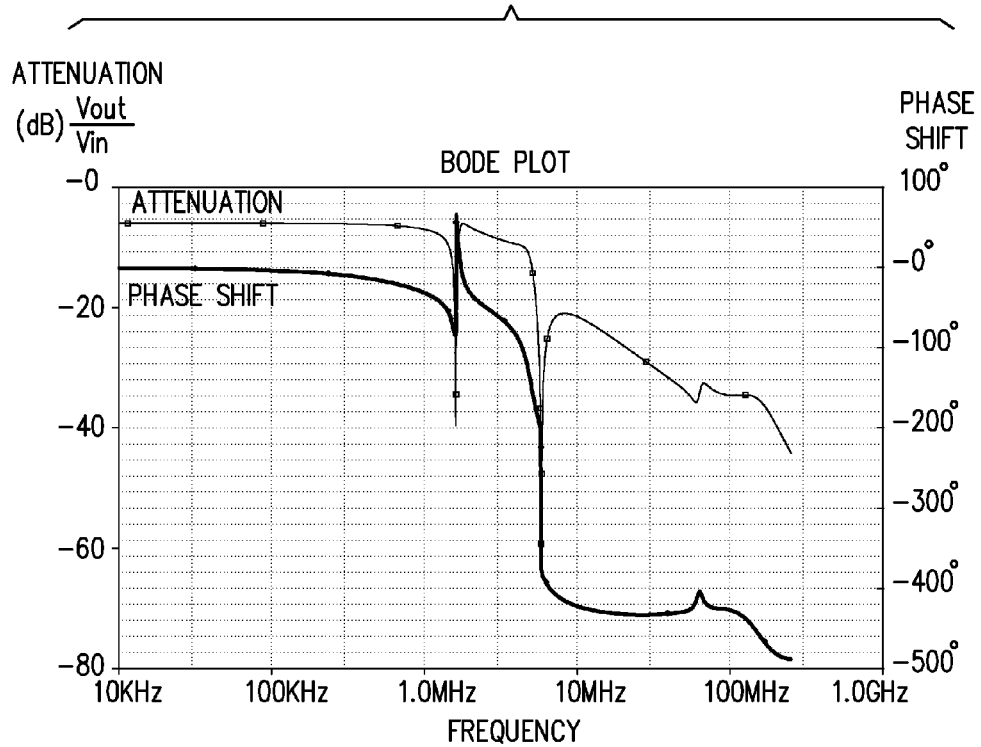
Figure 3H:
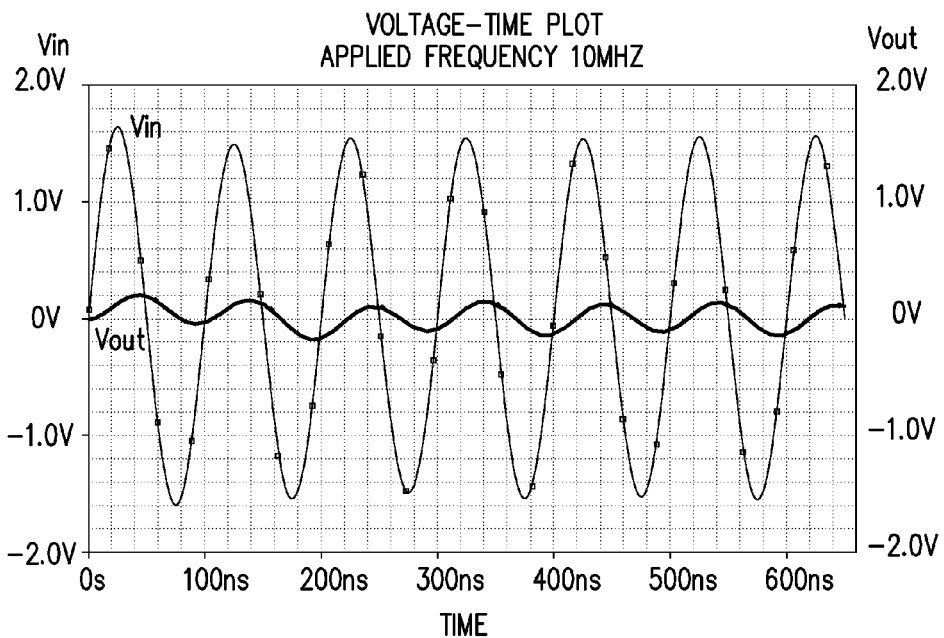
Figure 4A:
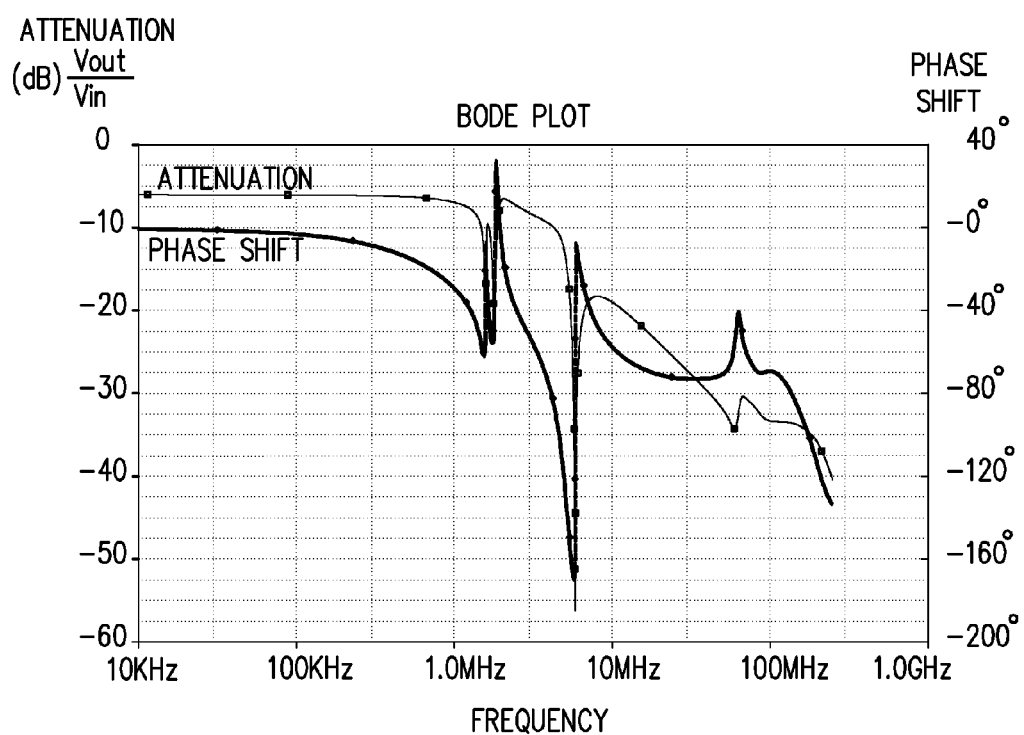
FIGS. 4A-4H are simplified signal diagrams corresponding to effective circuits A-H illustrated in FIG. 2B for a simple time-varying applied signal.
Figure 4A:
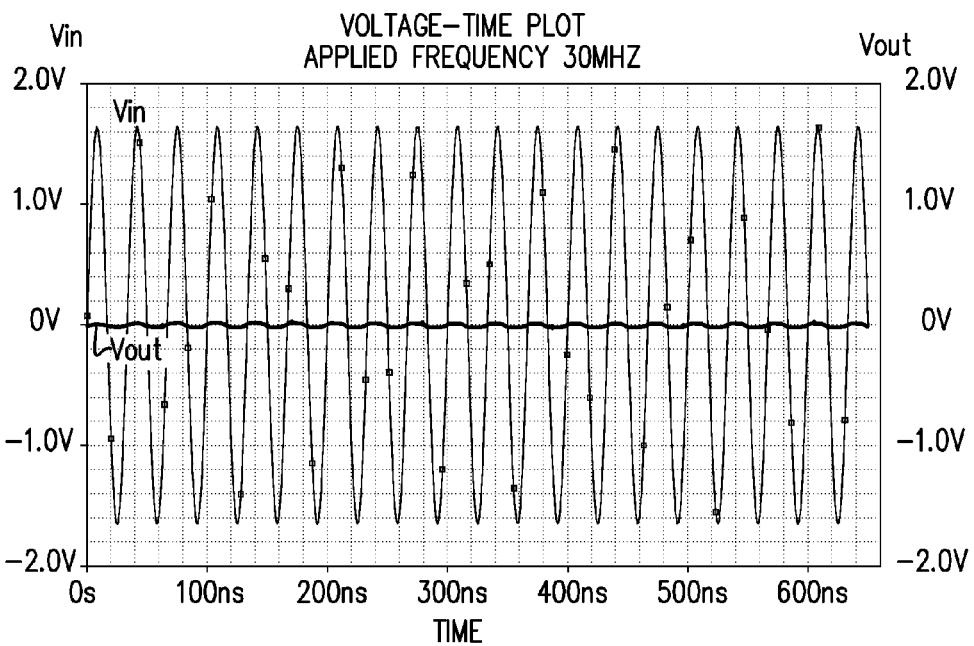
Figure 4B:
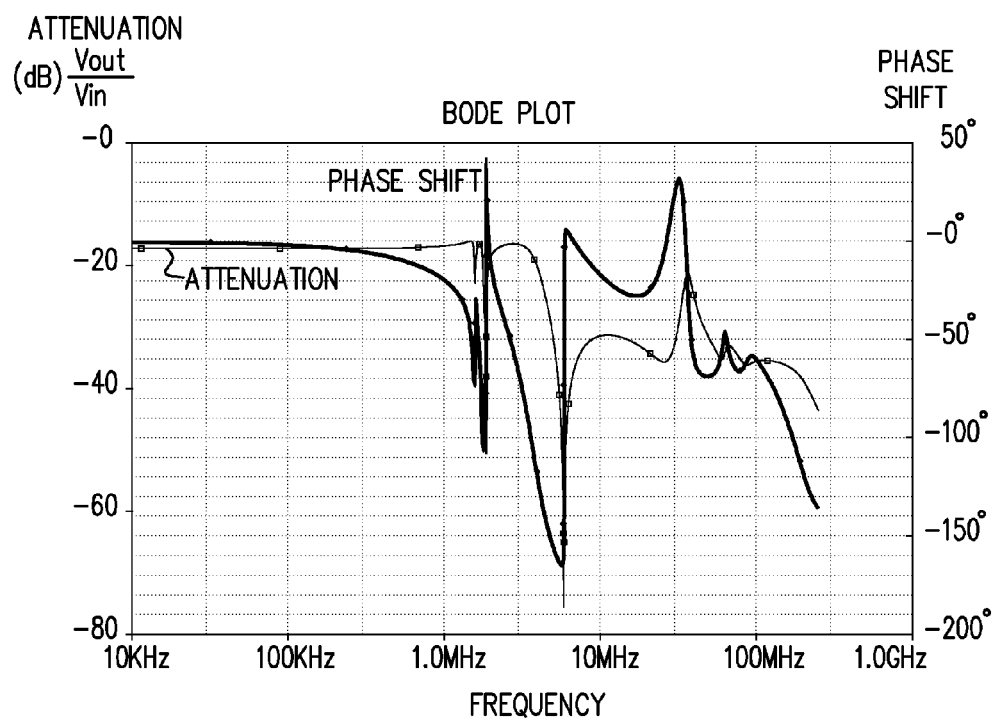
Figure 4B:
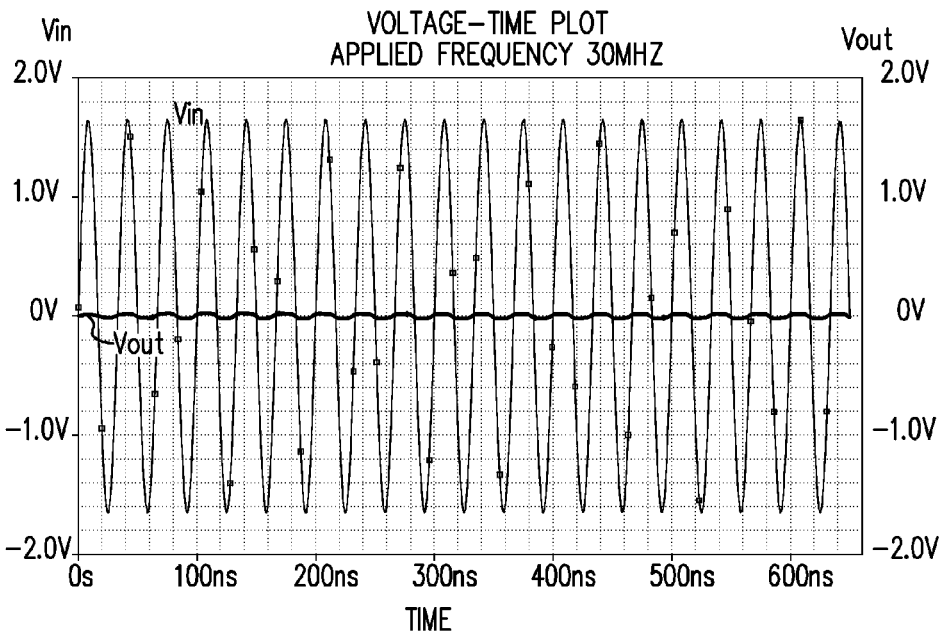
Figure 4C:
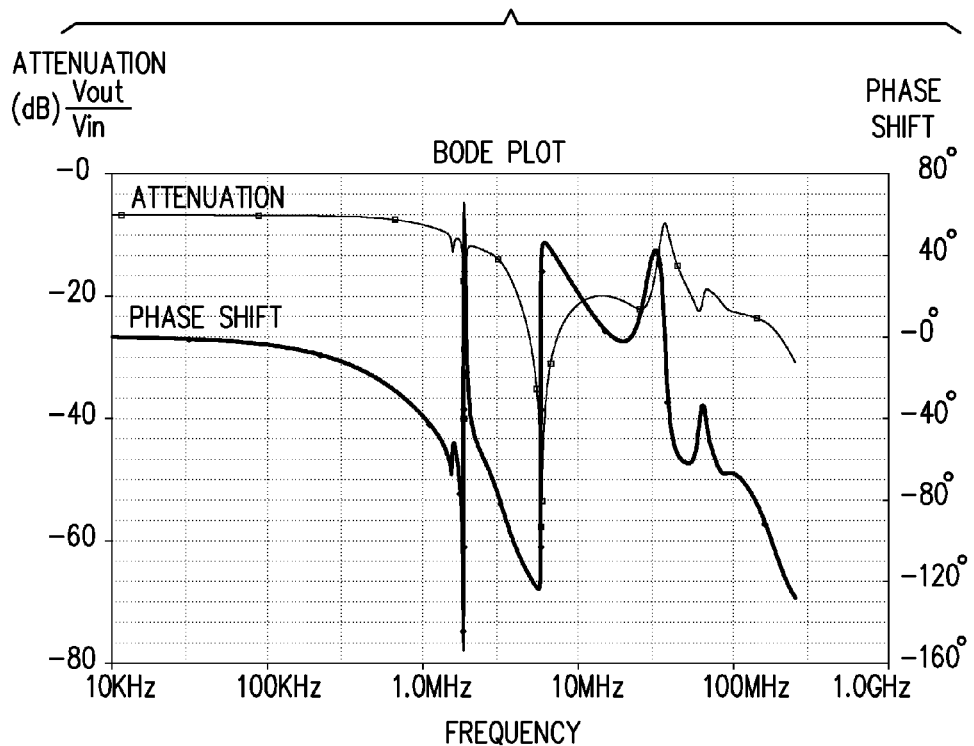
Figure 4C:
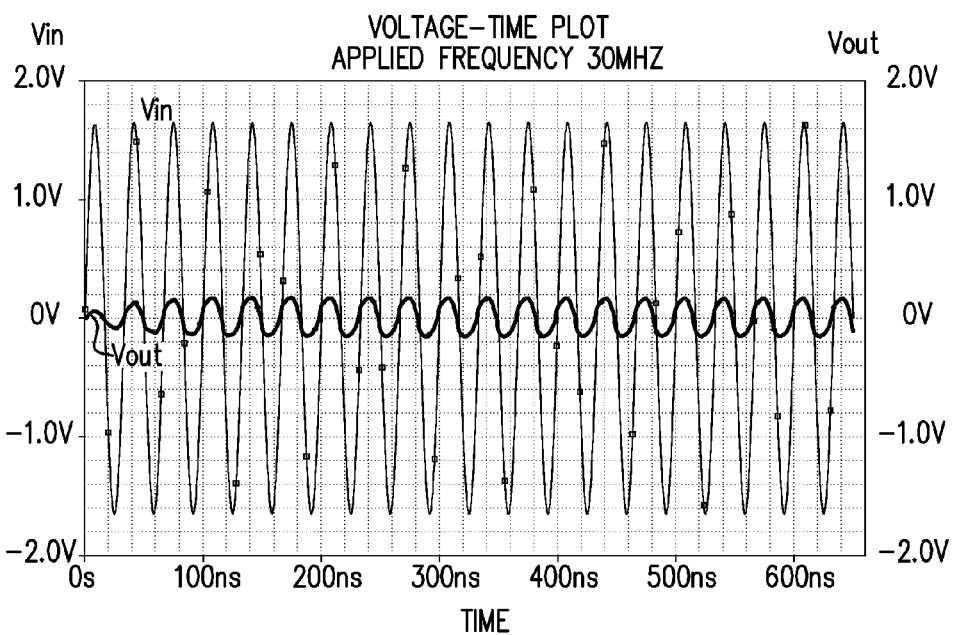
Figure 4D:
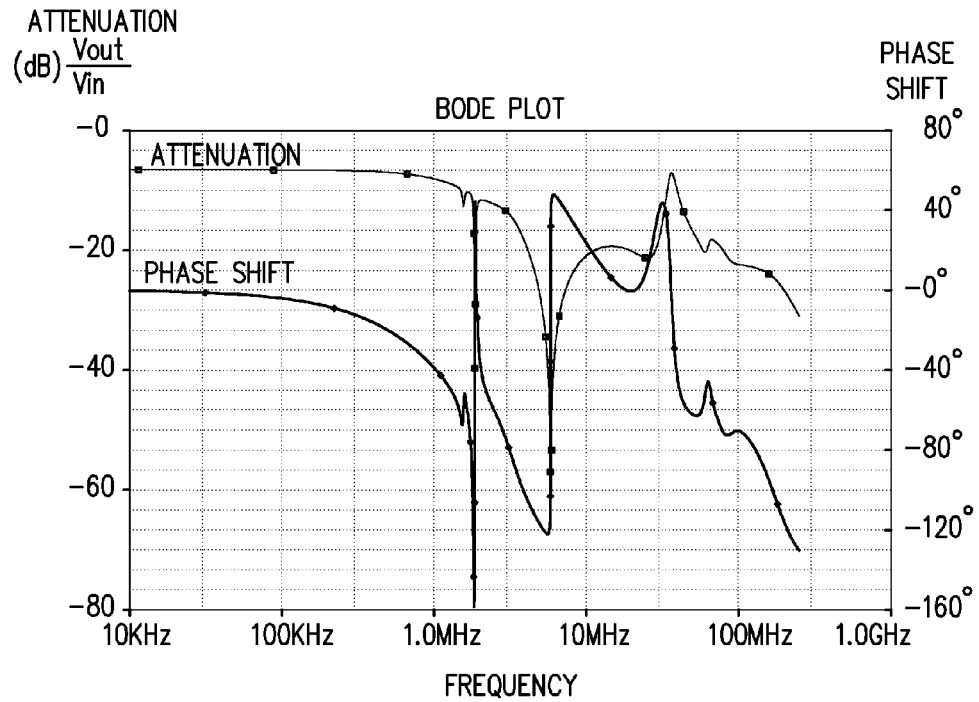
Figure 4D:
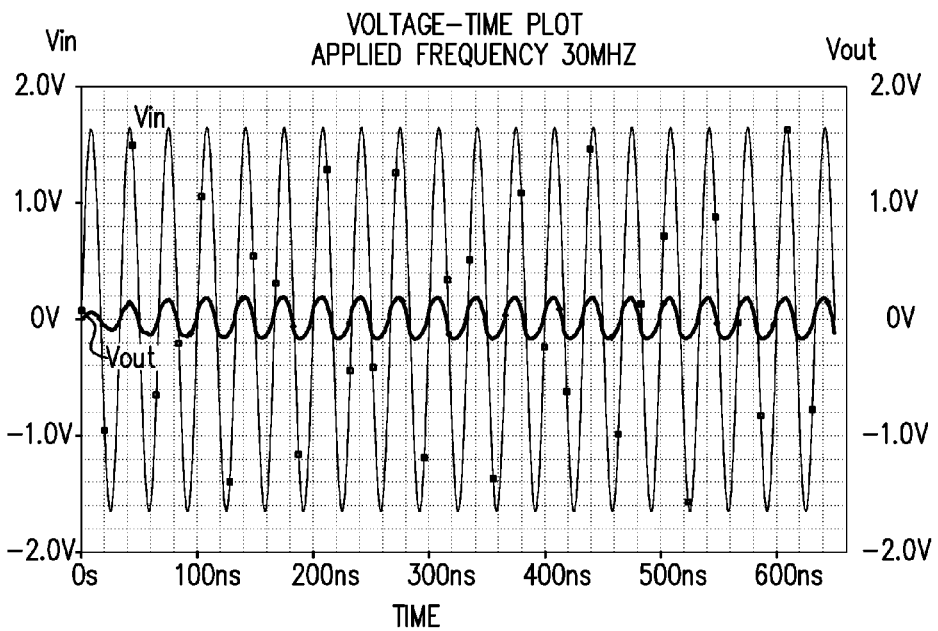
Figure 4E:
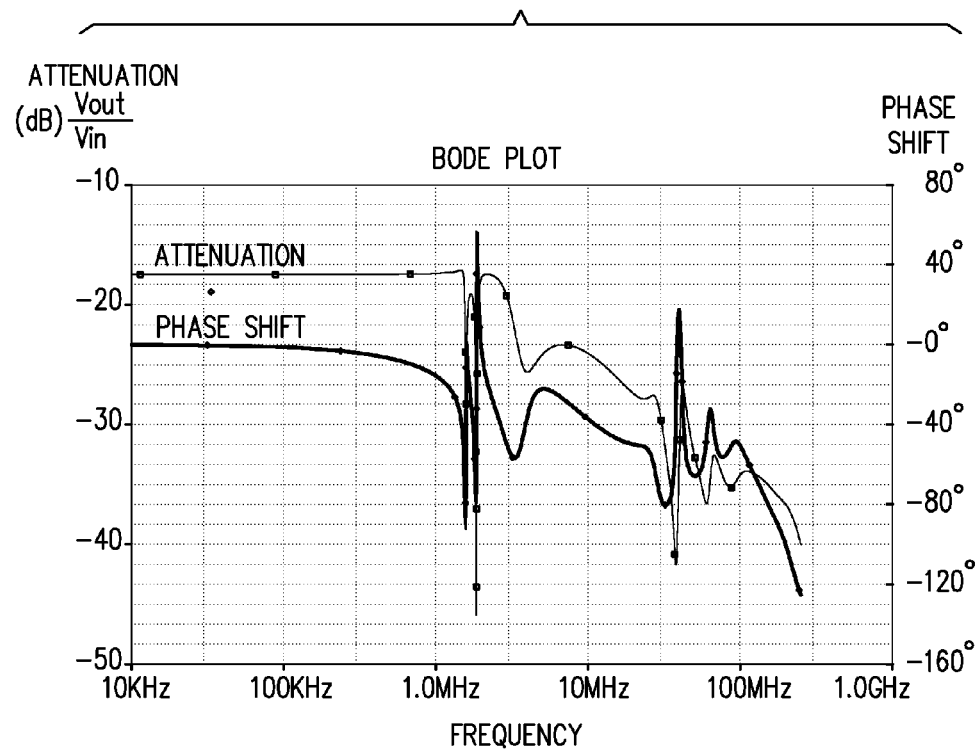
Figure 4E:
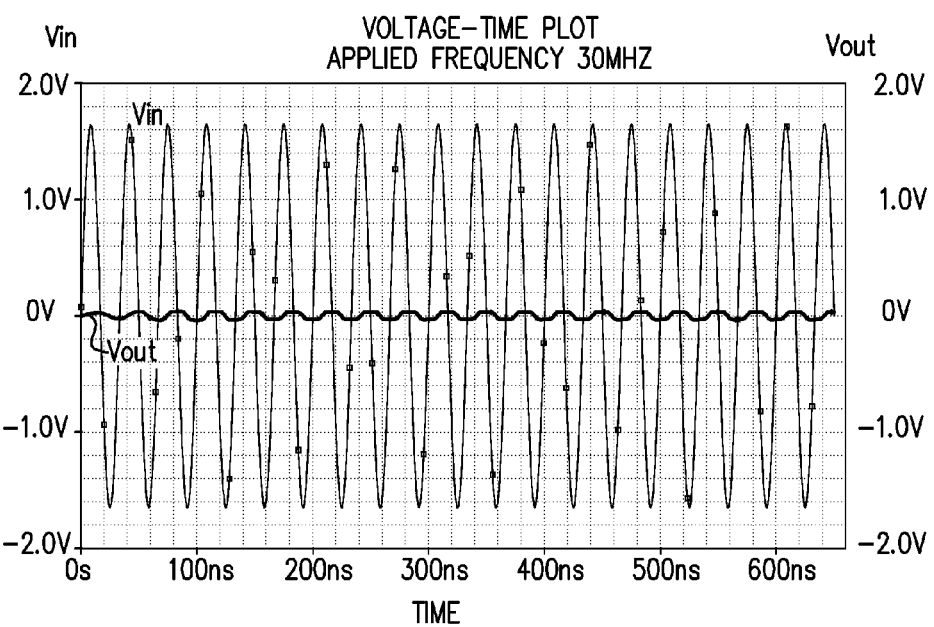
Figure 4F:
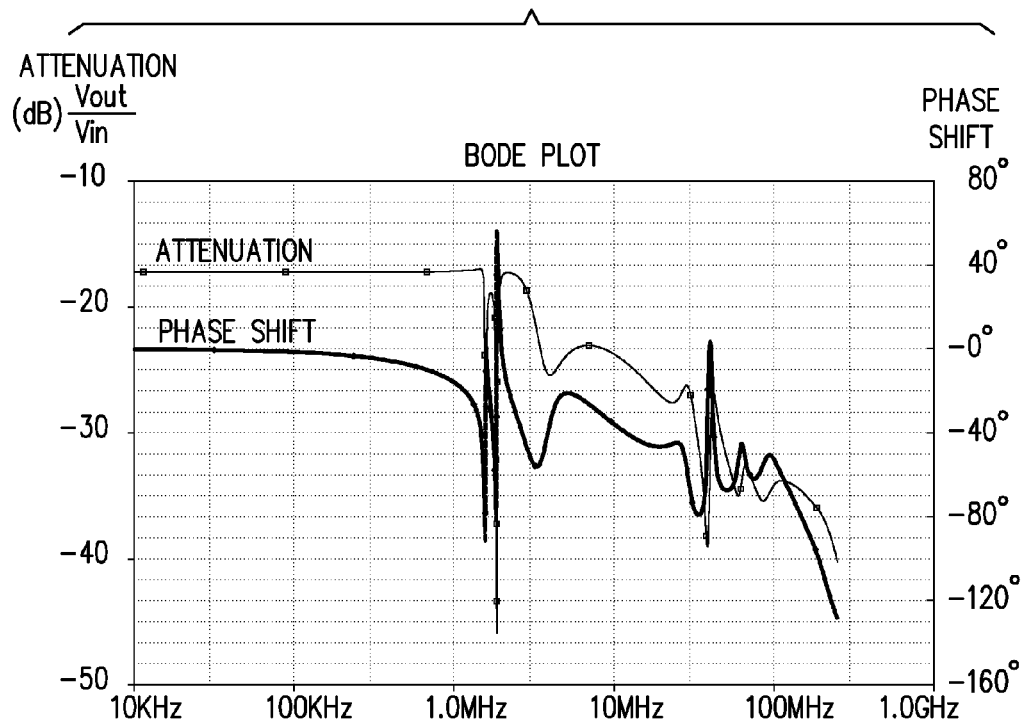
Figure 4F:
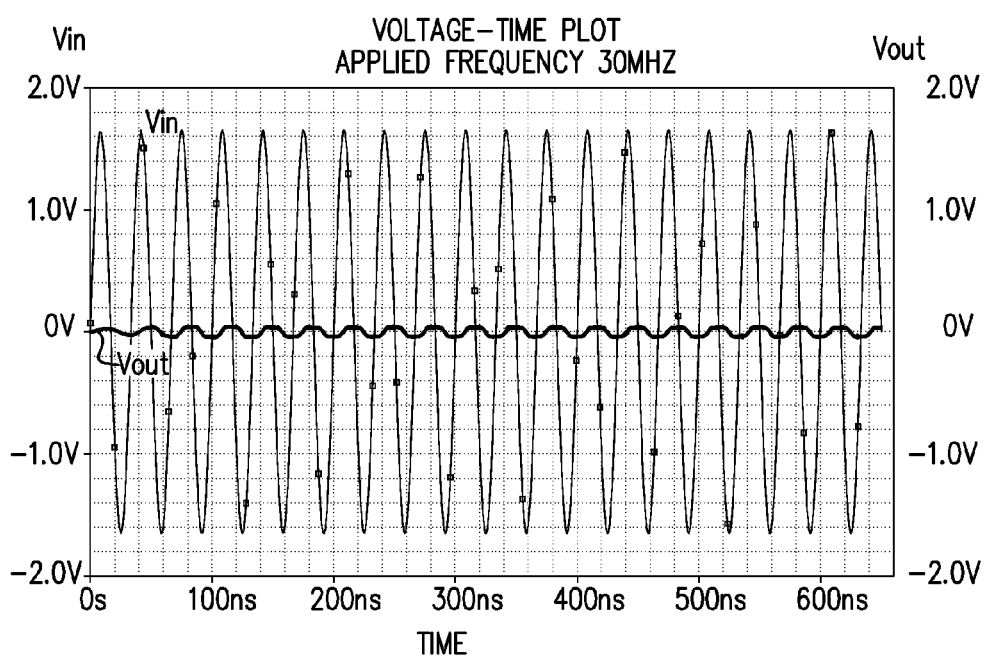
Figure 4G:
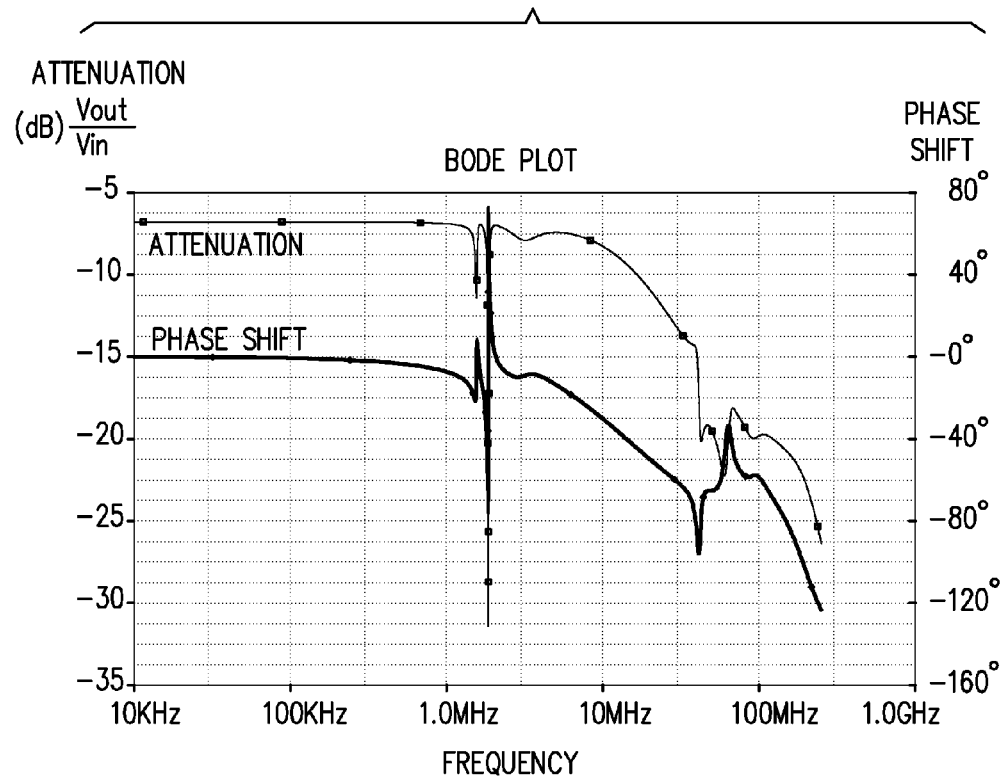
Figure 4G:
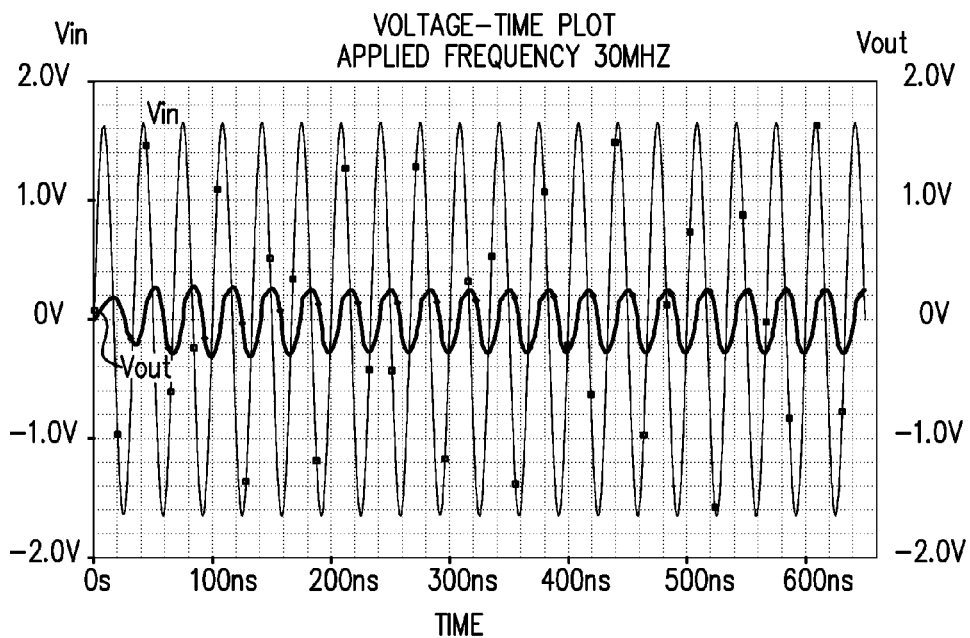
Figure 4H:
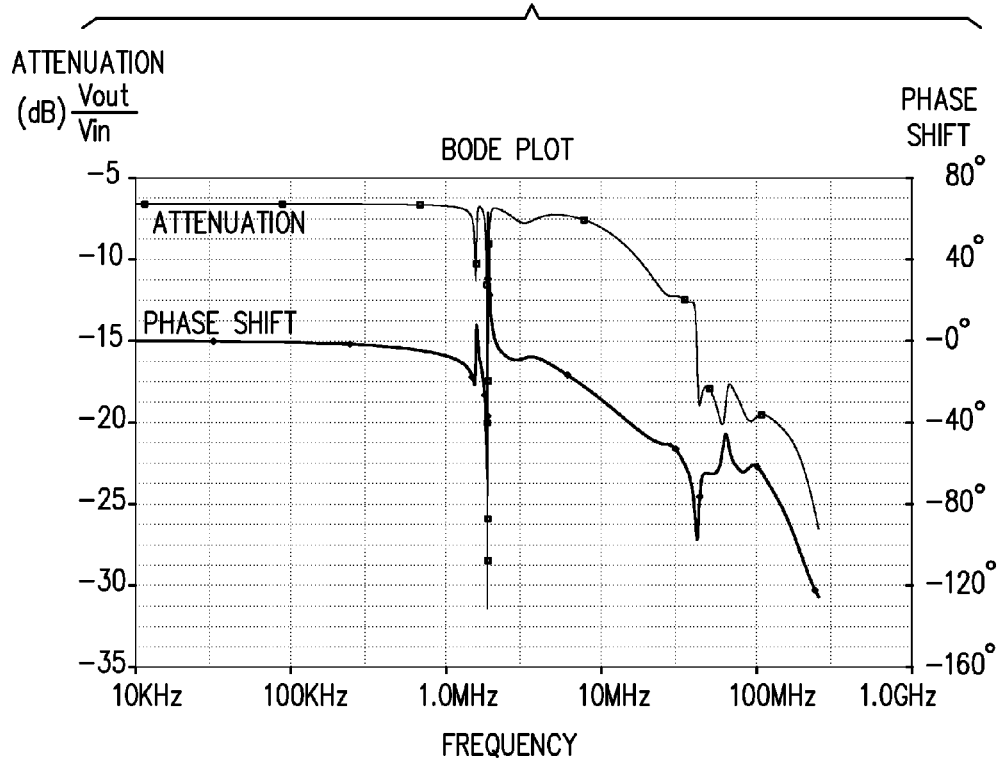
Figure 4H:
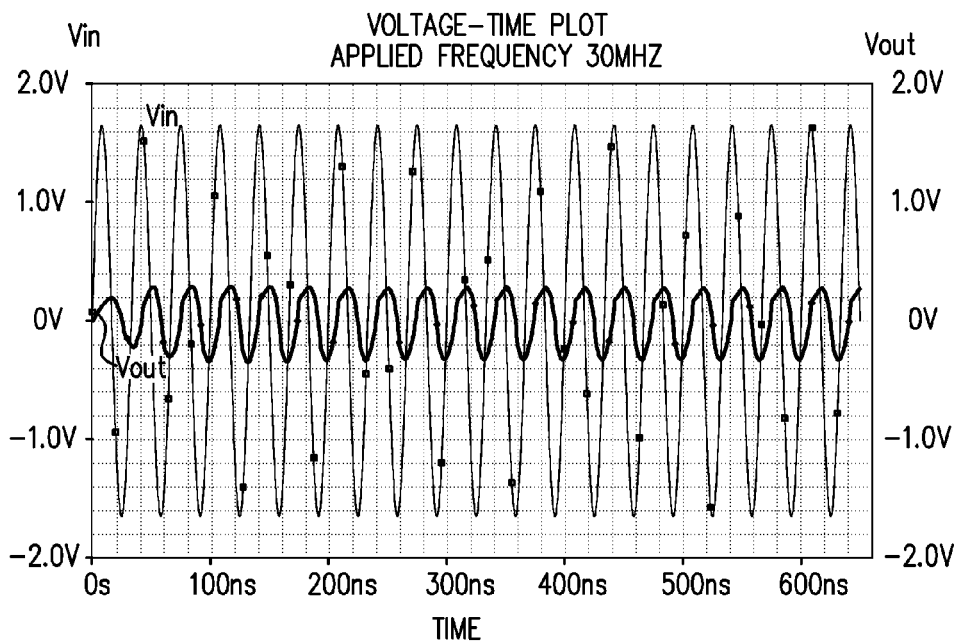
Figure 5A:
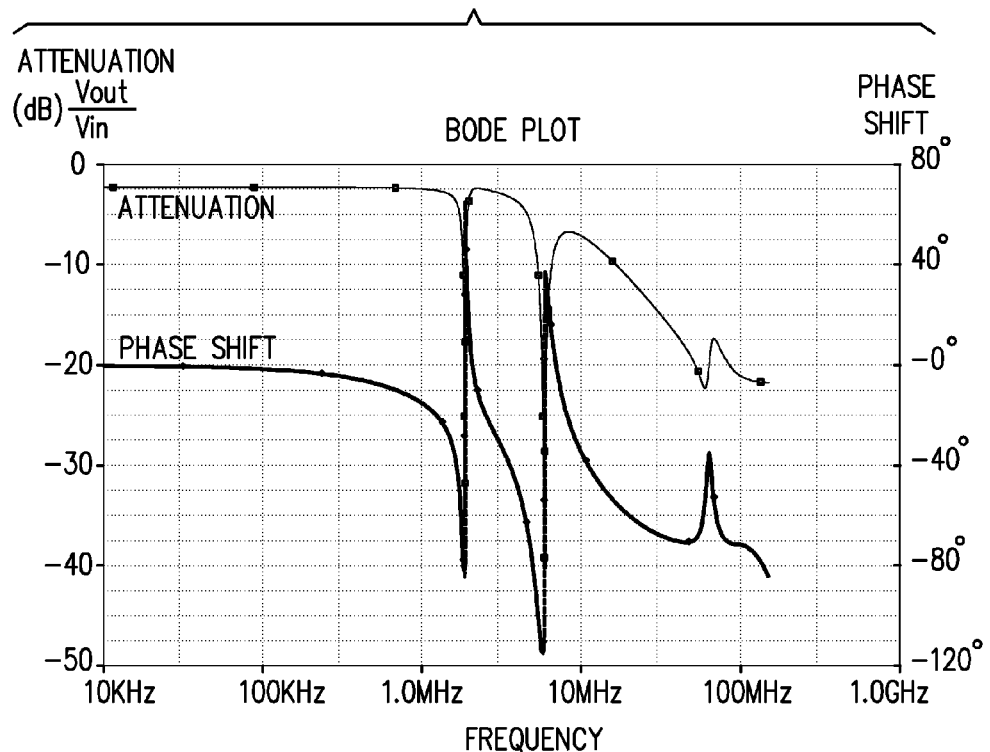
FIGS. 5A-5G are simplified signal diagrams corresponding to effective circuits A-G illustrated in FIG. 2C for a simple time-varying applied signal.
Figure 5A:
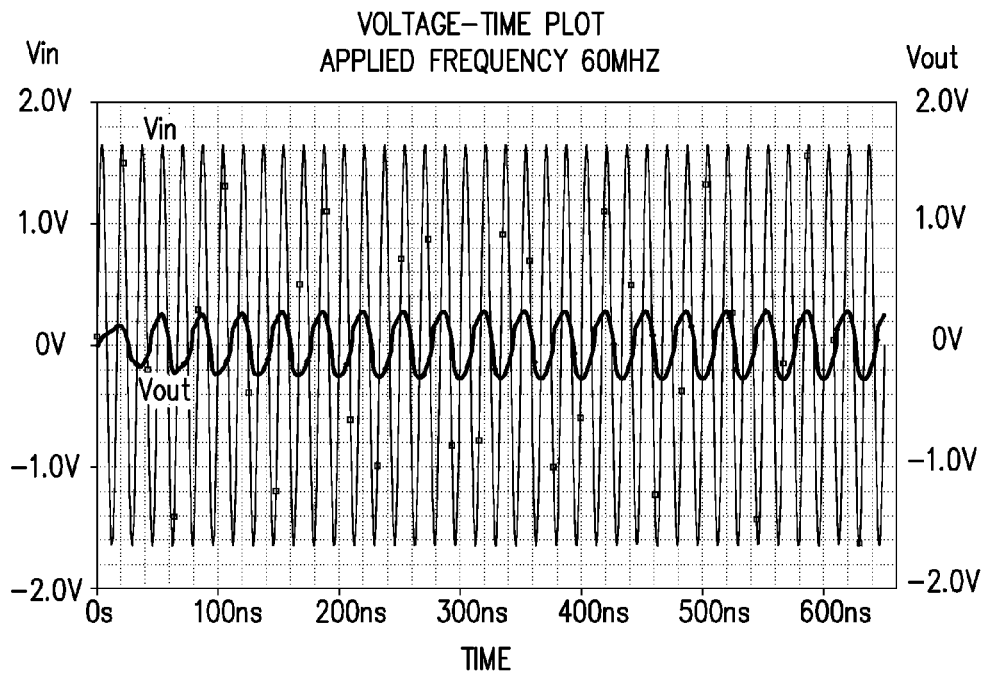
Figure 5B:
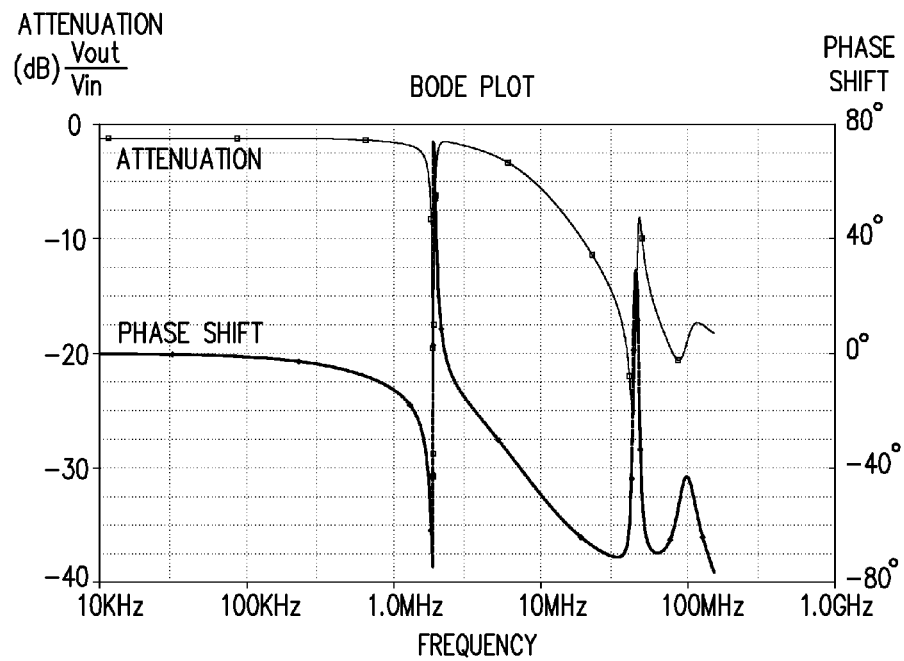
Figure 5B:
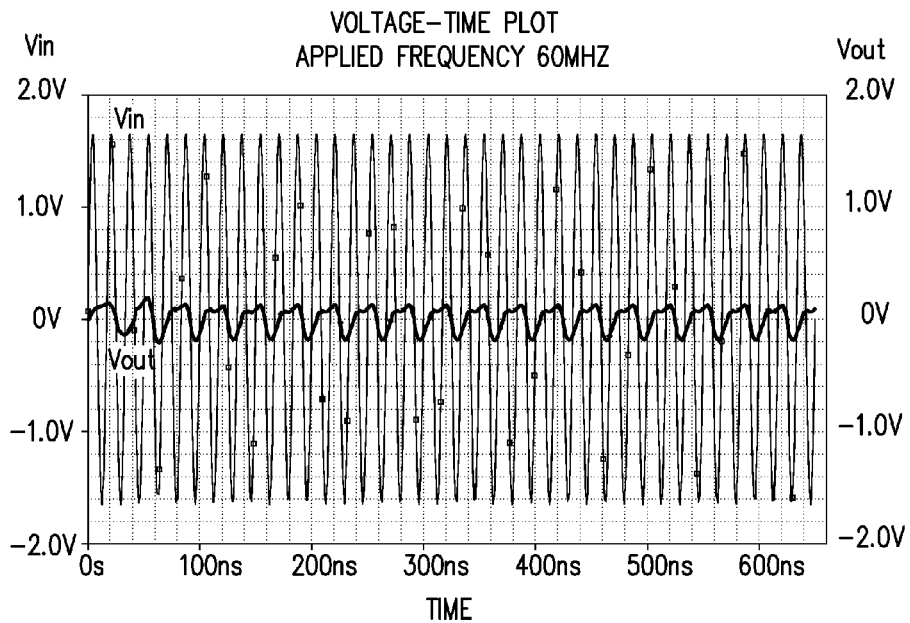
Figure 5C:
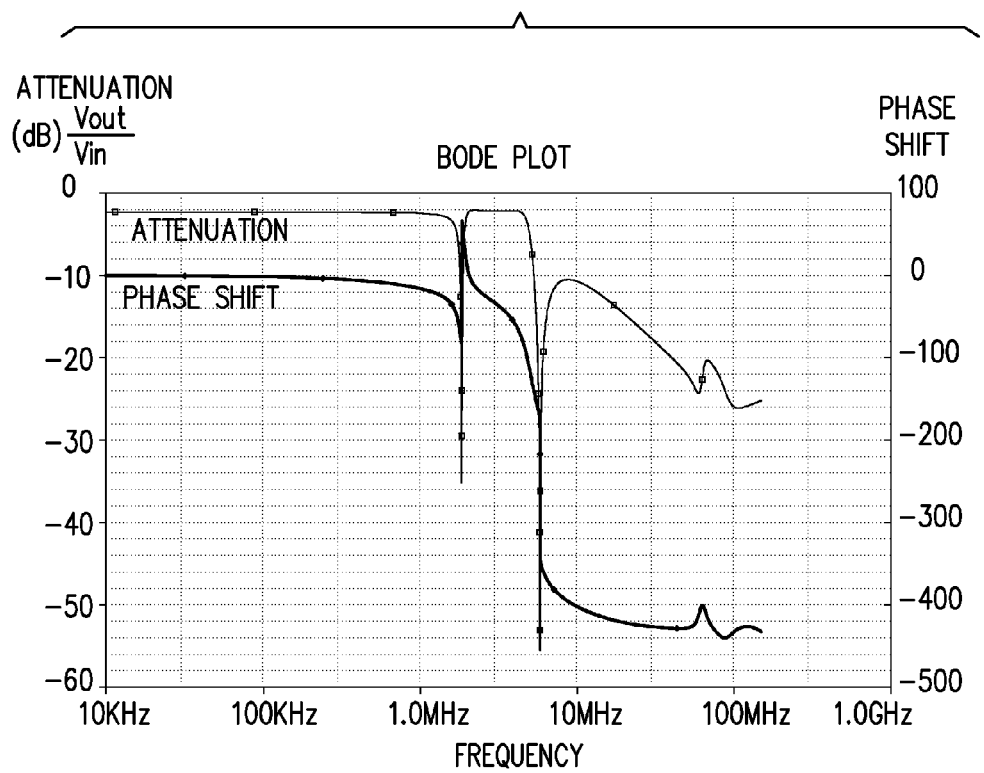
Figure 5C:
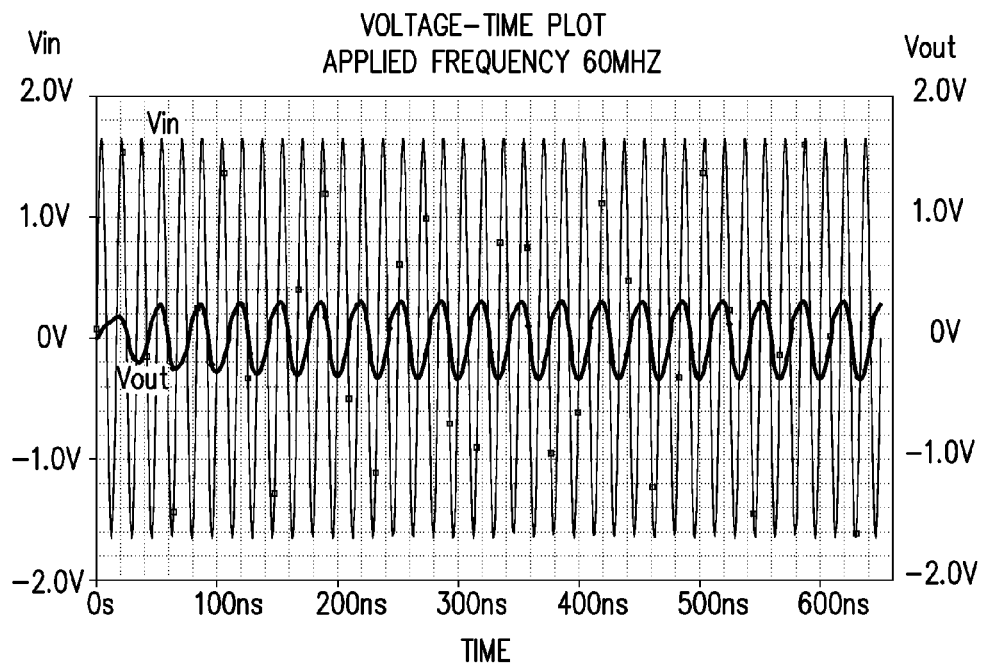
Figure 5D:
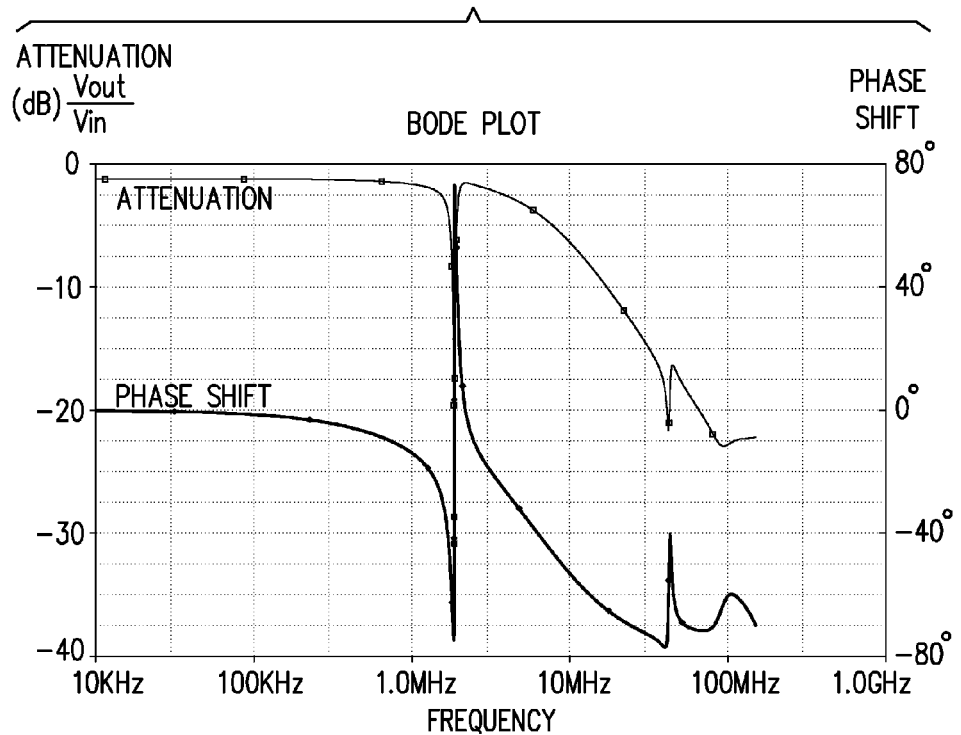
Figure 5D:
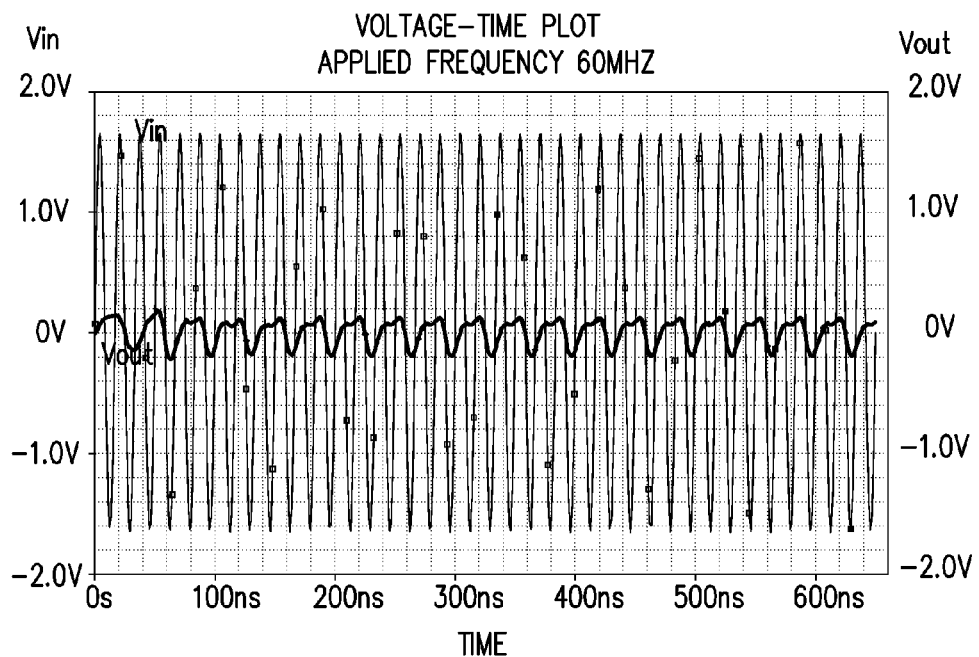
Figure 5E:
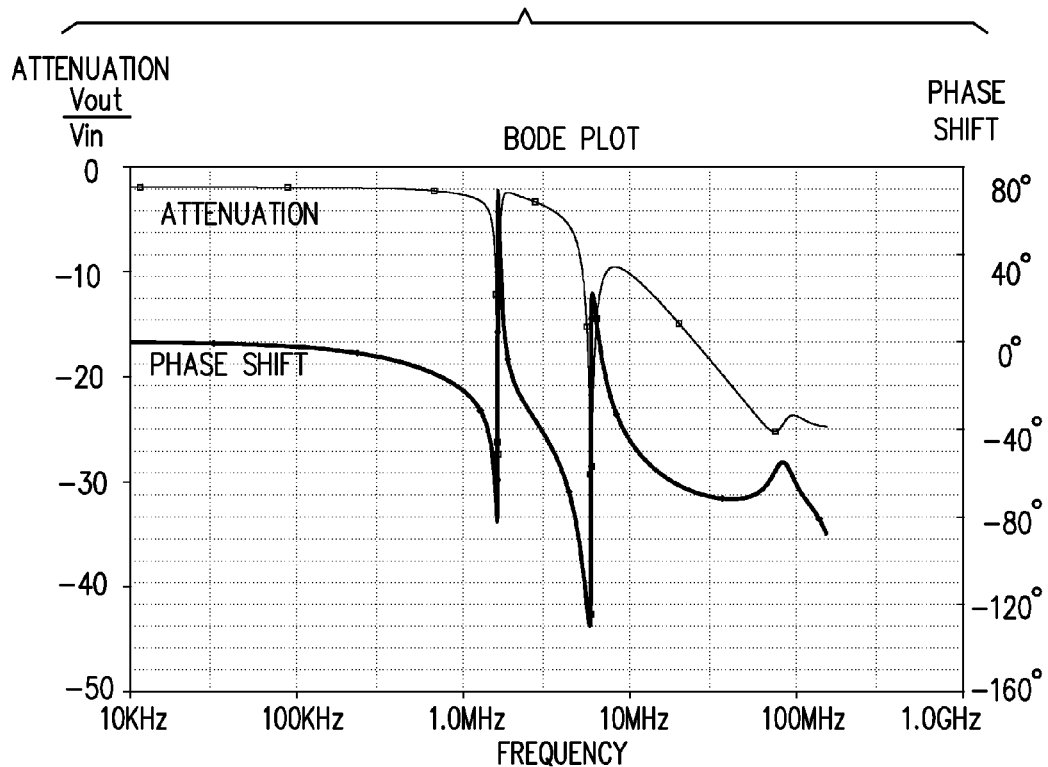
Figure 5E:
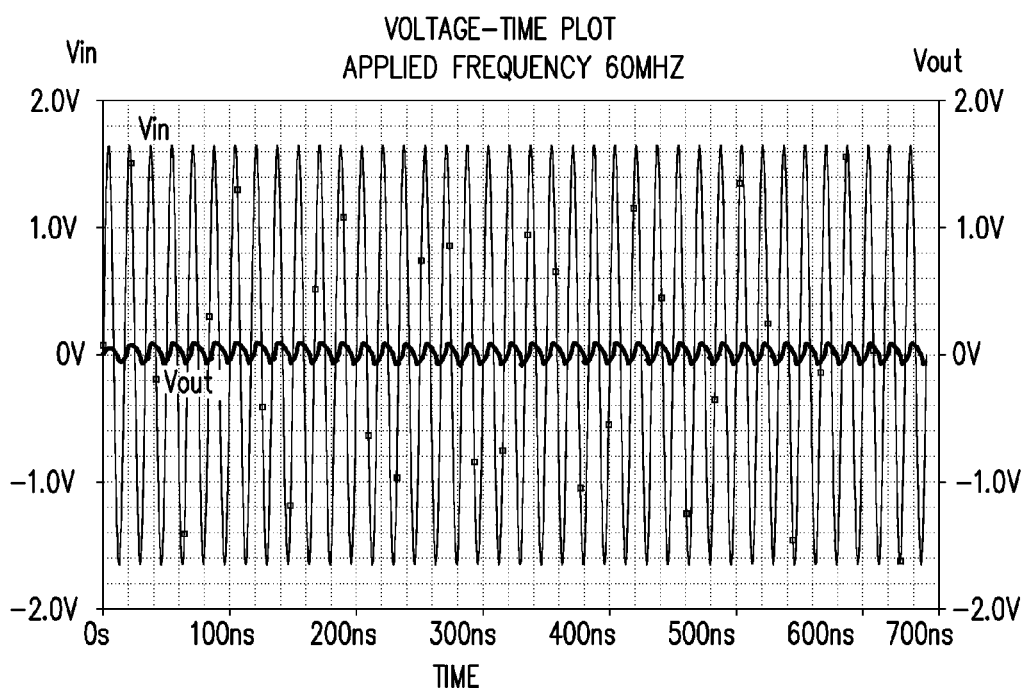
Figure 5F:
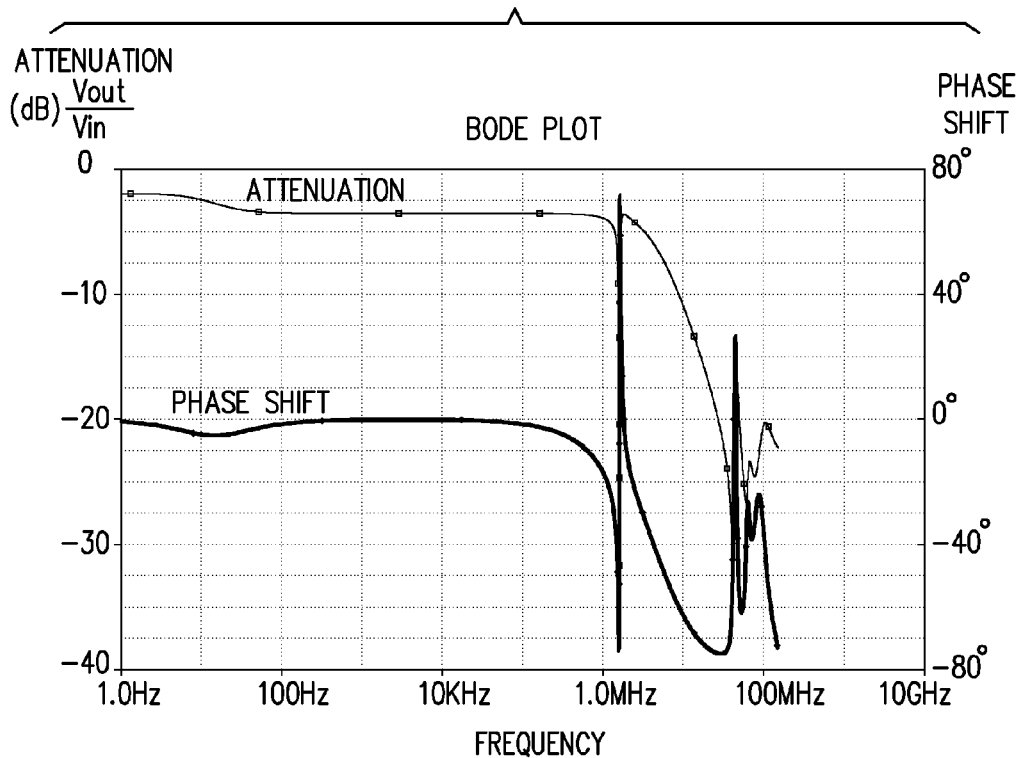
Figure 5F:
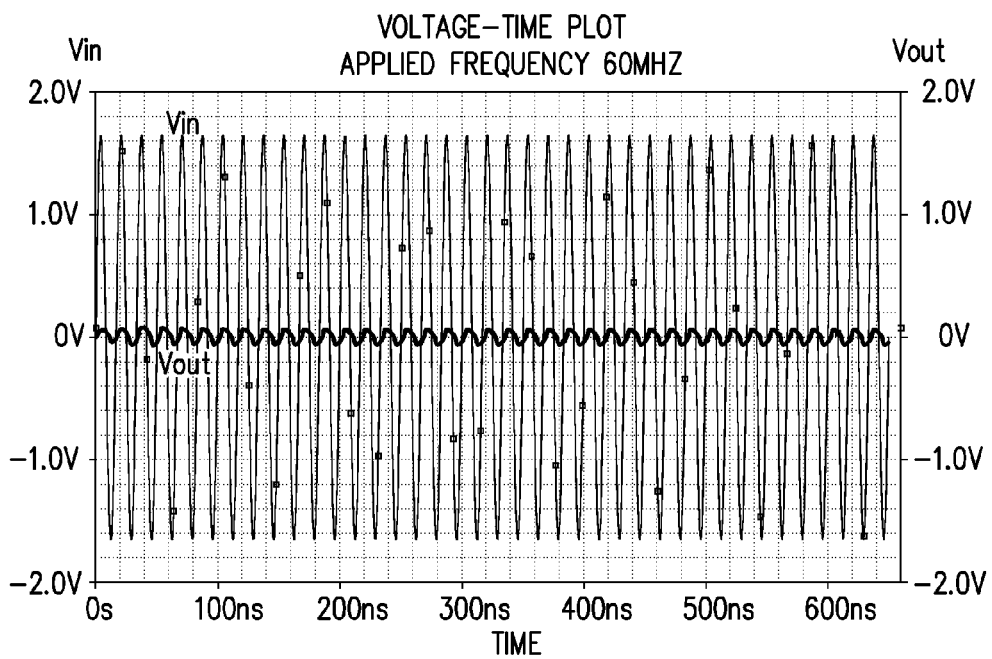
Figure 5G:
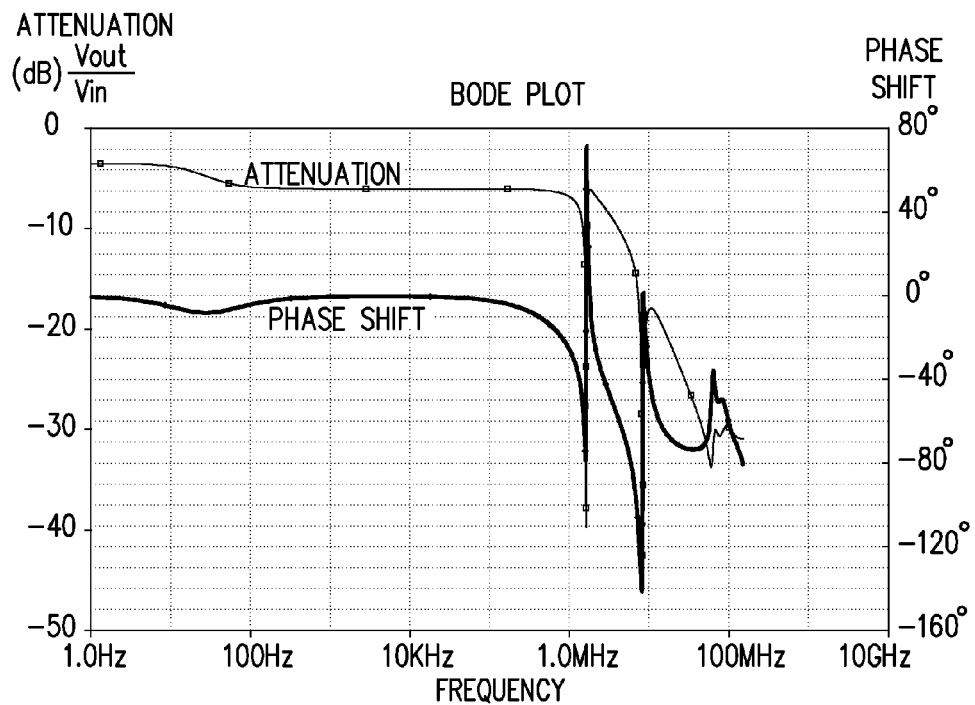
Figure 5G:
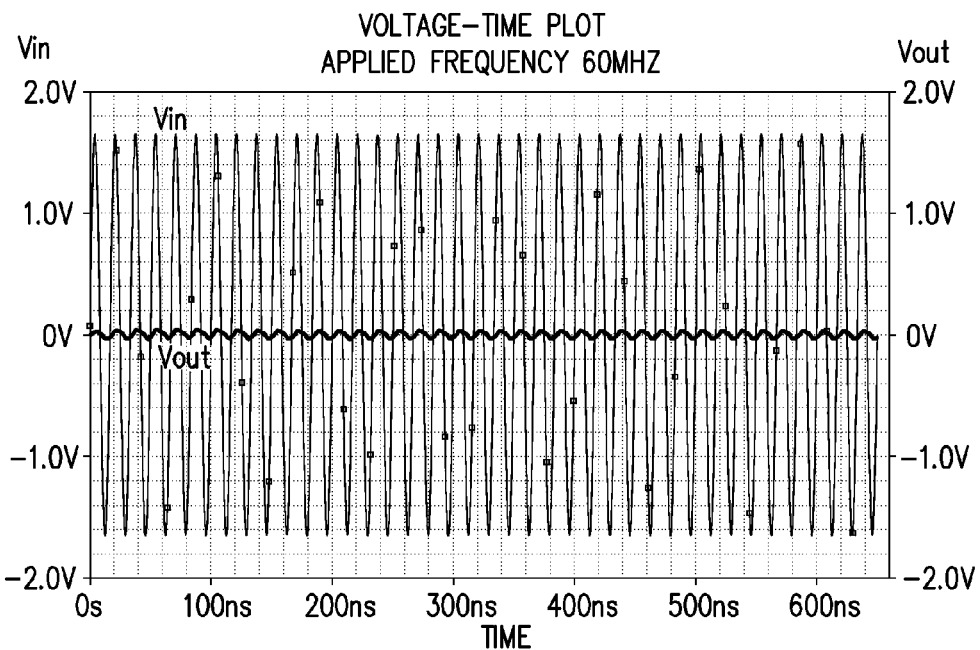
Figure 6A:
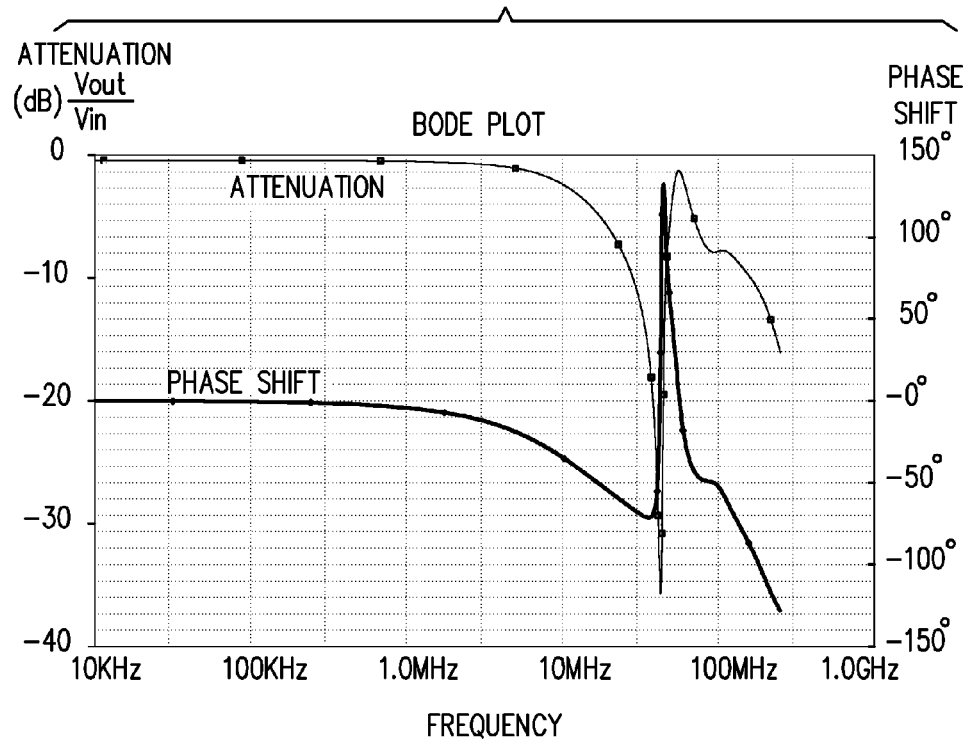
Figure 6A:
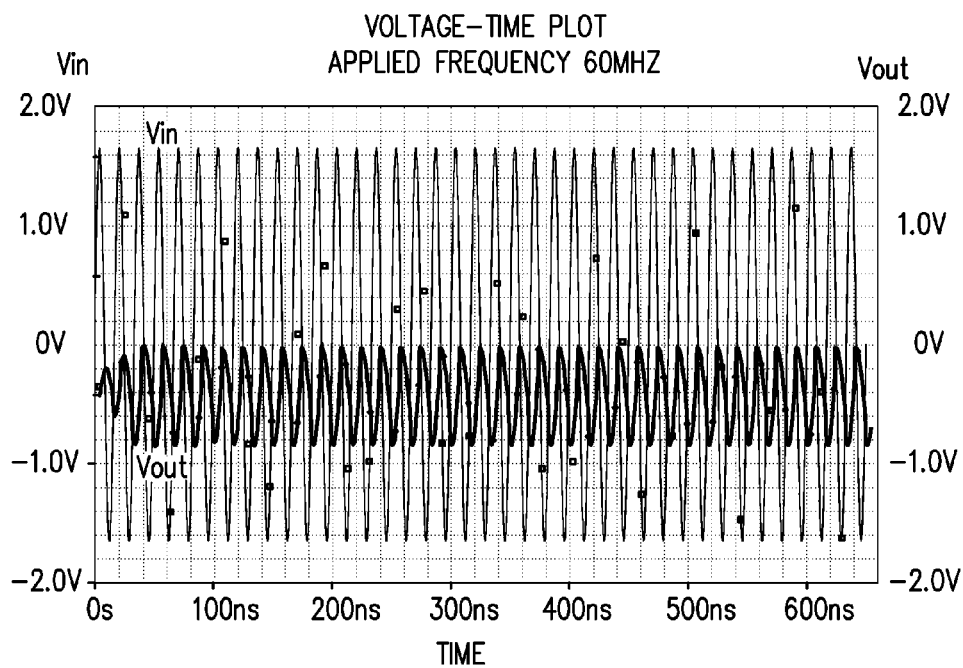
Figure 6B:
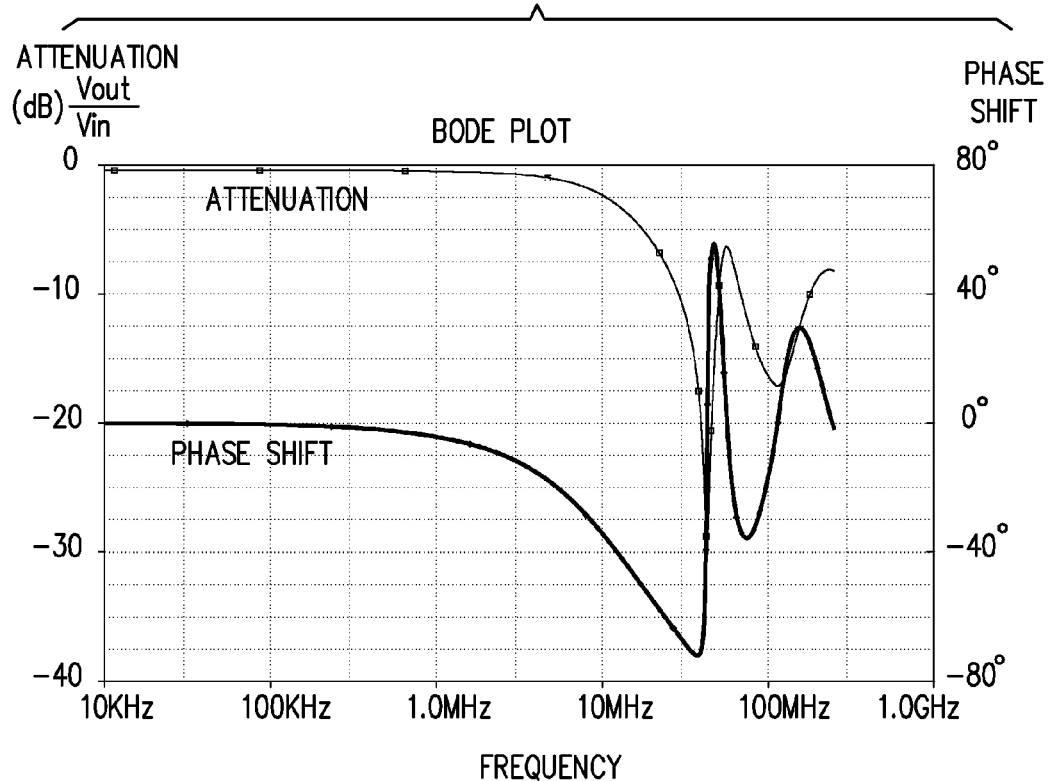
Figure 6B:
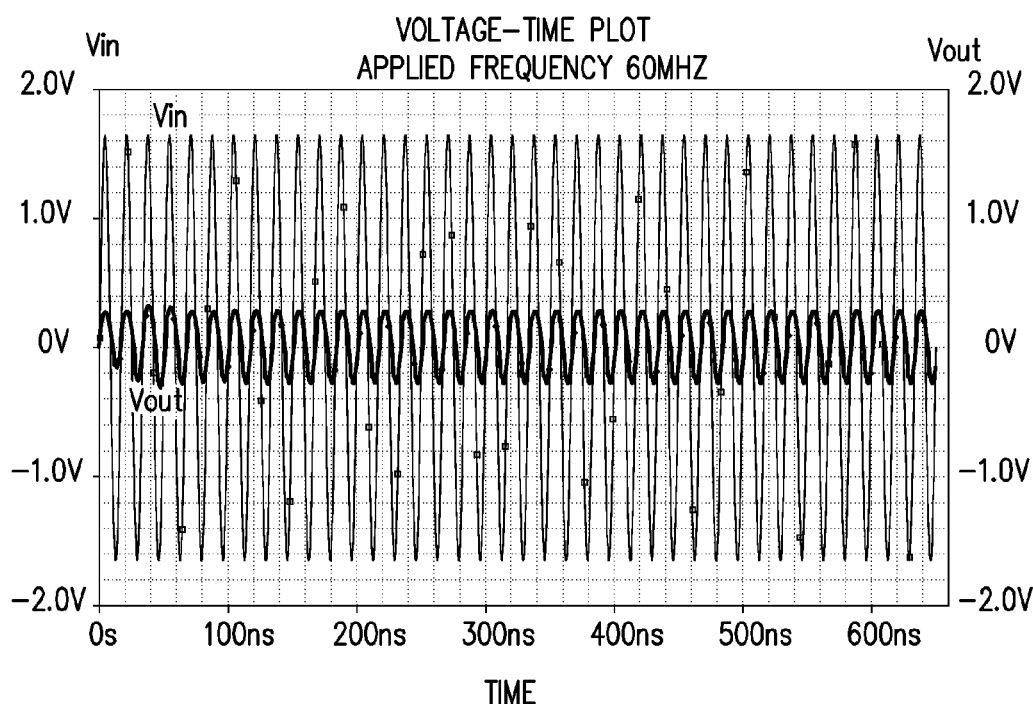
Figure 6D:
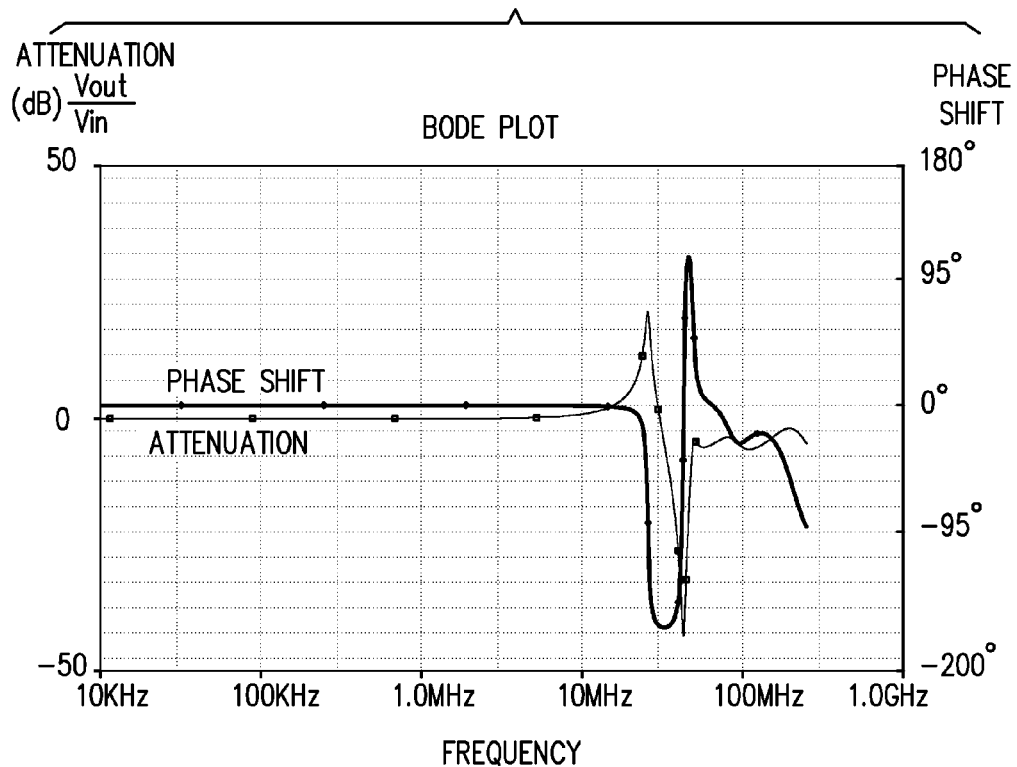
Figure 6D:
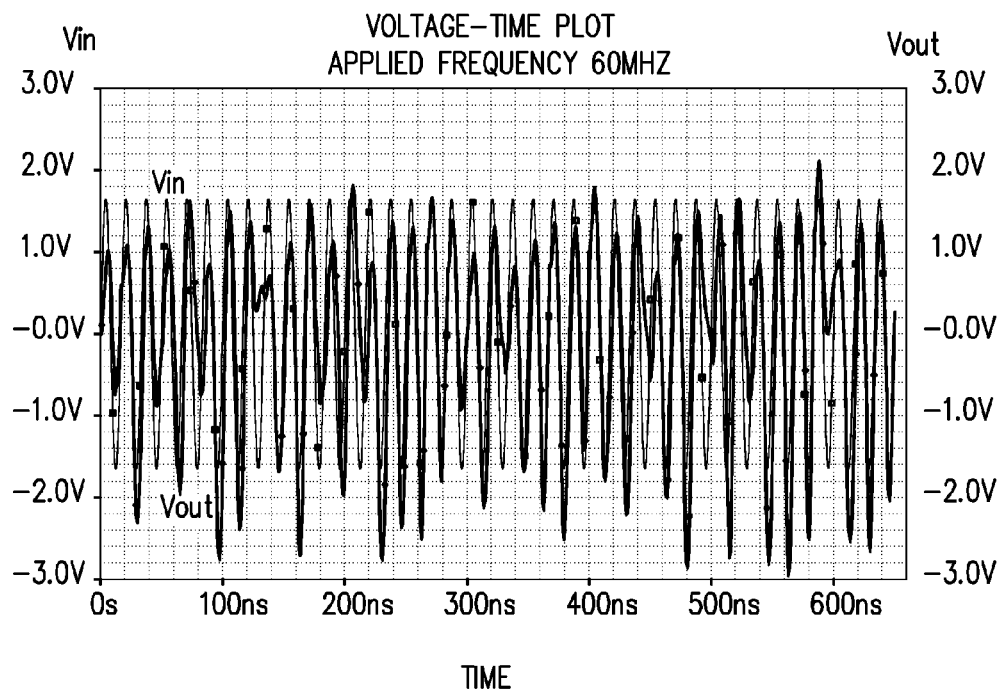
Figure 6E:
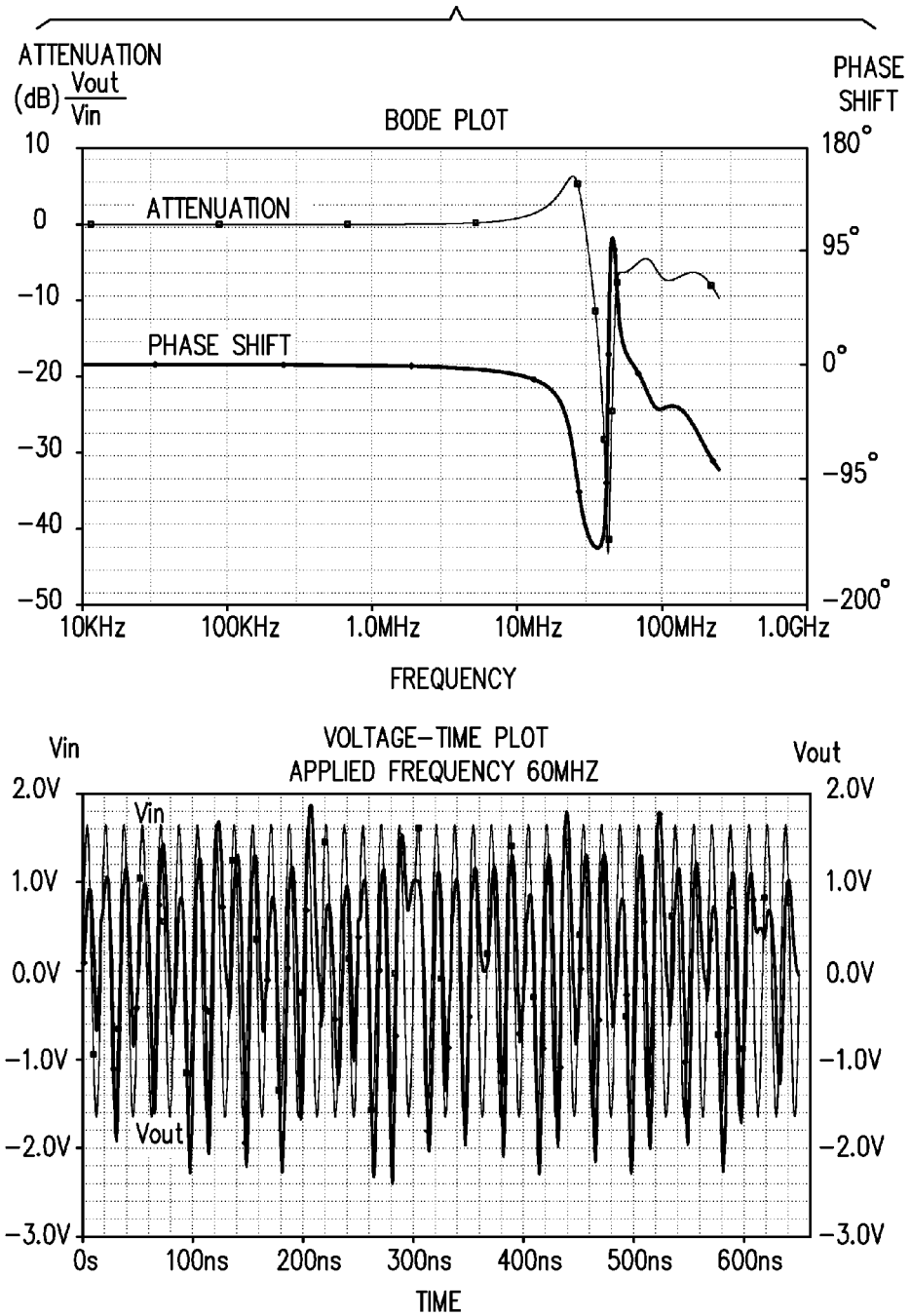
Figure 6F:
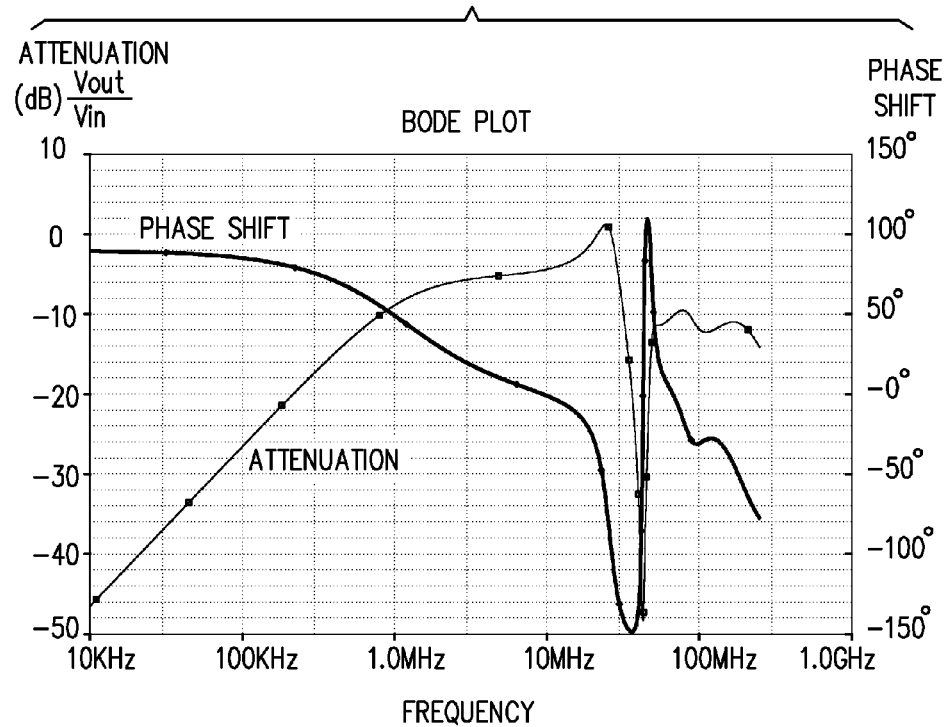
Figure 6F:
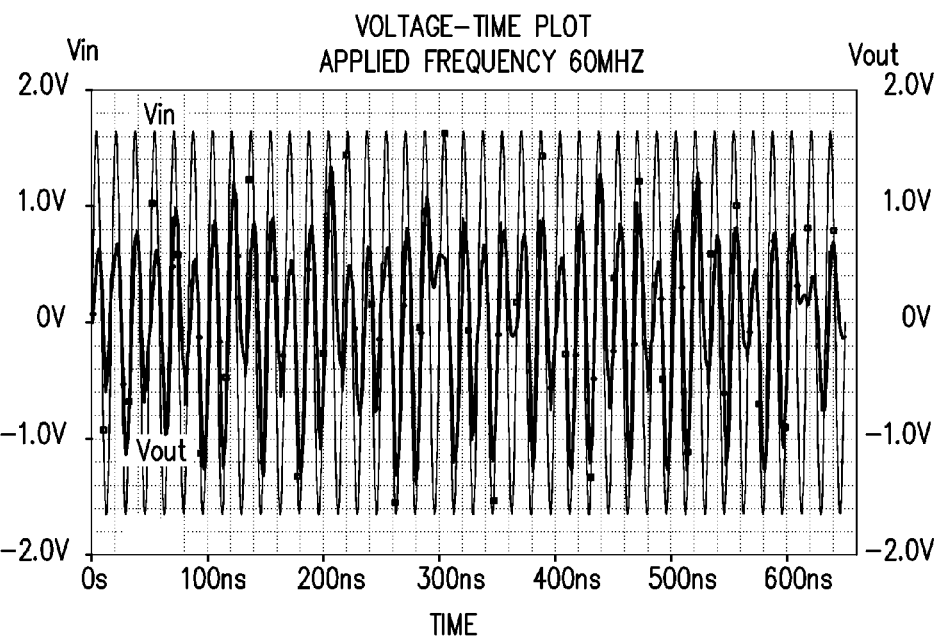
Figure 7A:
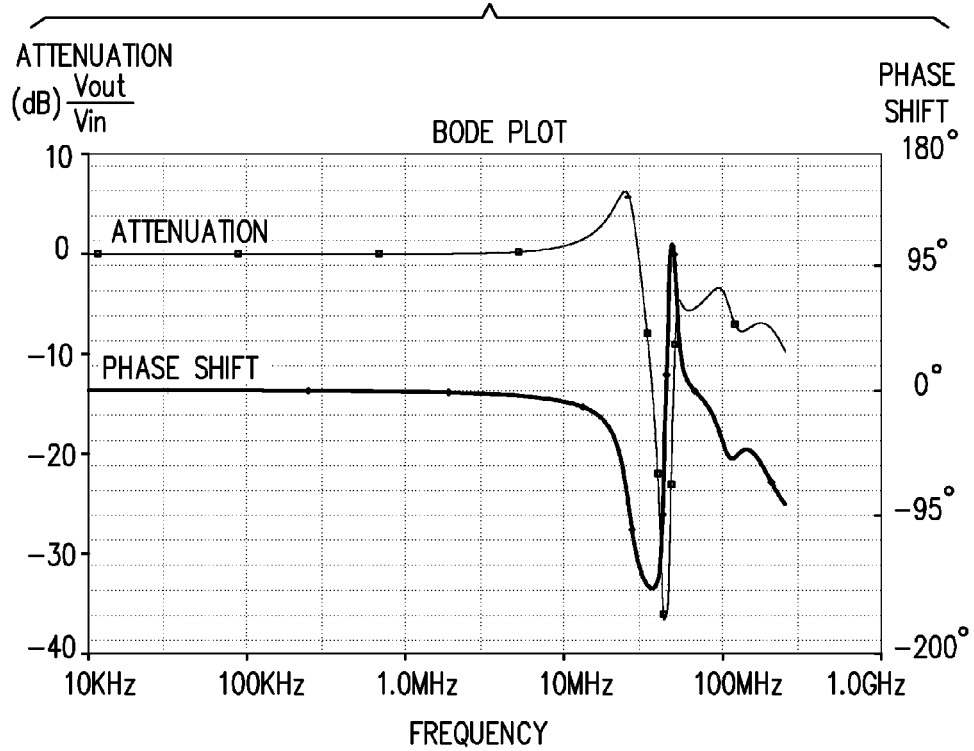
FIGS. 7A-7F are simplified signal diagrams corresponding to effective circuits A-F illustrated in FIG. 2E for a simple time-varying applied signal.
Figure 7A:
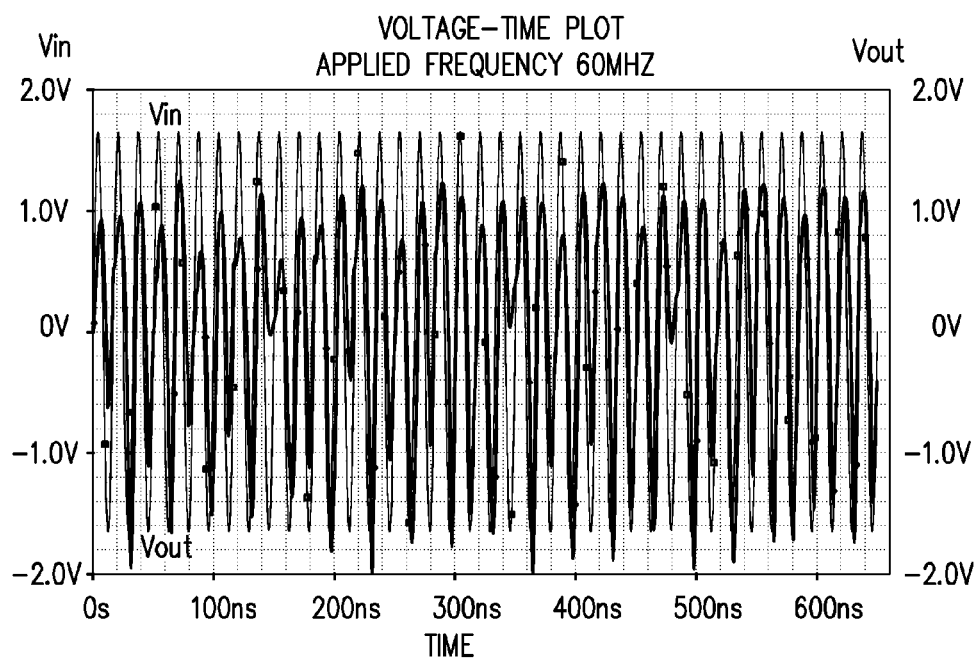
Figure 7B:
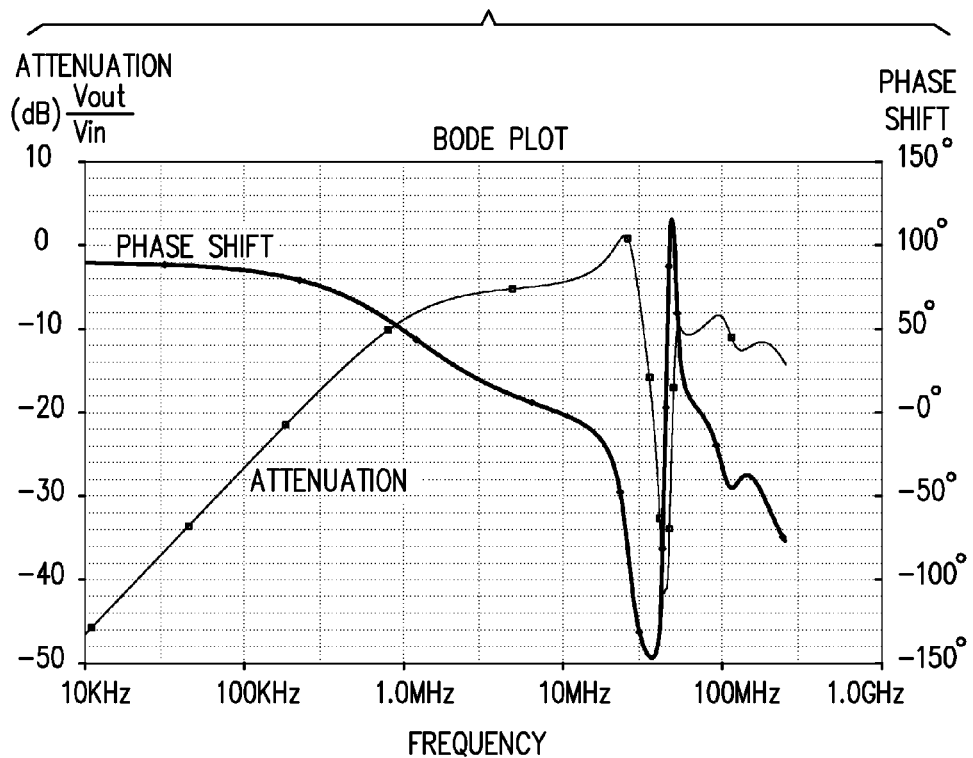
Figure 7B:
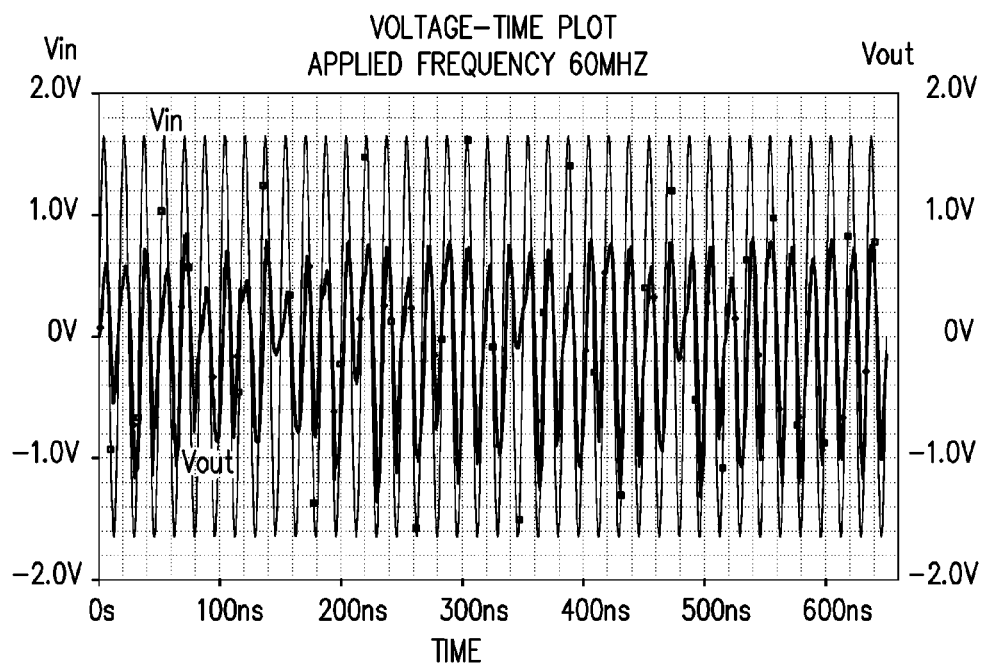
Figure 7C:
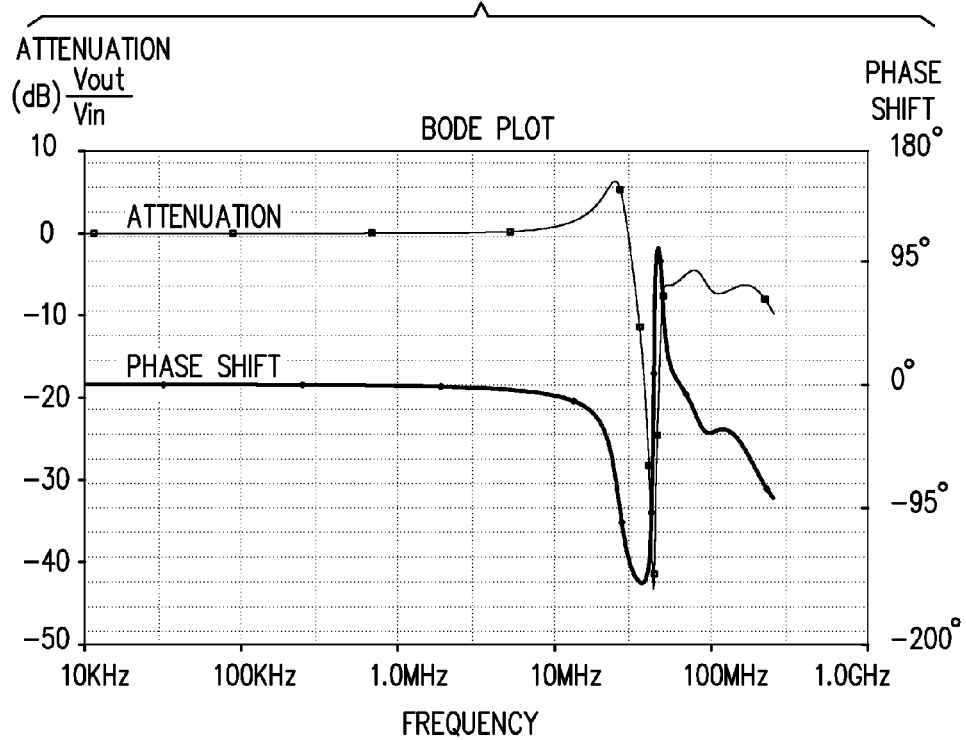
Figure 7C:
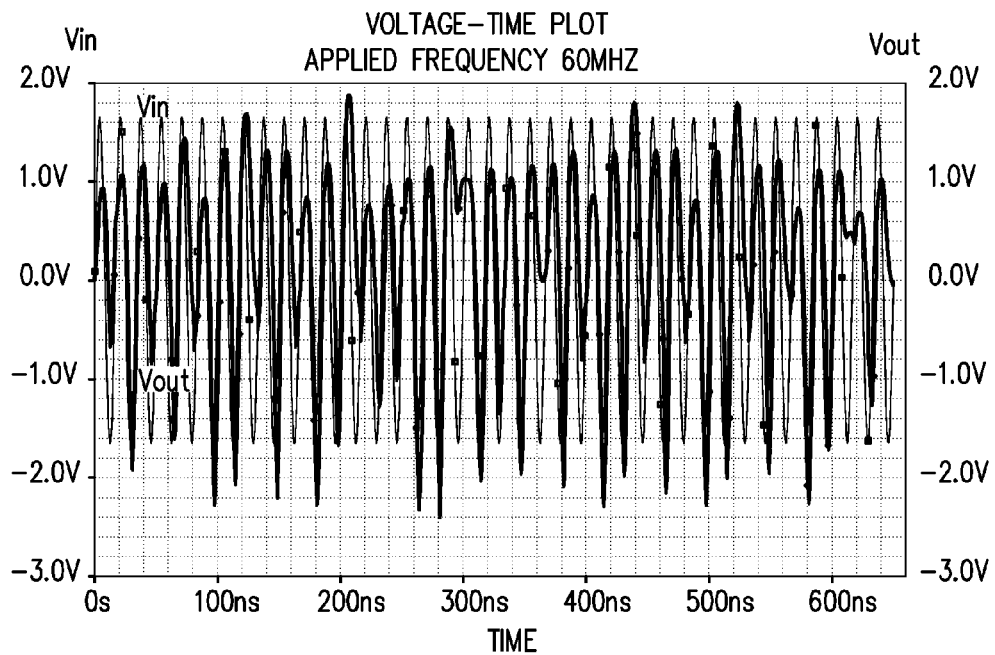
Figure 7D:
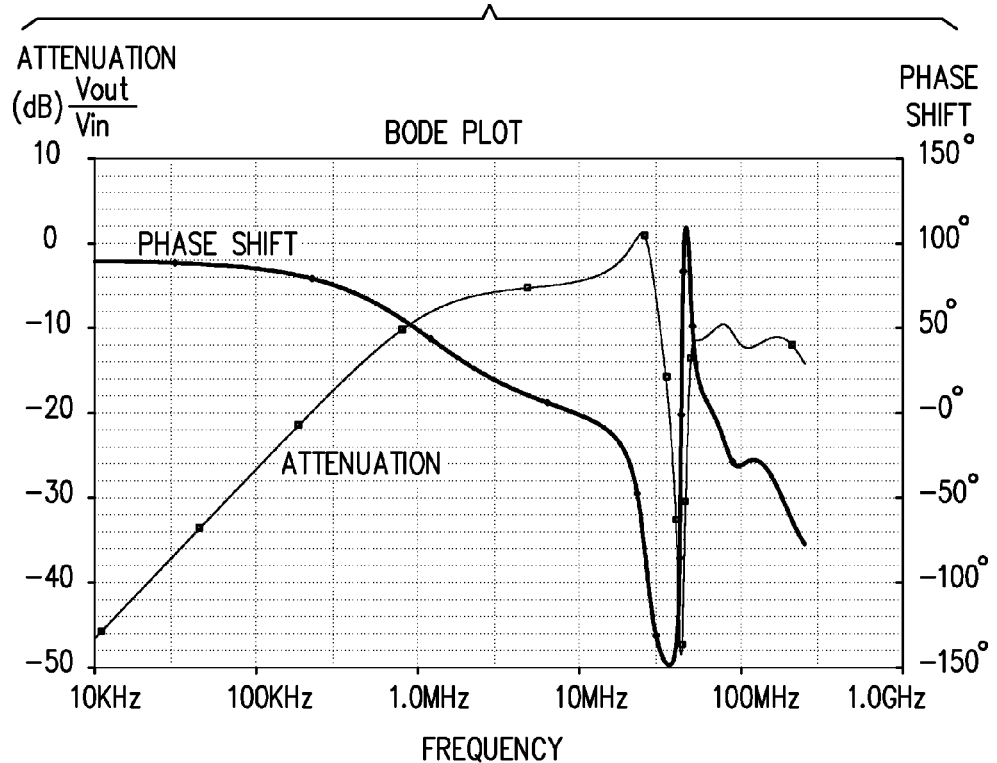
Figure 7D:
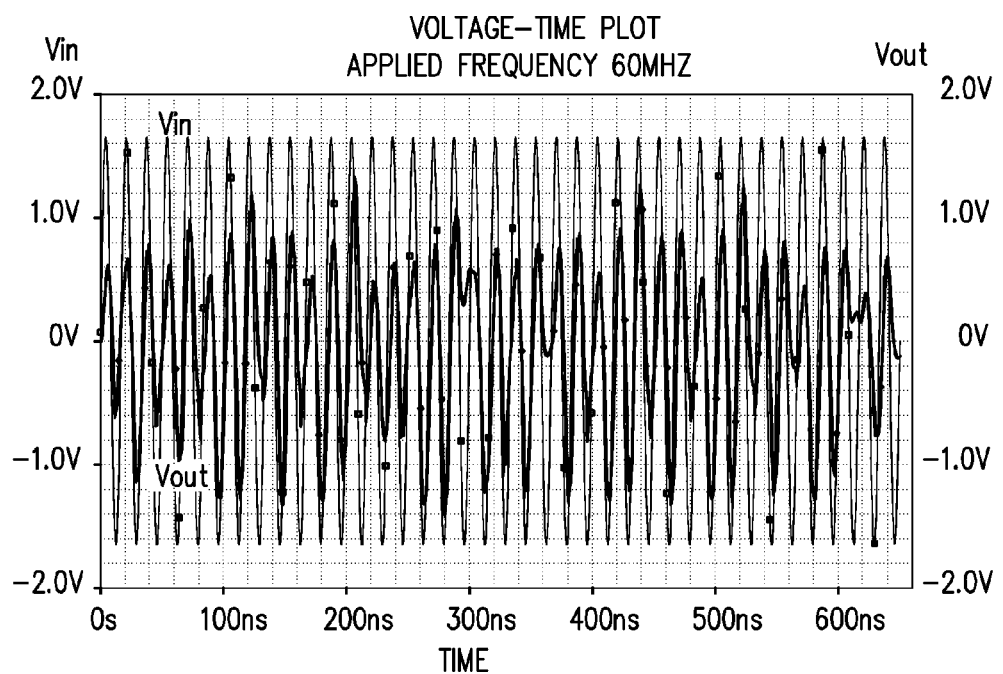
Figure 7E:
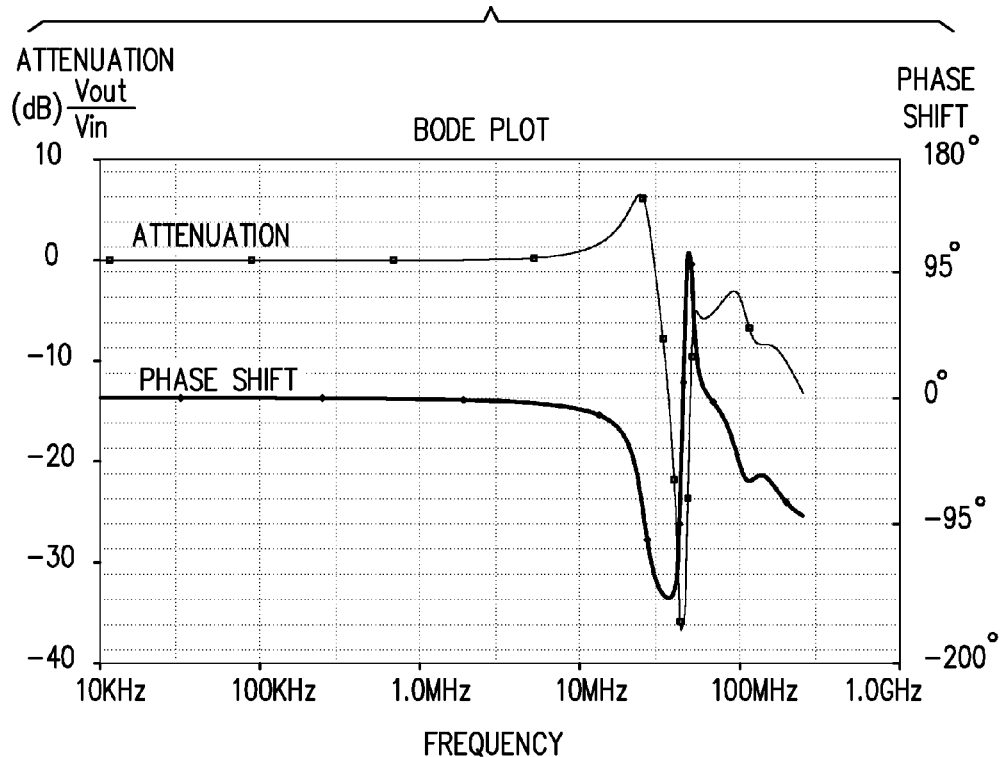
Figure 7E:
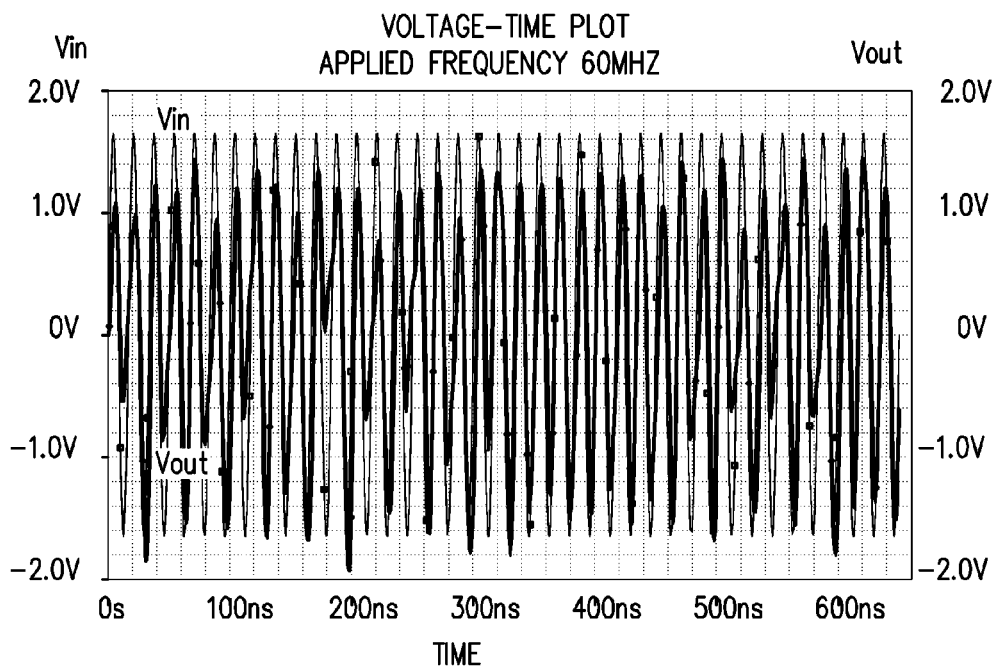
Figure 7F:
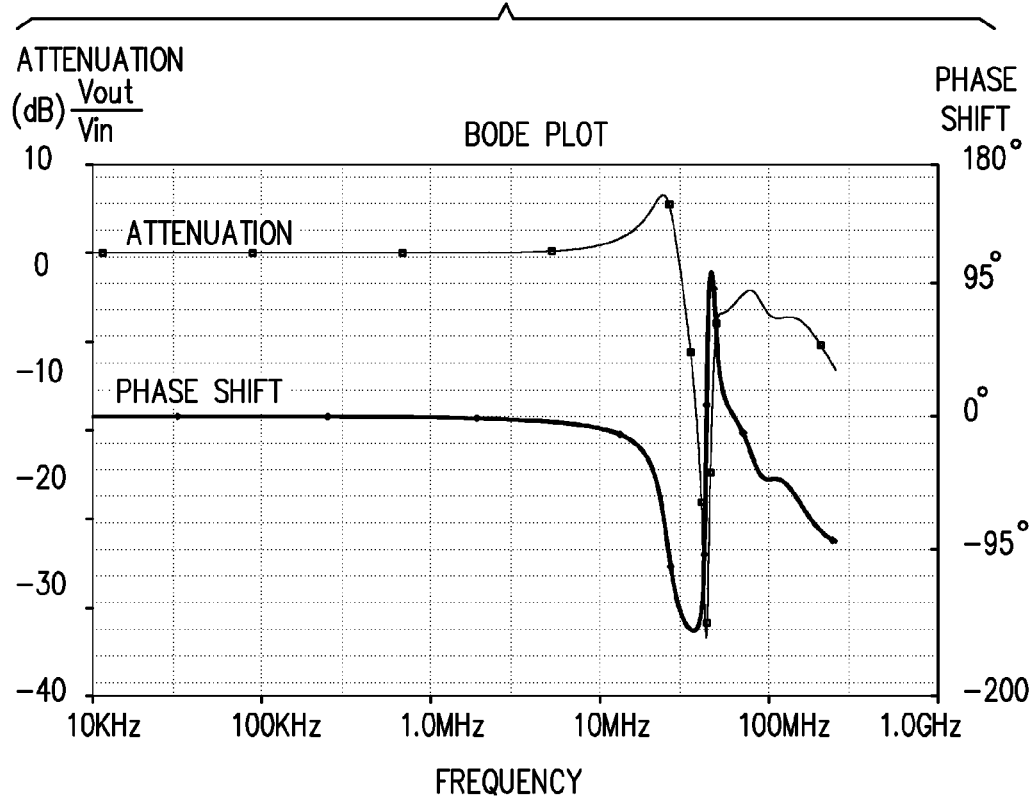
Figure 7F:
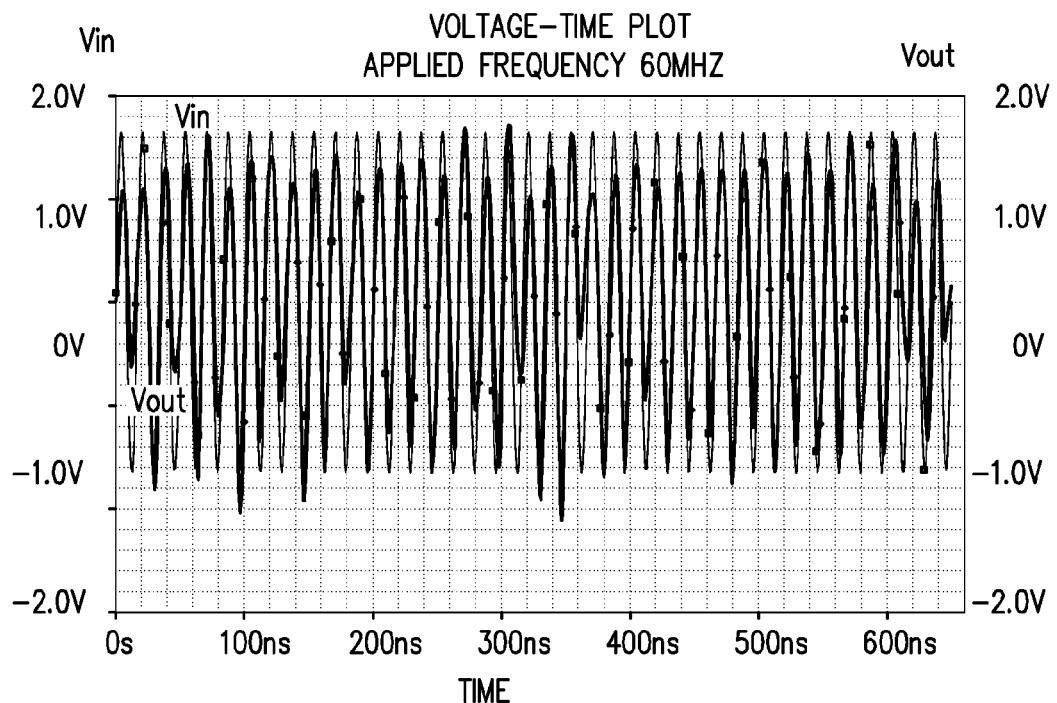
Figure 8A:
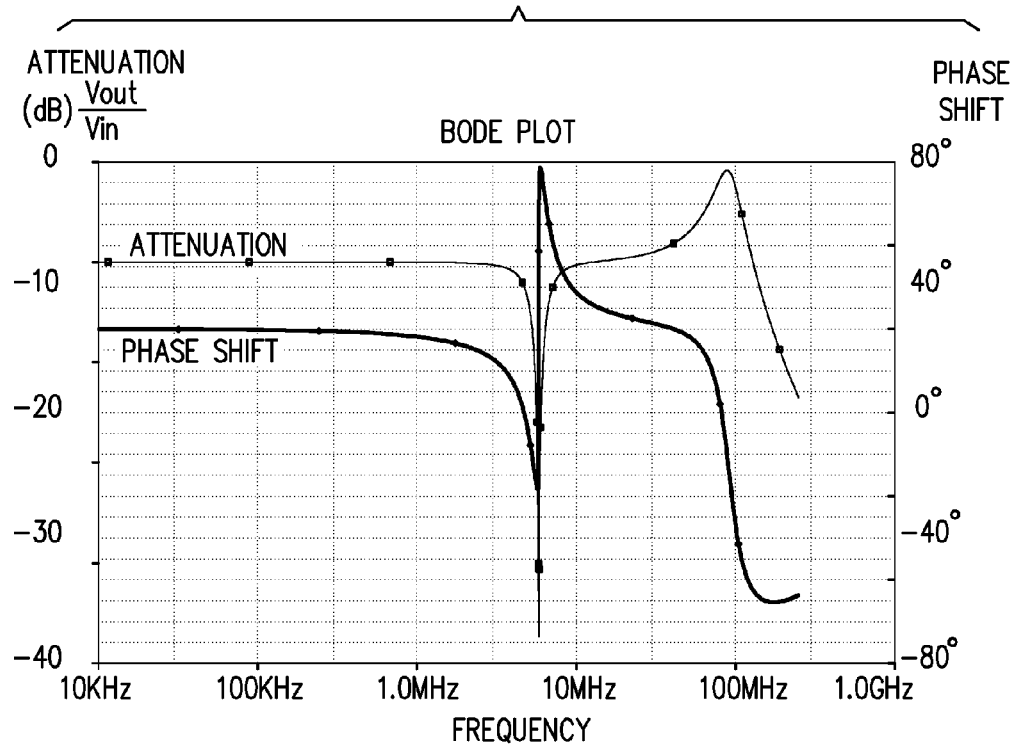
FIGS. 8A-8E are simplified signal diagrams corresponding to effective circuits A-E illustrated in FIG. 2F for a simple time-varying applied signal.
Figure 8A:
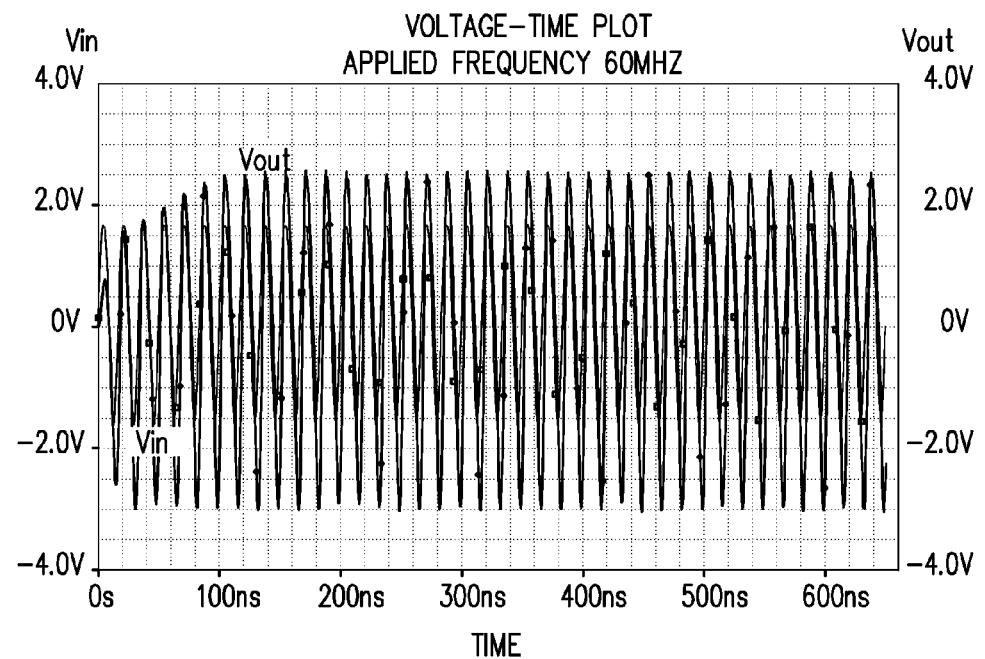
Figure 8B:
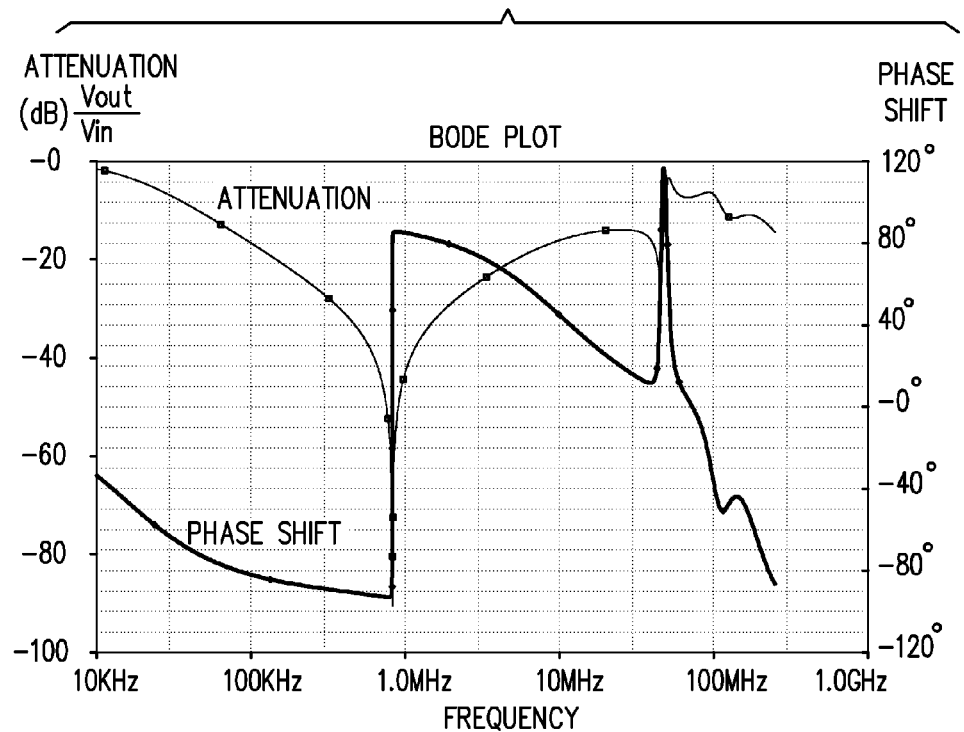
Figure 8B:
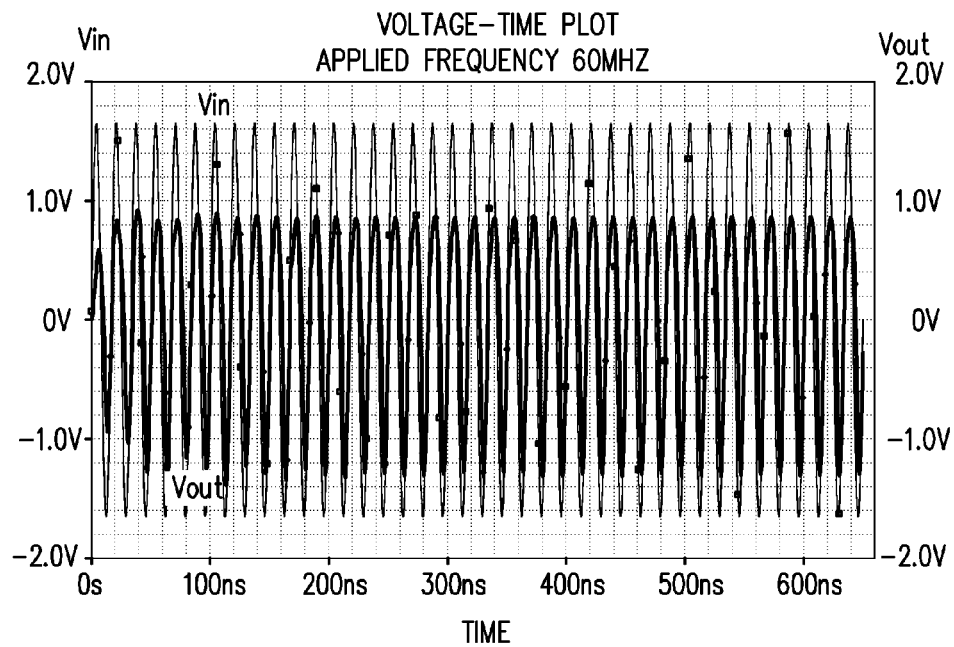
Figure 8C:
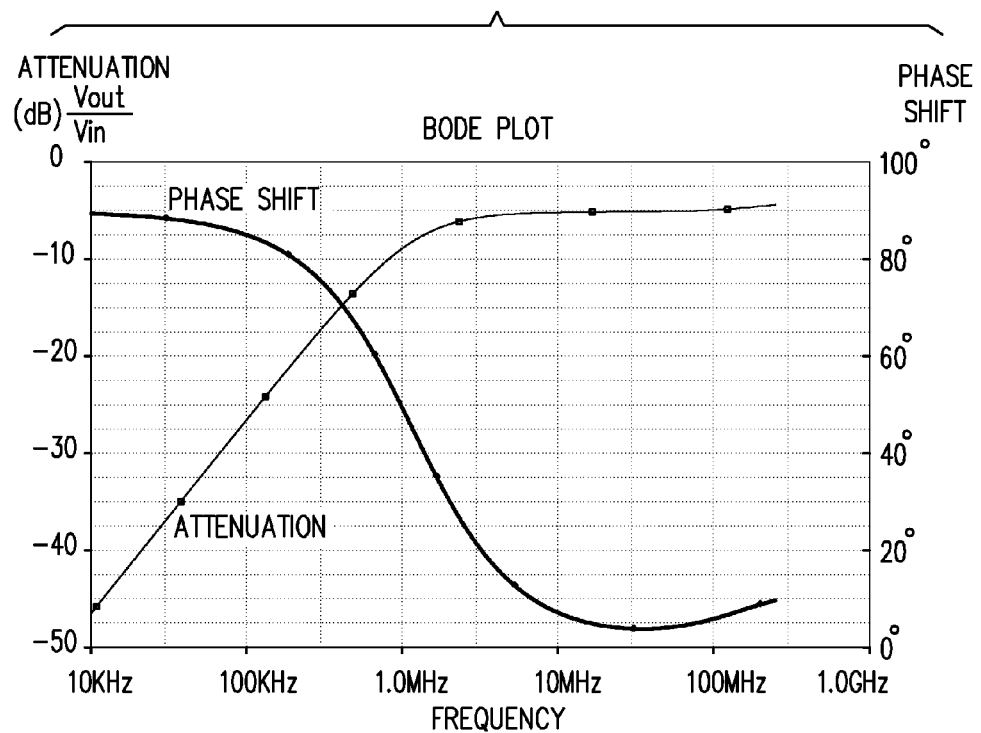
Figure 8C:
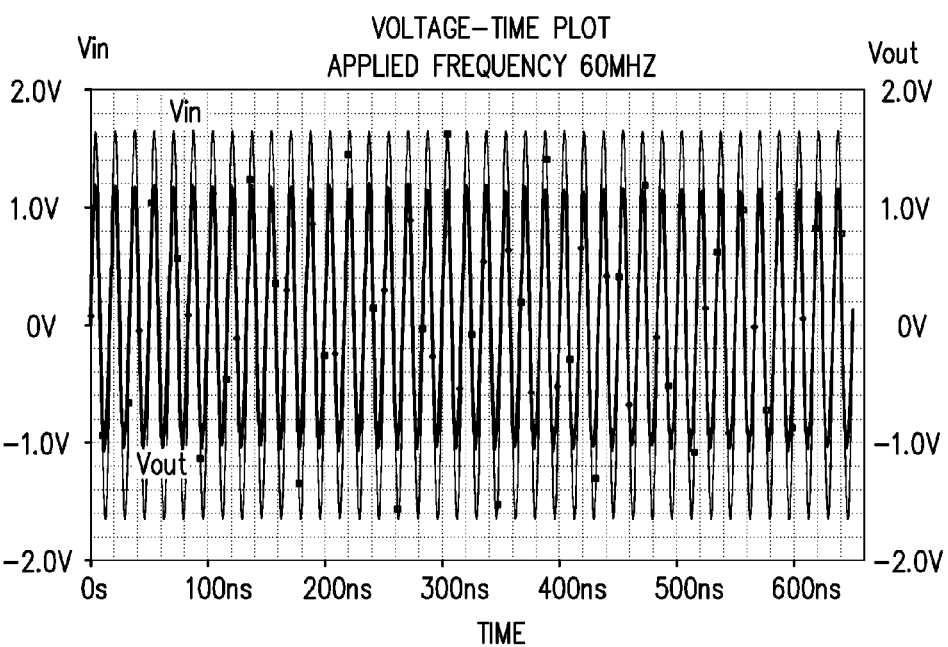
Figure 8D:
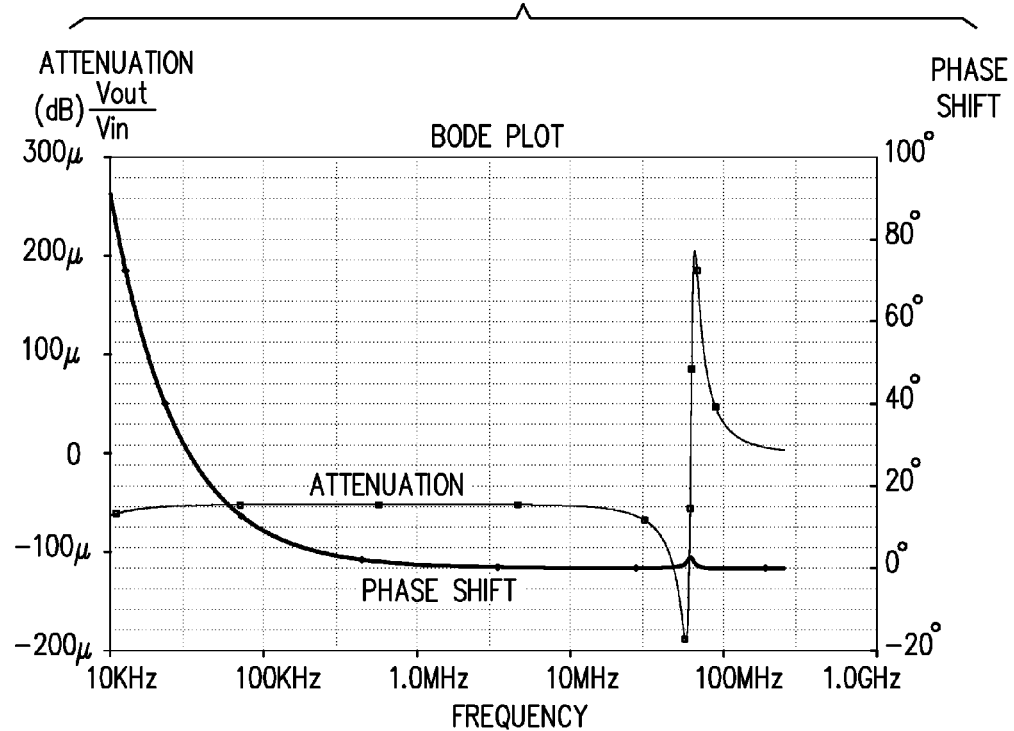
Figure 8D:
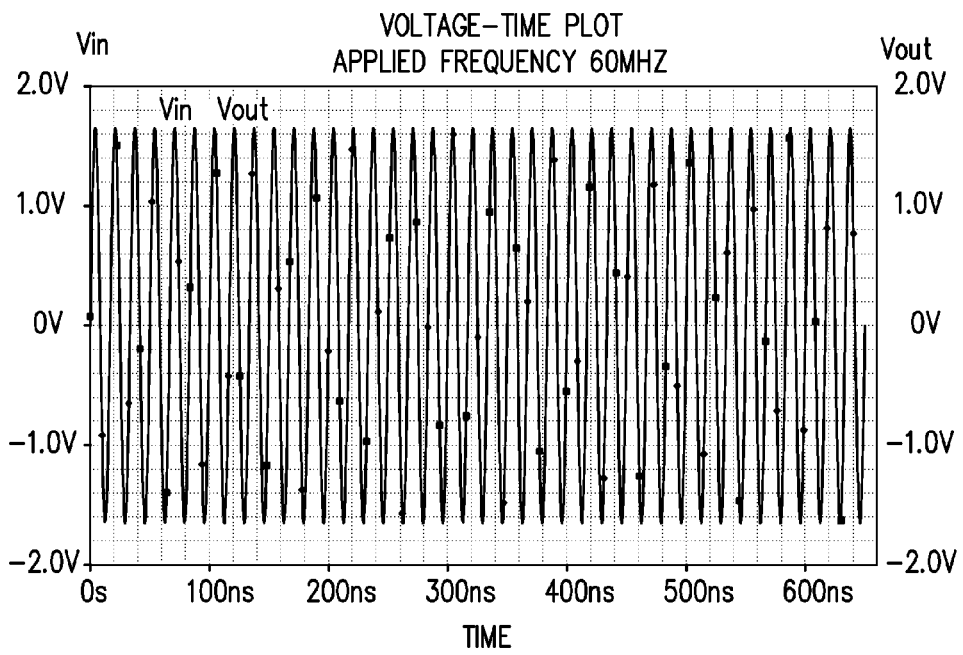
Figure 8E:
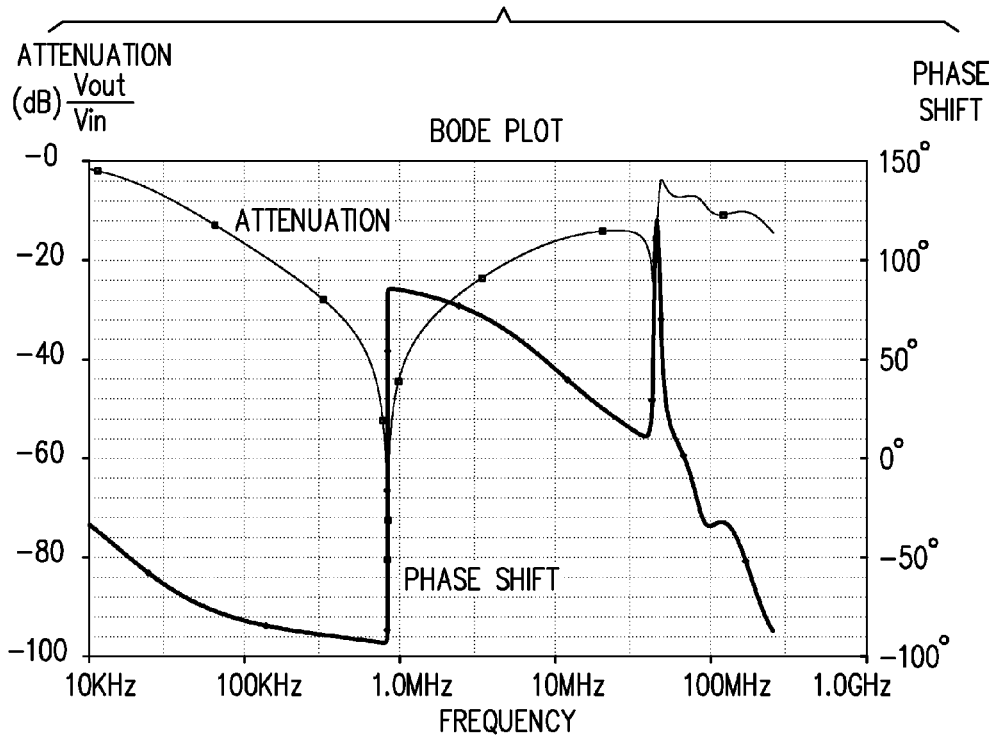
Figure 8E:
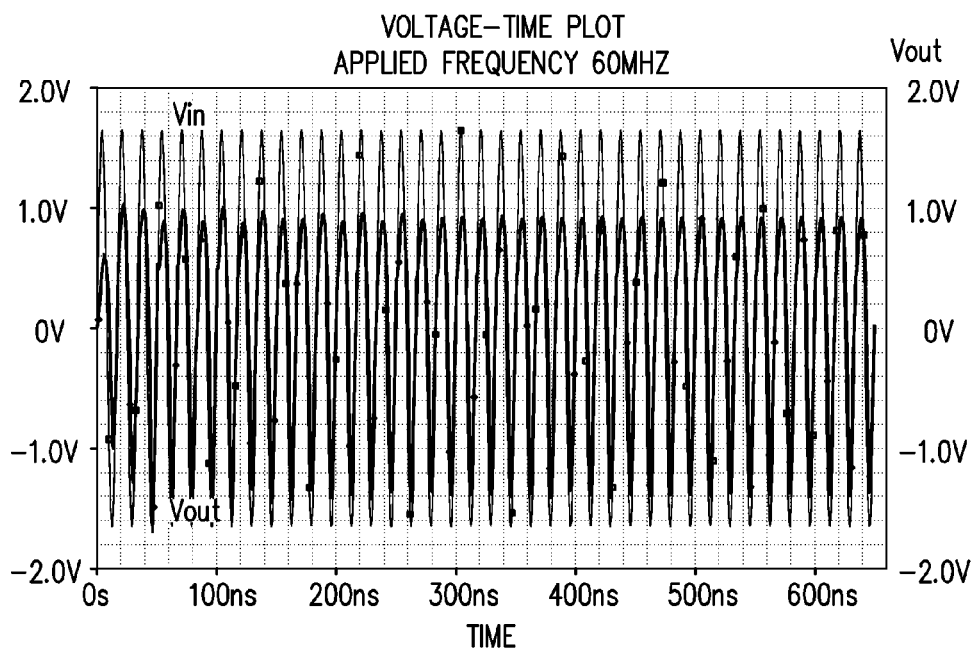

Reference is now made to FIG. 2F, which illustrates a secure keypad device 600, which includes a housing, preferably including a top housing element 602 and a bottom housing element 604. Top housing element 602 includes, on a top surface 606 thereof, a display window 608, through which a display 609 may be viewed. An array 610 of keys 612 is engageable on top surface 606.

An anti-tampering grid 622, preferably formed of a multiplicity of anti-tampering dense electrical conductors 624, is preferably provided to define a protective enclosure within the housing. Alternatively or additionally, a protective enclosure may be defined within a secure integrated circuit 626, which may be within or outside the protective enclosure defined by grid 622.

One or more galvanic data links 630, preferably formed as one or more conductors, may be provided in the secure keypad device for carrying sensitive data, typically between a controller 632, which corresponds to controller 102 in FIG. 1, and a memory 634, which corresponds to memory 103 in FIG. 1.

In accordance with a preferred embodiment of the present invention at least one of anti-tampering grid 622 and one or more galvanic data links 630 form part of an electrical circuit 640. Electrical circuit 640 preferably includes at least one of a plurality of circuit components, preferably including at least one of a resistance, a capacitance and an inductance, here respectively indicated by reference numerals 642, 644 and 646. Preferably, values of the plurality of circuit components are variable. A preferred embodiment of a selectably variable resistance 642 is a ACAC 0612 commercially available from Vishay Intertechnology, Inc. A preferred embodiment of a selectably variable capacitance 644 is a X90100 digital variable capacitor commercially available from Intersil Americas Inc. of Milpitas, Calif. Selectably variable inductance 646 may be realized by employing a conventional gyrator having a selectably variable resistance and capacitance.

Additionally, one or more, preferably plural, circuit switches 648, preferably FETs or BJTs, are preferably arranged in circuit with the grid 622 and/or the galvanic data link 630. In the illustrated embodiment of FIG. 2F, the circuit switches are identified by designators S1, S2 and S3.

In accordance with a preferred embodiment of the present invention, an anti-tampering protection assembly (ATPA) 650, which corresponds to ATPA 110 (FIG. 1), is provided to apply a signal, hereinafter termed an applied signal, to one or more of the conductors constituting the grid 622 or galvanic data link 630. As noted above with respect to FIG. 1, ATPA 650 may be embodied in controller 632. The applied signal may be selectably applied at a first location selected from one or more of a plurality of selectable locations along the grid 622, here designated by numerals, 1, 2, 3 & 4 along grid 622 and correspondingly by numerals 5, 6, 7 & 8 along galvanic data link 630.

Further in accordance with a preferred embodiment of the present invention, the ATPA 650 is also operative to receive at least one signal, hereinafter referred to as a received signal, which corresponds to the applied signal at at least a second location along the at least one conductor in circuit 640.

Additionally, in accordance with a preferred embodiment of the present invention, the ATPA 650 has additional tamper detection functionality including circuit selection functionality operative to select at least one of the first location, the second location and at least one circuit function of at least one of said plurality of circuit components.

In the illustrated embodiment of FIG. 2F, the at least one circuit function is variable by selecting the at least one first location, the at least one of second location, the values of the plurality of selectably variable circuit components, such as components 642, 644 and 646, and the open/closed state of the plural circuit switches 648.

The ATPA 650 preferably also includes signal correlation functionality operative to receive the received signal from the second location and to correlate the received signal with the applied signal thereby to ascertain whether the conductor has been tampered with and more preferably the region at which the tampering occurred.

Perceived tampering responsive circuitry 654, preferably located within the protective grid 622 or embodied in a secure integrated circuit, is operative in response to an output of the ATPA 650 or forms part of the ATPA 650, and preferably provides an alarm indication of tampering and/or is operative to disable some or all of the functions of the secure keypad device 600.

It is appreciated from a consideration of FIG. 2F, that there exist multiple combinations of locations at which the applied signal is applied and the received signal is received and of open/closed states of the switches S1, S2 and S3 and of selectable values of the plurality of selectably variable circuit components. Each of the five illustrated combinations produces a different effective electrical circuit. The five different effective electrical circuits are each illustrated in FIG. 2F and are designated by letters A, B, C, D & E.

It is noted that for the purposes of simplicity of illustration of effective circuits A-E and clarity of description, switches S1, S2 and S3 are here indicated as theoretical switches, which are either fully open (infinite resistance) or fully closed (zero resistance). Switches S1, S2 and S3 are each preferably a model MTD2955/ON manufactured by ON Semiconductor of Phoenix Ariz.

For example, when the applied signal is applied at location 3, designated by Tx3, and the received signal is received at location 2, designated by Rx2, and when all switches S1, S2 and S3 are open and when the values of variable circuit components are C1=10 pF and L1=1 μH, electrical circuit 640 appears as shown at A. Effective electrical circuits designated by letters B-E each have at least one of differing values of at least one of the variable components, differing open/close status of at least one of switches S1, S2 and S3, and differing at least one first location or at least one second location and each include an indication of the values of circuit components.

Reference is now made to FIG. 3A-3H, which are simplified signal diagrams corresponding to effective circuits A-H illustrated for FIG. 2A, to FIG. 4A-4H, which are simplified signal diagrams corresponding to effective circuits A-H illustrated for FIG. 2B, to FIG. 5A-5G, which are simplified signal diagrams corresponding to effective circuits A-G illustrated for FIG. 2C, to FIG. 6A-6F, which are simplified signal diagrams corresponding to effective circuits A-F illustrated for FIG. 2D, to FIG. 7A-7F, which are simplified signal diagrams corresponding to effective circuits A-F illustrated for FIG. 2E and to FIG. 8A-8E, which are simplified signal diagrams corresponding to effective circuits A-E illustrated for FIG. 2F.

It is seen that each of FIGS. 3A-8E includes both a Bode plot and a voltage-time plot. The Bode plot represents the signal attenuation as a function of frequency, expressed as the voltage ratio, in dB, of the measured voltage at the received signal location and the applied voltage at the applied signal location, as well as the phase shift between the applied sine wave phase at the applied signal location and received signal phase at the received signal location. The voltage-time plot shows the applied signal Vin at the applied signal location and received signal Vout at the received signal location, wherein the received signal is shown in overlay over the applied signal.

Turning now to FIGS. 3A-3H, which are simplified signal diagrams corresponding to effective circuits A-H illustrated in FIG. 2A for a simple time-varying applied signal, it is seen that when an applied signal Vin in the form of a sine wave of constant frequency, here 10 MHz, and constant amplitude is applied, the received signal Vout differs for each of the effective circuits. Each of plots A, B, C, D, E, F, G and H corresponds to the respective effective circuit illustrated in FIG. 2A at A, B, C, D, E, F, G and H.

As seen in Table I below, which indicates the amplitude attenuation and phase shift to one decimal place, each effective circuit A-H has a different amplitude attenuation and phase shift.

TABLE I

| I EFFECTIVE CIRCUIT (FIG. 2A) | II ATTENUATION AT 10 MHz SHOWN IN FIG IDENTIFIED IN COLUMN IV [db] | III PHASE SHIFT AT 10 MHz SHOWN IN FIG IDENTIFIED IN COLUMN IV [°] | IV FIG SHOWING ATTENUATION (COLUMN II) AND PHASE SHIFT (COLUMN III) |
|---|---|---|---|
| A | −16.1 | −52.2 | 3A |
| B | −17.0 | −53.3 | 3B |
| C | −17.2 | −52.4 | 3C |
| D | −17.9 | −53.9 | 3D |
| E | −20.1 | −418.9 | 3E |
| F | −20.6 | −420.1 | 3F |
| G | −20.8 | −420.4 | 3G |
| H | −21.5 | −421.3 | 3H |

Turning now to FIGS. 4A-4H, which are simplified signal diagrams corresponding to effective circuits A-H illustrated in FIG. 2B for a simple time-varying applied signal, it is seen that when an applied signal Vin in the form of a sine wave of constant frequency, here 30 MHz, and constant amplitude is applied the received signal Vout differs for each of the effective circuits. Each of plots A, B, C, D, E, F, G and H corresponds to the respective effective circuit illustrated in FIG. 2B at A, B, C, D, E, F, G and H.

As seen in Table II below, which indicates the amplitude attenuation and phase shift to one decimal place, each effective circuit A-H has a different amplitude attenuation and phase shift.

TABLE II

| I EFFECTIVE CIRCUIT (FIG. 2B) | II ATTENUATION AT 30 MHz SHOWN IN FIG IDENTIFIED IN COLUMN IV [db] | III PHASE SHIFT AT 30 MHz SHOWN IN FIG IDENTIFIED IN COLUMN IV [°] | IV FIG SHOWING ATTENUATION (COLUMN II) AND PHASE SHIFT (COLUMN III) |
|---|---|---|---|
| A | −7.5 | −44.4 | 4A |
| B | −5.8 | −44.8 | 4B |
| C | −1.1 | −20.3 | 4C |
| D | −0.8 | −19.5 | 4D |
| E | −7.6 | −32.2 | 4E |
| F | −5.9 | −33.1 | 4F |
| G | −0.9 | −6.7 | 4G |
| H | −0.6 | −5.8 | 4H |

Turning now to FIGS. 5A-5G, which are simplified signal diagrams corresponding to effective circuits A-G illustrated in FIG. 2C for a simple time-varying applied signal, it is seen that when an applied signal Vin in the form of a sine wave of constant frequency, here 60 MHz, and constant amplitude is applied the received signal Vout differs for each of the effective circuits. Each of plots A, B, C, D, E, F and G corresponds to the respective effective circuit illustrated in FIG. 2C at A, B, C, D, E, F, and G.

As seen in Table III below, which indicates the amplitude attenuation and phase shift to one decimal place, each effective circuit A-G has a different amplitude attenuation and phase shift.

TABLE III

| I EFFECTIVE CIRCUIT (FIG. 2C) | II ATTENUATION AT 60 MHz SHOWN IN FIG IDENTIFIED IN COLUMN IV [db] | III PHASE SHIFT AT 60 MHz SHOWN IN FIG IDENTIFIED IN COLUMN IV [°] | IV FIG SHOWING ATTENUATION (COLUMN II) AND PHASE SHIFT (COLUMN III) |
|---|---|---|---|
| A | −22.3 | −49.6 | 5A |
| B | −16.1 | −69.6 | 5B |
| C | −24.3 | −52.3 | 5C |
| D | −19.2 | −71.1 | 5D |
| E | −24.1 | −68.4 | 5E |
| F | −26.6 | −43.5 | 5F |
| G | −33.8 | −49.8 | 5G |

Turning now to FIGS. 6A-6F, which are simplified signal diagrams corresponding to effective circuits A-F illustrated in FIG. 2D for a simple time-varying applied signal, it is seen that when an applied signal Vin in the form of a sine wave of constant frequency, here 60 MHz, and constant amplitude is applied the received signal Vout differs for each of the effective circuits. Each of plots A, B, C, D, E and F corresponds to the respective effective circuit illustrated in FIG. 2D at A, B, C, D, E and F.

As seen in Table IV below, which indicates the amplitude attenuation and phase shift to one decimal place, each effective circuit A-F has a different amplitude attenuation and phase shift.

TABLE IV

| I EFFECTIVE CIRCUIT (FIG. 2D) | II ATTENUATION AT 60 MHz SHOWN IN FIG IDENTIFIED IN COLUMN IV [db] | III PHASE SHIFT AT 60 MHz SHOWN IN FIG IDENTIFIED IN COLUMN IV [°] | IV FIG SHOWING ATTENUATION (COLUMN II) AND PHASE SHIFT (COLUMN III) |
|---|---|---|---|
| A | −2.2 | −20.9 | 6A |
| B | −7.1 | −16.7 | 6B |
| C | −12.1 | −12.2 | 6C |
| D | −5.5 | 3.4 | 6D |
| E | −6.0 | 4.3 | 6E |
| F | −11.0 | 8.8 | 6F |

Turning now to FIGS. 7A-7F, which are simplified signal diagrams corresponding to effective circuits A-F illustrated in FIG. 2E for a simple time-varying applied signal, it is seen that when an applied signal Vin in the form of a sine wave of constant frequency, here 60 MHz, and constant amplitude is applied the received signal Vout differs for each of the effective circuits. Each of plots A, B, C, D, E and F corresponds to the respective effective circuit illustrated in FIG. 2D at A, B, C, D, E and F.

As seen in Table V below, which indicates the amplitude attenuation and phase shift to one decimal place, each effective circuit A-F has a different amplitude attenuation and phase shift.

TABLE V

| I<br>EFFECTIVE<br>CIRCUIT<br>(FIG. 2E) | II<br>ATTENUATION<br>AT 60 MHz<br>SHOWN IN FIG<br>IDENTIFIED IN<br>COLUMN IV<br>[db] | III<br>PHASE SHIFT<br>AT 60 MHz<br>SHOWN IN FIG<br>IDENTIFIED IN<br>COLUMN IV<br>[°] | IV<br>FIG SHOWING<br>ATTENUATION<br>(COLUMN II)<br>AND PHASE<br>SHIFT<br>(COLUMN III) |
|---|---|---|---|
| A | −5.7 | 8.0 | 7A |
| B | −10.7 | 12.4 | 7B |
| C | −6.0 | 4.3 | 7C |
| D | −11.0 | 8.8 | 7D |
| E | −5.8 | 6.8 | 7E |
| F | −6.1 | 3.2 | 7F |

Turning now to FIGS. 8A-8E, which are simplified signal diagrams corresponding to effective circuits A-E illustrated in FIG. 2F for a simple time-varying applied signal, it is seen that when an applied signal Vin in the form of a sine wave of constant frequency, here 60 MHz, and constant amplitude is applied the received signal Vout differs for each of the effective circuits. Each of plots A, B, C, D and E corresponds to the respective effective circuit illustrated in FIG. 2F at A, B, C, D and E.

As seen in Table VI below, which indicates the amplitude attenuation and phase shift to one decimal place, each effective circuit A-E has a different amplitude attenuation and phase shift.

TABLE VI

| I<br>EFFECTIVE<br>CIRCUIT<br>(FIG. 2F) | II<br>ATTENUATION<br>AT 60 MHz<br>SHOWN IN FIG<br>IDENTIFIED IN<br>COLUMN IV<br>[db] | III<br>PHASE SHIFT<br>AT 60 MHz<br>SHOWN IN FIG<br>IDENTIFIED IN<br>COLUMN IV<br>[°] | IV<br>FIG SHOWING<br>ATTENUATION<br>(COLUMN II)<br>AND PHASE<br>SHIFT<br>(COLUMN III) |
|---|---|---|---|
| A | 4.4 | −8.5 | 7A |
| B | −6.9 | 11.8 | 7B |
| C | −5.1 | 4.5 | 7C |
| D | 0 | 0 | 7D |
| E | −7.1 | 8.8 | 7E |

Figure 9A:
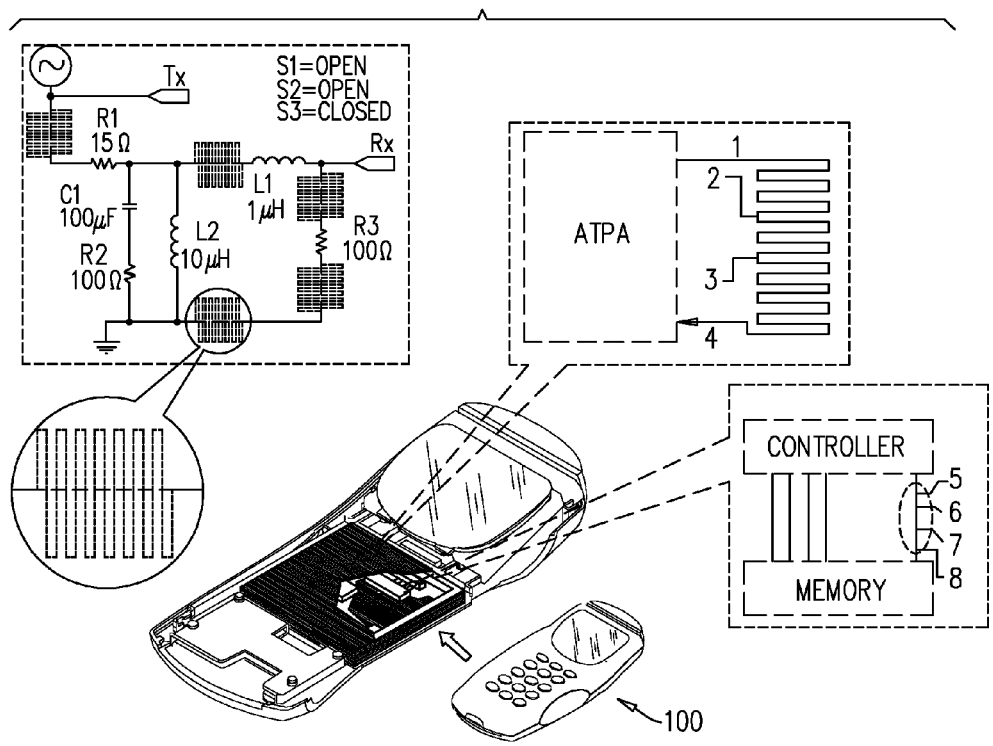
FIGS. 9A & 9B are simplified circuit diagrams for two different effective circuits in a secure keypad device in accordance with a preferred embodiment of the present invention and signal diagrams for a square wave applied signal applied to the two different effective circuits.
Figure 9A:
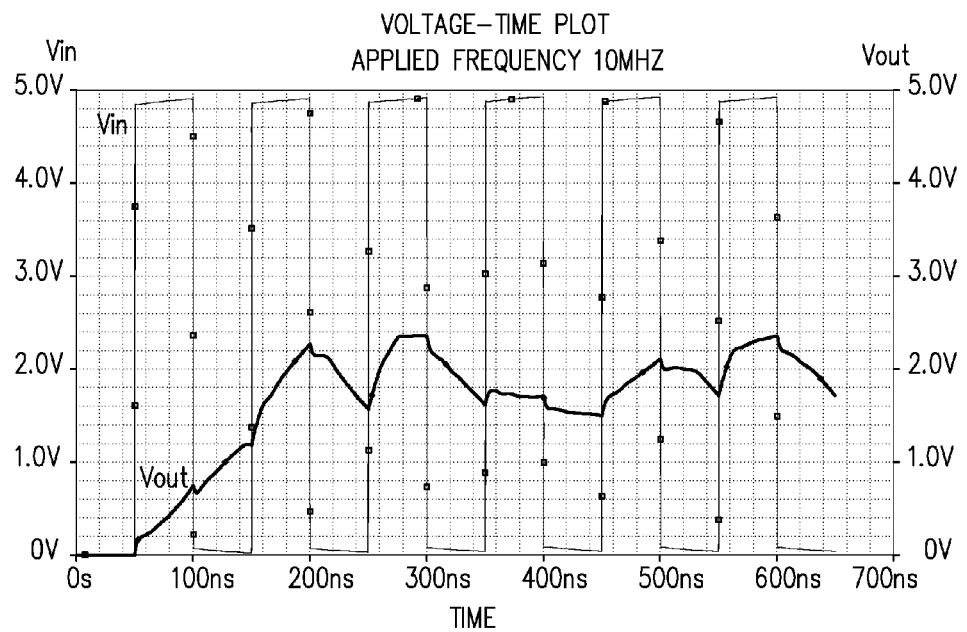
Figure 9B:
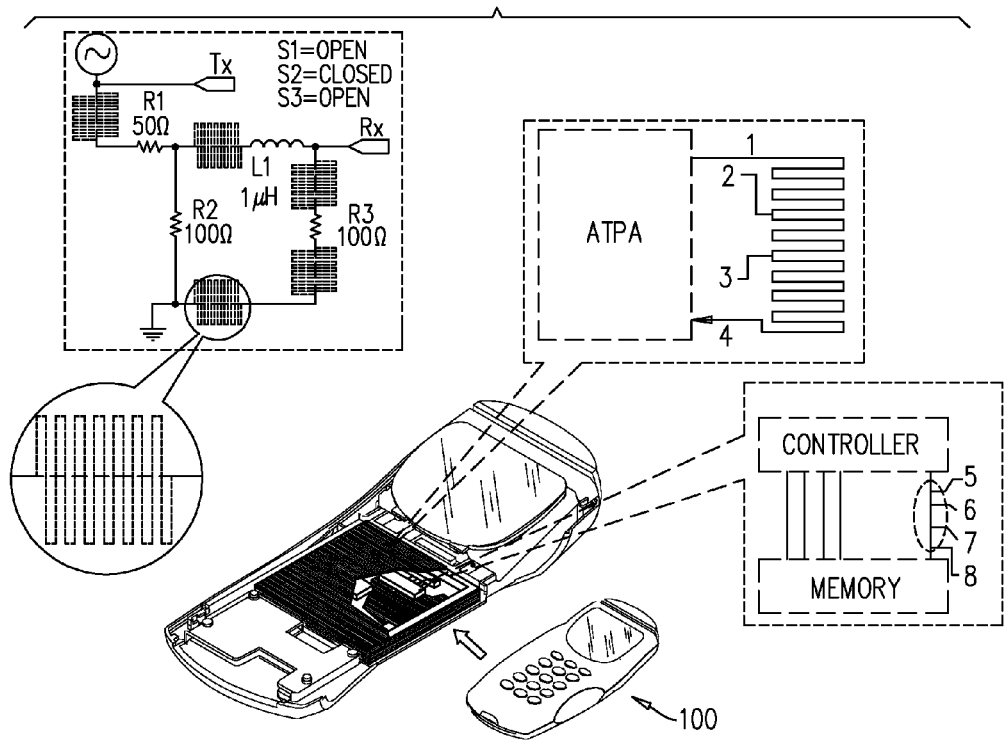
Figure 9B:
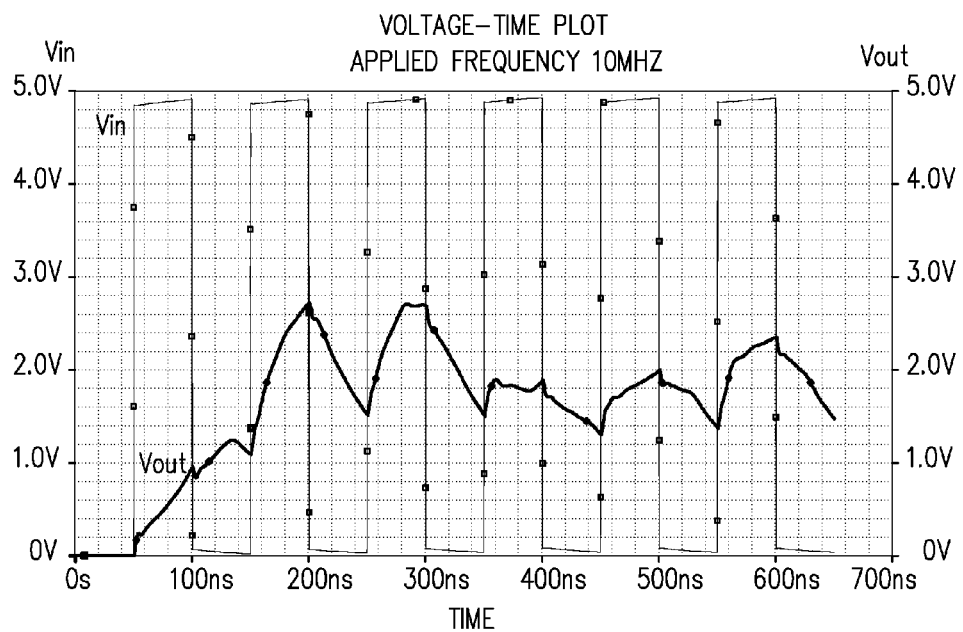

Reference is now made to FIGS. 9A & 9B, which are simplified circuit diagrams for two different effective circuits in a secure keypad device constructed and operative in accordance with a preferred embodiment of the present invention, such as the secure keypad device 100 (FIG. 1), and signal diagrams for a square wave applied signal applied to the two different effective circuits. The effective circuit shown in FIG. 9A corresponds to effective circuit B shown in FIG. 2A, however having indicated component values different from those in effective circuit B in FIG. 2A. The effective circuit shown in FIG. 9B corresponds to effective circuit C in FIG. 2A.

In each of FIGS. 9A & 9B there appears a circuit diagram of an effective circuit typically provided by suitable selection of at least one of circuit components, circuit component values, ground connections, applied signal location and received signal location. In the illustrated examples of FIGS. 9A & 9B, the effective circuits differ from each other in component values, and more specifically in the resistance of resistor R1 and the status of switches S1, S2 and S3.

It is clearly seen from a consideration of FIGS. 9A & 9B that each effective circuit provides a different expected received signal which is known to the tampering sensing circuitry.

Figure 10A:
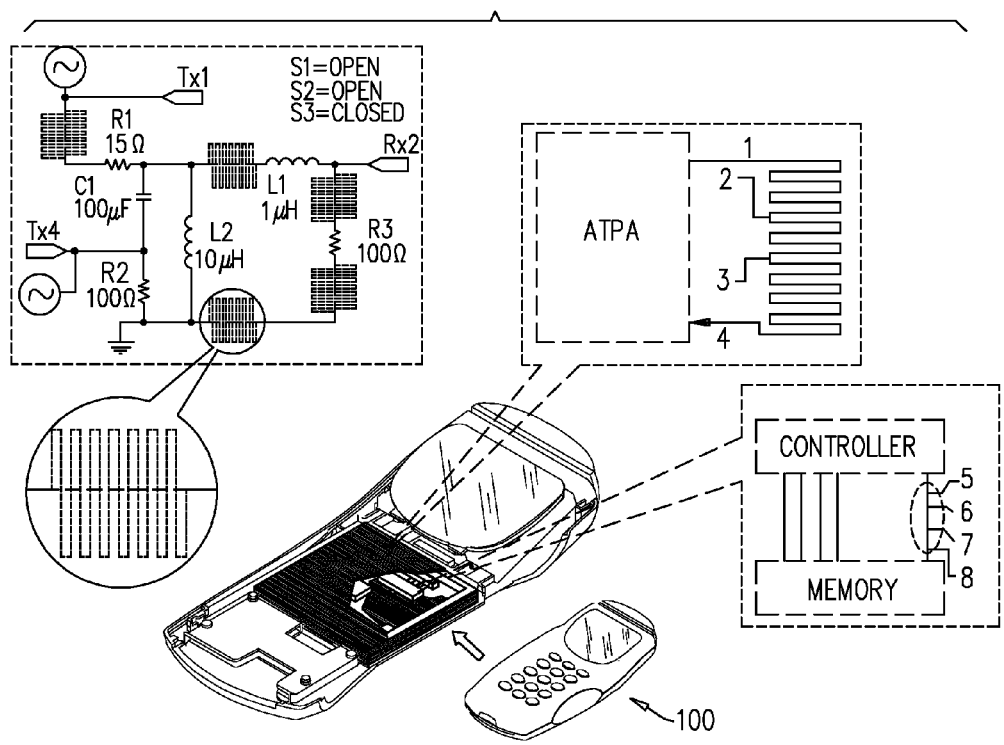
FIGS. 10A & 10B are simplified circuit diagrams for two different effective circuits in a secure keypad device in accordance with a preferred embodiment of the present invention and signal diagrams for plural different signals simultaneously applied thereto.
Figure 10A:
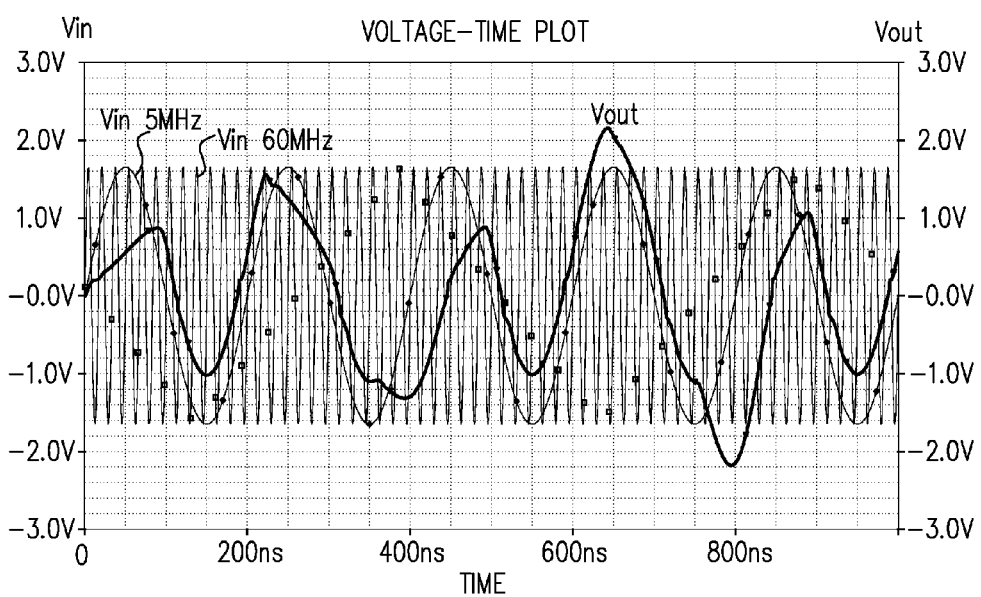
Figure 10B:
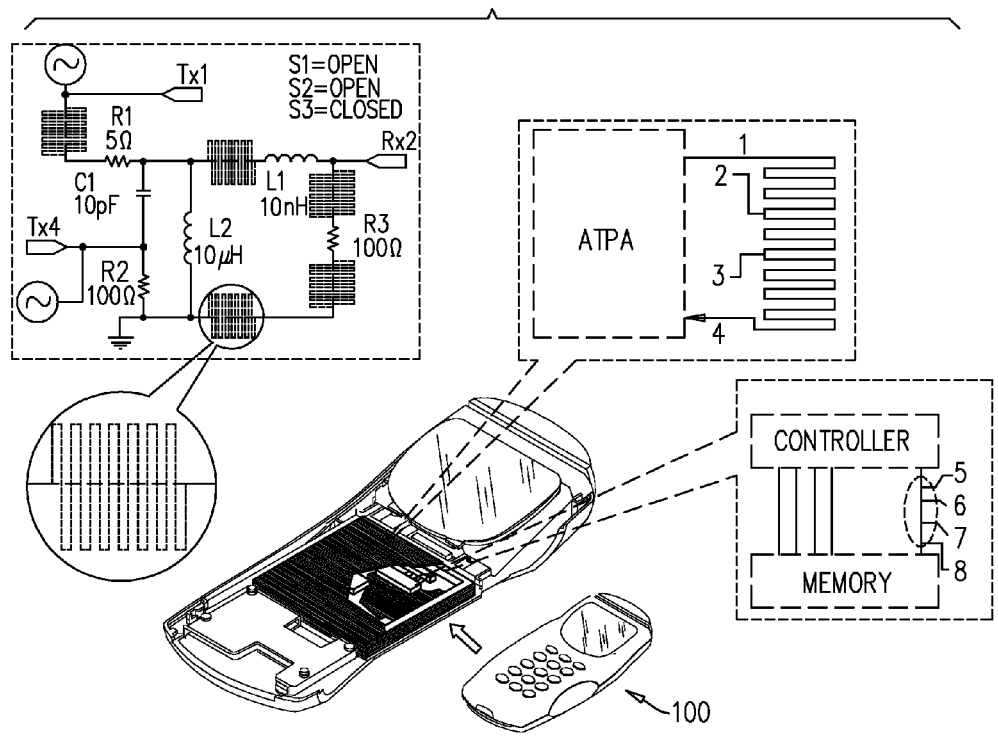
Figure 10B:
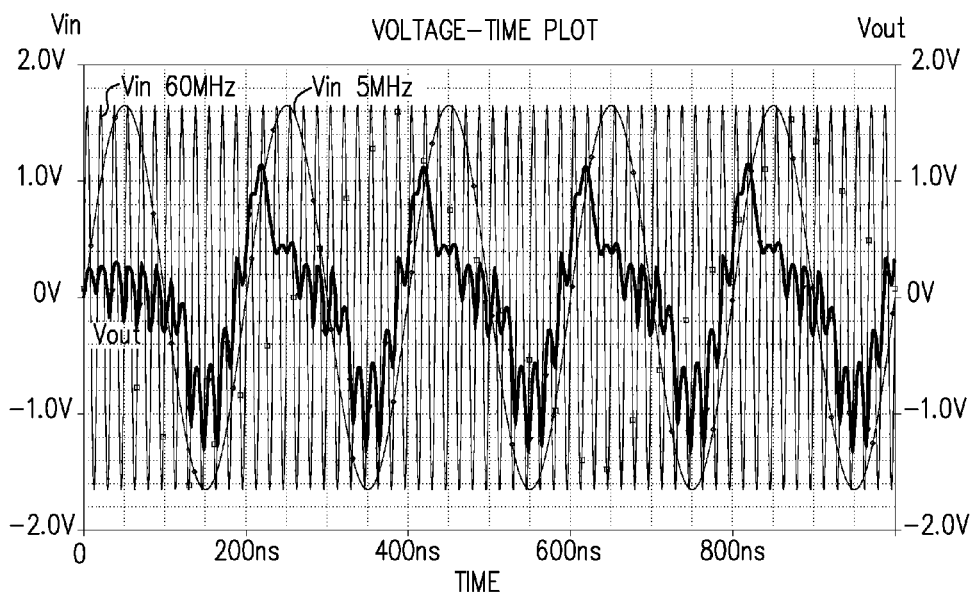

Reference is now made to FIGS. 10A & 10B, which are simplified circuit diagrams for two different effective circuits in a secure keypad device in accordance with a preferred embodiment of the present invention and signal diagrams for plural different signals simultaneously applied thereto. In FIGS. 10A & 10B, a sine wave signal at 60 MHz is applied at a circuit location designated as Tx1 and a sine wave signal at 5 MHz is applied at a circuit location designated as Tx4 and superimposed over the 60 MHz signal. The received signals are received at a circuit location designated as Rx2.

The values of R1, C1 and L1 are different in each of FIGS. 10A & 10B and indicated therein.

It is clearly seen from a consideration of FIGS. 10A & 10B that each effective circuit provides a different expected received signal which is known to the tampering sensing circuitry.

Figure 11:
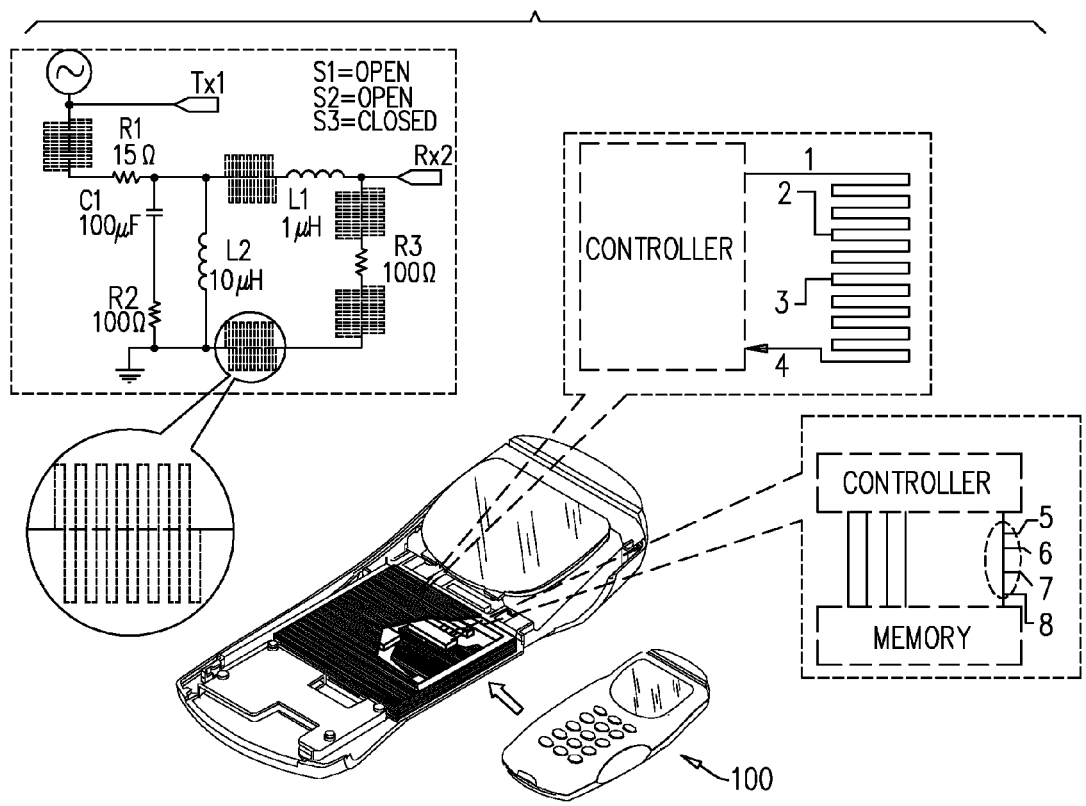
FIG. 11 is a simplified circuit diagram for a selected effective circuit in a secure keypad device in accordance with a preferred embodiment of the present invention and a signal diagram for consecutive two different signals at consecutive different times applied to that effective circuit.
Figure 11:
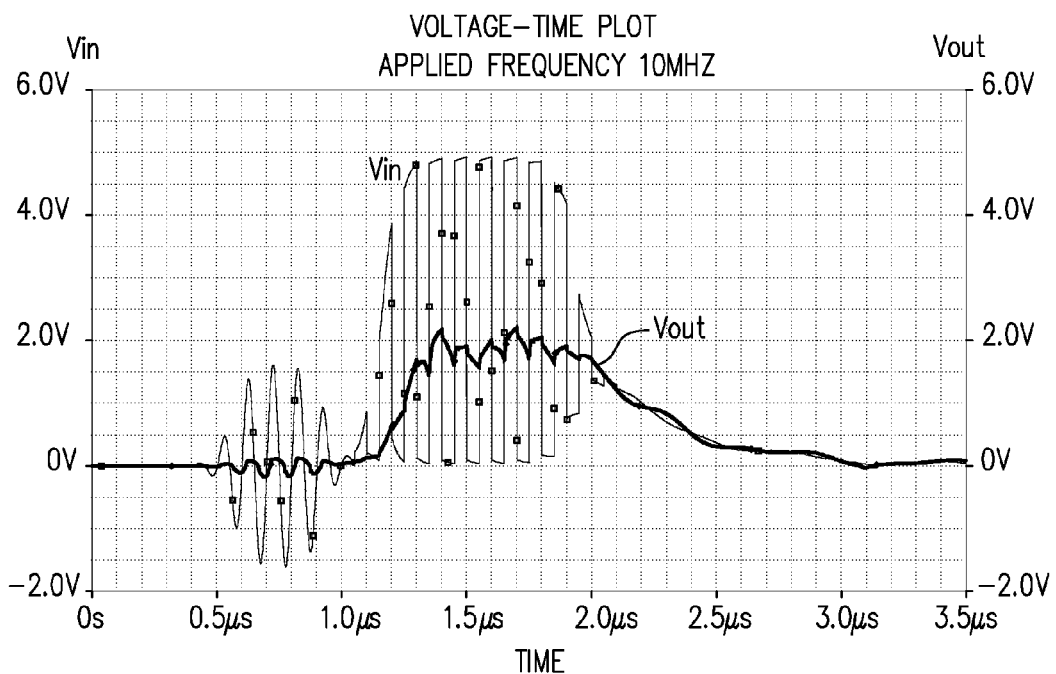

Reference is now made to FIG. 11, which is a simplified circuit diagram for a selected effective circuit in a secure keypad device in accordance with a preferred embodiment of the present invention and a signal diagram for consecutive plural different signals at consecutive different times applied to that effective circuit.

In FIG. 11, a modulated sine wave signal at 10 MHz is applied at a circuit location designated as Tx1, for a time duration of 0.5 μsec, followed by a modulated square wave signal at 10 MHz for 1 μsec.

It is clearly seen from a consideration of FIG. 11 that each different applied signal provides a correspondingly different expected received signal, which is known to the tampering sensing circuitry.

Figure 12:
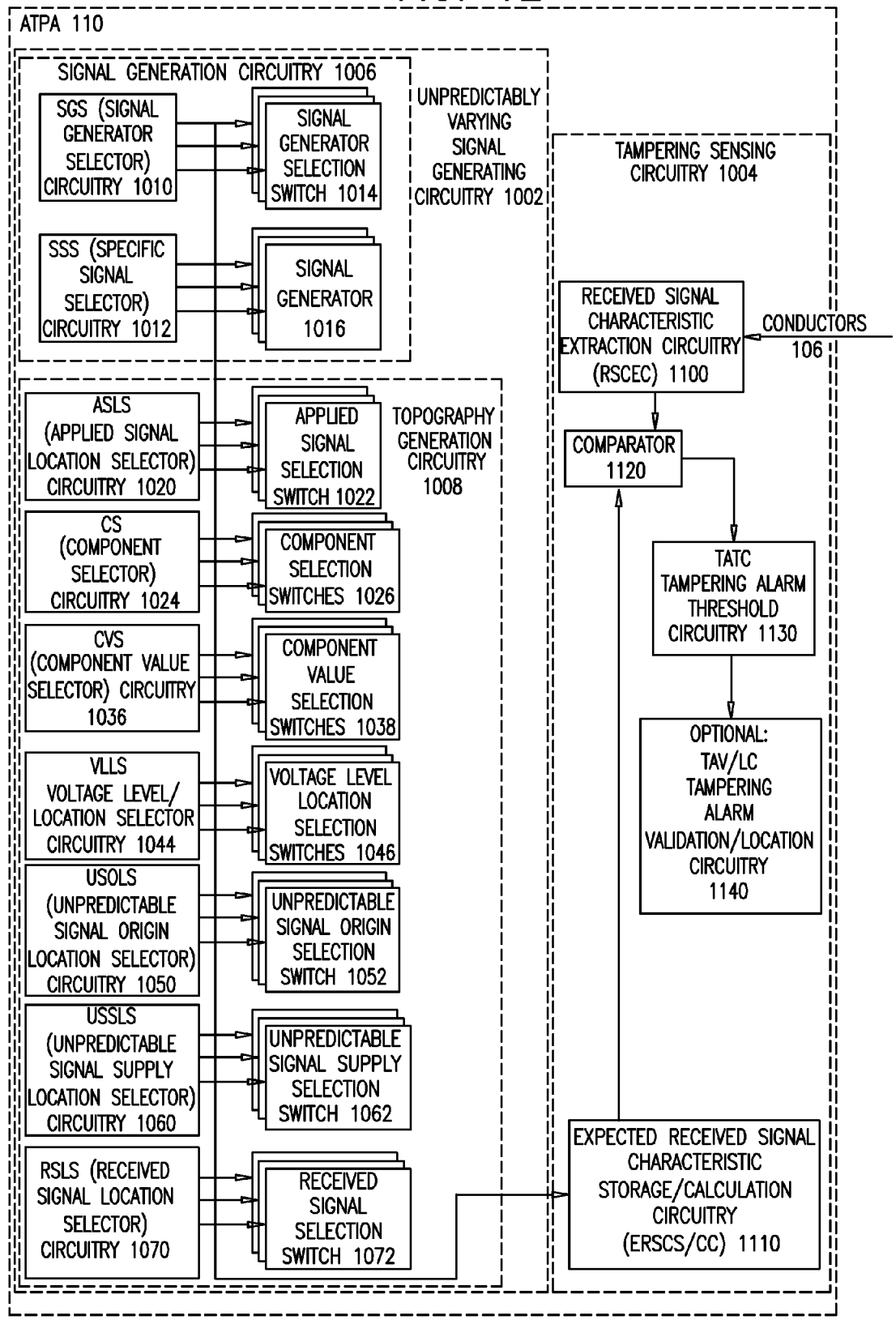
FIG. 12 is a simplified functional block diagram of an anti-tampering protection assembly (ATPA) of FIG. 1 constructed and operative in accordance with a preferred embodiment of the present invention.
Figure 13:
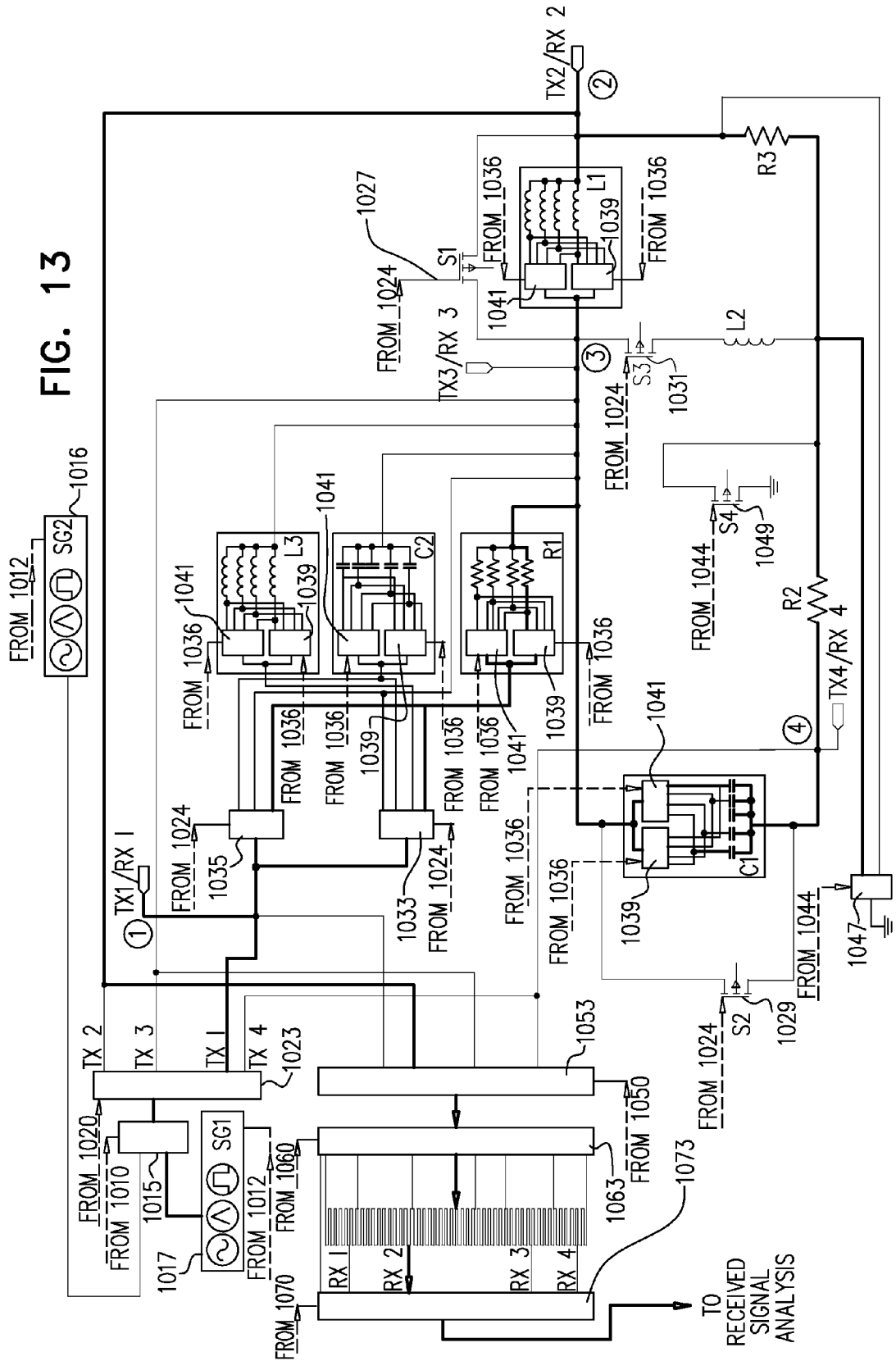
FIG. 13 is a simplified electrical circuit, associated with signal and topography selection functionalities in FIG. 12.
Figure 14:
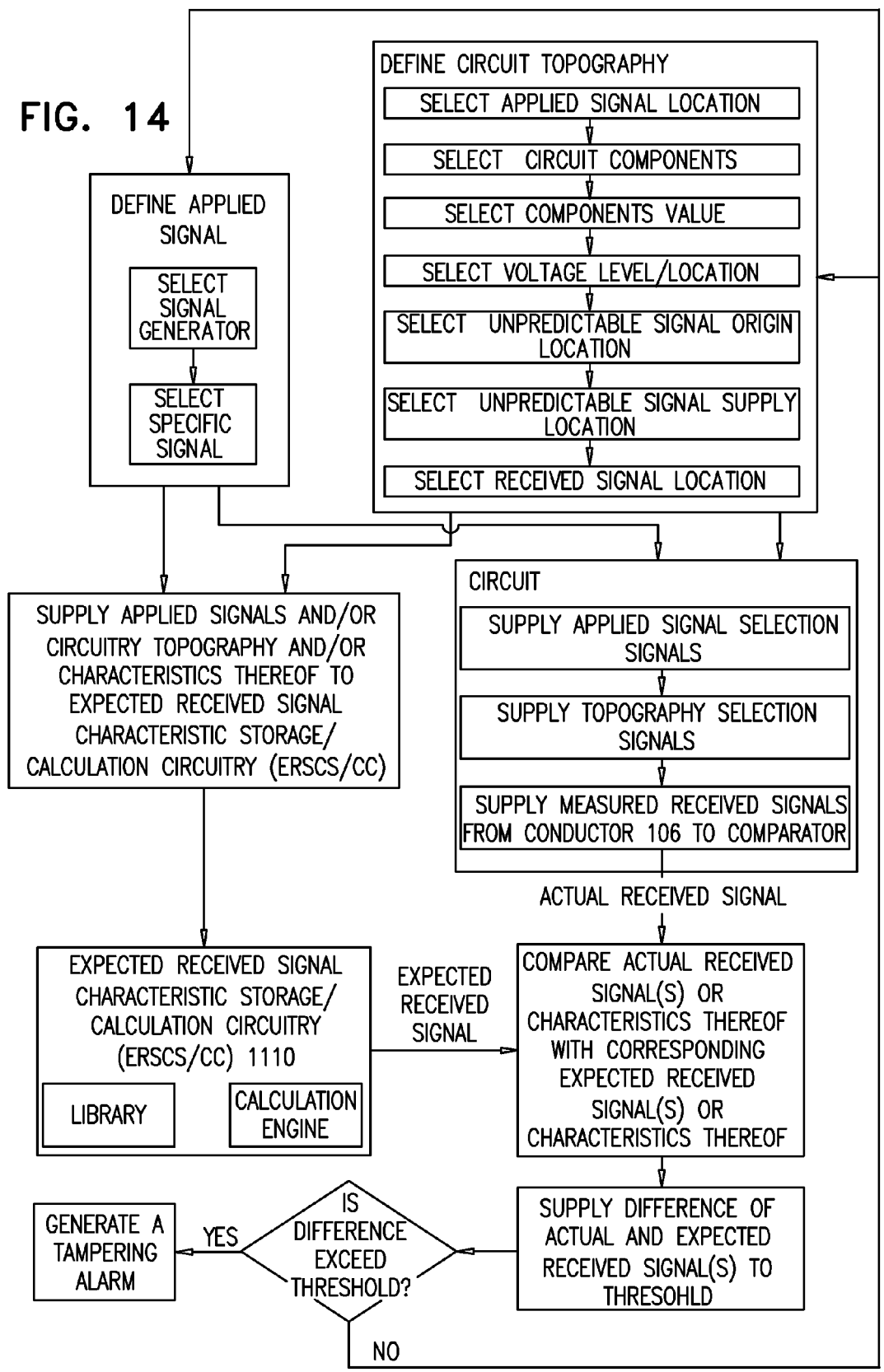
FIG. 14 is a simplified flowchart illustrating the operation of tamper ascertaining functionality including the controller functionality of FIG. 12B.

Reference is now made to FIG. 12, which is a simplified functional block diagram of an anti-tampering protection assembly (ATPA) 110 (FIG. 1) constructed and operative in accordance with a preferred embodiment of the present invention, to FIG. 13, which illustrates an example of anti-tampering protection assembly 110 and to FIG. 14, which is a simplified flowchart illustrating the operation of the anti-tampering protection assembly 110.

Turning to FIG. 12, it is seen that the anti-tampering protection assembly (ATPA) 110 (FIG. 1) includes unpredictably varying signal generating circuitry 1002, connected to conductors 106, for providing unpredictably varying signals on conductors 106 and tampering sensing circuitry 1004 for sensing tampering with conductors 106.

The unpredictably varying signal generating circuitry 1002 preferably comprises signal generation circuitry 1006 and topography generation circuitry 1008. Signal generation circuitry 1006 preferably includes signal generator selector (SGS) circuitry 1010 which selects one or more of a possible plurality of signal generators to be employed and specific signal selector (SSS) circuitry 1012, which selects the specific signal to be generated by the selected signal generator.

SGS circuitry 1010 provides a signal generator selection output to a signal generator selection switch 1014, for example, a multiplexer 1015, as seen in FIG. 13.

SSS circuitry 1012 provides a specific signal selection output to a selected signal generator 1016, for example, a signal generator 1017 (FIG. 13). The specific signal may be characterized by at least one of its signal shape, amplitude, frequency and phase.

It is appreciated that for clarity, FIG. 13 presents different designations of different types of signal paths. Data paths are designated by solid lines and control signal paths are designated by dashed lines. Specific selected data paths are designated in bold, to exemplify a specific selected effective circuit topography.

Topography generation circuitry 1008 preferably includes applied signal location selector (ASLS) circuitry 1020, which selects one or more locations at which one or more selected signals from a selected signal generator 1016 are applied. ASLS circuitry 1020 provides an applied signal location selection output to one or more applied signal selection switch 1022, for example a demultiplexer 1023 (FIG. 13).

Topography generation circuitry 1008 also preferably includes component selector (CS) circuitry 1024, which selects one or more components to be placed in circuit with the one or more applied signals. CS circuitry 1024 provides an component selection output to one or more component selection switches 1026, for example FETs 1027, 1029 and 1031 and one or more multiplexers 1033 and demultiplexers 1035 (FIG. 13).

Topography generation circuitry 1008 also preferably includes component value selector (CVS) circuitry 1036, which selects one or more component values of the selected components to be placed in circuit with the one or more applied signals. CVS circuitry 1036 provides an component value selection output to one or more component value selection switches 1038, for example one or more multiplexers 1039 and demultiplexers 1041 (FIG. 13).

Topography generation circuitry 1008 also preferably includes voltage level/location selector (VLLS) circuitry 1044, which selects one or more voltage level for one or more ground, power line, and voltage clamp in circuit with the one or more applied signals. VLLS circuitry 1044 provides an voltage level/location selection output to one or more voltage level/location selection switches 1046, for example demultiplexer 1047 and FET 1049 (FIG. 13).

Topography generation circuitry 1008 also preferably includes unpredictable signal origin location selector (USOLS) circuitry 1050, which selects one or more locations from which one or more unpredictable signals are supplied to conductors 106, such as grid elements 105 (FIG. 1). USOLS circuitry 1050 provides an unpredictable signal origin location selection output to one or more unpredictable signal origin selection switch 1052, for example a multiplexer 1053 (FIG. 13).

Topography generation circuitry 1008 also preferably includes unpredictable signal supply location selector (USOLS) circuitry 1060, which selects one or more locations at which one or more unpredictable signals are supplied, such as one or more data lines 104 or locations along grid elements 105. USSLS circuitry 1060 provides an unpredictable signal supply location selection output to one or more unpredictable signal supply selection switch 1062, for example a multiplexer 1063 (FIG. 13).

Topography generation circuitry 1008 also preferably includes received signal location selector (RSLS) circuitry 1070, which selects one or more locations at which one or more received signals are received. RSLS circuitry 1070 provides a received signal location selection output to one or more received signal selection switch 1072, for example a multiplexer 1073 (FIG. 13).

It is appreciated that although the grid elements 105 are illustrated in FIG. 13 as a single grid with multiple signal input and output locations, grid elements 105 may be embodied as multiple disparate grids located at various locations in the circuitry of FIG. 13, as seen, for example, in FIGS. 2A-2F. It is appreciated that grid elements 105 may be incorporated in one or more of protective circuits, data lines and control lines. It is further understood that grid elements 105 in the present invention may also be embodied partially or entirely in integrated circuits, on a PCB and within ATPA 110 (FIG. 1). As a further alternative, a circuit different from that shown in FIG. 13 may be provided in which the conductors 106 include one or more data lines.

The received signal preferably is supplied to tampering sensing circuitry 1004 for sensing tampering with conductors 106. Tampering sensing circuitry 1004 receives one or more received signal at a location selected by RSLS circuitry 1050 and makes a determination of whether tampering has occurred based on changes in the one or more signal.

In accordance with a preferred embodiment of the present invention, the tampering sensing circuitry 1004 includes received signal characteristic extraction circuitry (RSCEC) 1100, which preferably receives at least one received signal at at least one known location on at least one of conductors 106, expected received signal characteristic storage/calculation circuitry (ERSCS/CC) 1110, which preferably receives inputs from some or all of selector circuitry 1010, 1012, 1020, 1024, 1036, 1044, 1050, 1060 and 1070 (FIG. 12) of anti-tampering protection assembly (ATPA) 110 (FIG. 1), and a comparator 1120, which compares characteristics of the expected received signals, received from circuitry 1110 with characteristics of the actual received signals, received from circuitry 1100 and provides a tamper indication output.

The expected received signal characteristic calculation circuitry (ERSCS/CC) 1110 may comprise a library, typically embodied in a database, which stores characteristics of the expected received signals in one or more known ways, for example, Frequency, Amplitude and Phase; Fourier Analysis; Bode Analysis and Digitization. The expected received signals stored in the library may be received signals actually received from an effective circuit or may be calculated. The contents of the library may be loaded at the factory based on empirical data or calculated data. The empirical data or calculated data may be individual device specific or derived from multiple devices.

Alternatively or additionally, on-the-fly expected received signal calculation functionality, such as, for example Simulation Program with Integrated Circuit Emphasis (SPICE) functionality, may be provided as part of expected received signal characteristic calculation circuitry (ERSCS/CC) 1110. In such a case, the library may be, but need not necessarily be, obviated. The on-the fly expected received signal calculation functionality may provide expected received signal outputs in one or more known forms, such as analog, digital or by way of signal characteristics, such as amplitude attenuation and phase shift; Fourier Analysis; Bode Analysis and digital approximation.

It is appreciated that the ERSCS/CC may either first calculate the expected received signal and then extract the signal characteristics thereof, such as amplitude attenuation and phase shift; Fourier Analysis; Bode Analysis and digitization, or, alternatively, may directly calculate the signal characteristics without first calculating the expected received signal.

Comparator 1120 compares the actual received signal from one or more given locations from conductors 106 to the expected received signal from the same one or more given locations and provides a difference output. The difference output is supplied to tampering alarm threshold circuitry (TATC) 1130, which enables the threshold circuitry to select a threshold which is appropriate to the effective circuit and signal characteristics.

If the difference output of comparator 1120 exceeds the threshold applied by Tampering Alarm Threshold Circuitry 1130 a preliminary tampering alarm is generated. In response to the preliminary tampering alarm, a tampering alarm validation function may be carried out by optional Tampering Alarm Validation/Location Circuitry (TAV/LC) 1140. If a tampering alarm situation is found to exist, the secure key pad device may be disabled, its sensitive contents erased, data entry prompts may be disabled, and local or remote audio or visual alarms may be provided.

It is further appreciated that the comparator 1120 need not compare actual and expected received signals but may only compare certain discrete characteristics thereof, such as amplitude attenuation and phase shift; Fourier Analysis and Bode Analysis and digital approximation.

It is appreciated that the foregoing description has been presented in various realizations. For example, FIGS. 2A-2F, 9A & 9B, 10A & 10B and 11 relate to specific, typically hard wired circuits, including discrete components. FIG. 13 illustrates a more general realization typically employing analog multiplexers and demultiplexers. It is understood that the present invention may also be embodied partially or entirely in integrated circuits which may provide full or partial emulation of hard wired circuits, such as the circuits of FIGS. 2A-2F and FIG. 13.

It is appreciated that the unpredictably varying generating circuitry may vary at least one of at least one applied signal and the circuit topography at various times, such as when the key entry device is switched on, during idle mode and during operation.

It is appreciated that at least some and preferably all of the selection functions carried out by unpredictably varying signal generating circuitry 1002 are unpredictable to an extent that in practice the signal or signals generated thereby vary in an unpredictable manner from the standpoint of a potential hacker. It is further appreciated that the circuitry 1002 may include multiple replications of the circuitry shown in FIGS. 12 and 13 in whole or in part, with or without changes thereto, in order to enhance its unpredictability.

Reference is now made to FIG. 14, which is a simplified flowchart illustrating the operation of the functionality of FIG. 12 and FIG. 13 forming part of ATPA 110 (FIG. 1).

As seen in FIG. 14, ATPA 110 (FIG. 1) preferably selects a specific signal to be generated by a selected signal generator, for example by selecting the state of multiplexer 1015 and selection of signal generator 1017 (FIG. 13). This selection is preferably made by SGS (signal generator selector) circuitry 1010 and SSS (specific signal selector) circuitry 1012 (FIG. 12).

As also seen in FIG. 14, the ATPA 110 (FIG. 1) preferably selects the static or time-varying effective circuit topography of the circuit, such as circuitry shown in FIG. 13, by selecting the one or more applied signal locations, such as locations 1, 2, 3 and 4, at which applied signals are to be applied, such as by selecting the state of demultiplexer 1023 (FIG. 13). This latter selection is preferably effected by ASLS (applied signal location selector) circuitry 1020 (FIG. 12).

ATPA 110 preferably also selects the components to be included in the circuitry, such as the circuitry shown in FIG. 13, by selecting the open/closed states of switches 1026, for example FETs 1027, 1029 and 1031 and one or more multiplexers 1033 and demultiplexers 1035 (FIG. 13). This selection is preferably effected by CS (component selector) circuitry 1024 (FIG. 12).

ATPA 110 preferably further selects one or more component values of the selected components to be placed in circuit, for example by selecting the state of one or more multiplexers 1039 and demultiplexers 1041 in the circuit of FIG. 13. This selection is preferably effected by CVS (component value selector) circuitry 1036 (FIG. 12).

ATPA 110 still further preferably selects one or more voltage level for one or more ground, power line, and voltage clamp in circuit with the one or more applied signals, for example by selecting the state of demultiplexer 1047 and FET 1049 in the circuitry of FIG. 13. This selection is preferably effected by VLLS (voltage level/location selector) circuitry 1044 (FIG. 12).

ATPA 110 preferably also selects one or more location where one or more unpredictable signals are supplied to conductors 106, such as grid elements 105 (FIG. 1), for example by selecting the state of multiplexer 1053 in the circuitry of FIG. 13. This selection is preferably effected by USOLS (unpredictable signal origin location selector) circuitry 1050 (FIG. 12).

ATPA 110 additionally preferably selects one or more location where one or more unpredictable signals are supplied, such as one or more data lines or locations along grid elements 105, for example by selecting the state of multiplexer 1063 in the circuitry of FIG. 13. This selection is preferably effected by USSLS (unpredictable signal supply location selector) circuitry 1060 (FIG. 12).

ATPA 110 further preferably also selects one or more locations at which one or more received signals are received, for example by selecting the state of multiplexer 1073 in the circuitry of FIG. 13. This selection is preferably effected by RSLS (received signal location selector) circuitry 1070 (FIG. 12).

It is appreciated that one or more of the above selections may be obviated.

The selected one or more applied signals are applied to the circuit at the selected one or more applied signal locations and the actual received signals are received from the conductors 106 at the selected one or more received signal locations.

The selections from SGS 1010, SSS 1012, ASLS 1020, CS 1024, CVS 1036, VLLS 1044, USOLS 1050, USSLS 1060 and RSLS 1070, and/or characteristics thereof, are supplied to the expected received signal characteristic storage/calculation circuitry (ERSCS/CC) 1110 (FIG. 12). If a library function of ERSCS/CC 1110 is employed, the inputs from selection circuitry 1010, 1012, 1020, 1024, 1036, 1044, 1050, 1060 and 1070 may be used to retrieve a corresponding stored expected received signal. If a calculation function of ERSCCC 1110, such as that based, for example, on SPICE functionality, is employed, the inputs from selection circuitry 1010, 1012, 1020, 1024, 1036, 1044, 1050, 1060 and 1070 may be used to calculate a corresponding stored expected received signal.

The one or more actual received signals and/or characteristics thereof are compared with the corresponding one or more retrieved and/or calculated expected received signals and/or characteristics thereof by comparator 1120. The difference output of the comparator is applied to a threshold which may be a variable threshold, determined by tampering alarm threshold circuitry 1130 based on inputs from selection circuitry 1010, 1012, 1020, 1024, 1036, 1044, 1050, 1060 and 1070.

If exceedance of an applicable threshold occurs, a provisional or definitive tampering alarm may be generated and optionally a validation function is carried out. A preferred validation function is to apply one or more additional applied signals, to receive actual received signals responsive thereto and to compare them with the corresponding expected received signals as described above.

Reference is now made to FIGS. 15A and 15B, which show Bode plots and corresponding circuit diagrams for an exemplary effective circuit in respective non-tampered and tampered states. In the illustrated exemplary effective circuit, tampering shorts out inductor L2.

It is appreciated by persons skilled in the art that the present invention is not limited by what has been particularly shown and described hereinabove. Rather the scope of the present invention includes both combinations and subcombinations of various features described hereinabove as well as variations and modifications thereto which would occur to a person of skill in the art upon reading the above description and which are not in the prior art.

The invention claimed is:

1. An anti-tampering protection assembly for sensing tampering with at least one conductor, said anti-tampering protection assembly comprising:
   unpredictably varying signal generating circuitry, connected to said at least one conductor, for providing unpredictably varying signals, which are unpredictable in the sense that a potential tamperer could not ascertain what they are in sufficient time to enable him to emulate them, on said at least one conductor; and
   tampering sensing circuitry for sensing tampering with said at least one conductor,
   said unpredictably varying signal generating circuitry comprising:
      signal generating circuitry; and
      topography generation circuitry operative to vary the configuration of an effective circuit through which said signals pass, such that the Bode plot characteristics of said signals vary unpredictably, said topography generation circuitry including at least one of:
      applied signal location selector (ASLS) circuitry, which selects one or more locations at which one or more selected signals from a selected signal generator are applied;
      component selector (CS) circuitry, which selects one or more components to be placed in circuit with said one or more selected signals;
      component value selector (CVS) circuitry, which selects one or more component values of the selected components to be placed in circuit with said one or more selected signals;
      voltage level/location selector (VLLS) circuitry, which selects one or more voltage level for one or more ground, power line, and voltage clamp in circuit with said one or more selected signals;
      unpredictable signal origin location selector (USOLS) circuitry, which selects one or more locations from which one or more unpredictable signals are supplied to conductors;
      unpredictable signal supply location selector (USSLS) circuitry, which selects one or more locations at which one or more unpredictable signals are supplied; and
      received signal location selector (RSLS) circuitry, which selects one or more locations at which one or more received signals are received.

2. The anti-tampering protection assembly according to claim 1 and wherein said unpredictably varying signal generating circuitry applies said unpredictably varying signals at various locations along said at least one conductor.

3. The anti-tampering protection assembly according to claim 1 and wherein said unpredictably varying signals include analog signals.

4. The anti-tampering protection assembly according to claim 1 and wherein said tampering sensing circuitry senses tampering with said at least one conductor by sensing changes in said unpredictably varying signals resulting from said tampering.

5. The anti-tampering protection assembly according to claim 1 and wherein said unpredictably varying signal generating circuitry operates by at least one of changing the topology of said unpredictably varying signal generating circuitry and changing at least one applied signal applied thereto.

6. The anti-tampering protection assembly according to claim 5 and wherein said unpredictably varying signal generating circuitry includes circuitry wherein at least one of the following is supplied to said tampering sensing circuitry:
   circuit components;
   circuit component values;
   ground connections;
   locations at which said at least one applied signal is applied;
   locations from which an unpredictable signal is supplied to said at least one conductor;
   locations at which an unpredictable signal is supplied to said at least one conductor; and
   locations from which at least one received signal is received.

7. The anti-tampering protection assembly according to claim 1 and wherein said unpredictably varying signal generating circuitry comprises signal generation circuitry having unpredictable input signal generation functionality.

8. The anti-tampering protection assembly according to claim 7 and wherein said signal generation circuitry includes circuitry wherein selection of at least one of a signal generator and at least one specific signal to be generated are unpredictably variable.

9. The anti-tampering protection assembly according to claim 7 and wherein:
   said signal generation circuitry includes circuitry wherein selection of at least one specific signal to be generated is unpredictably variable; and
   at least one of signal shape, amplitude, frequency and phase of said at least one specific signal is variable.

10. The anti-tampering protection assembly according to claim 9 and wherein said at least one specific signal comprises at least a first signal and a second signal, wherein said first signal is different from said second signal and wherein said first signal is applied at a first location and said second signal is applied at a second location.

11. The anti-tampering protection assembly according to claim 9 and wherein said at least one specific signal comprises consecutive plural different signals at consecutive different times.

12. The anti-tampering protection assembly according to claim 1 and wherein said at least one conductor comprises multiple disparate grids located at various locations in said unpredictably varying signal generating circuitry.

13. The anti-tampering protection assembly according to claim 1 and wherein said at least one conductor comprises a multiplicity of closely spaced conductors.

14. The anti-tampering protection assembly according to claim 1 and wherein at least part of said at least one conductor forms part of at least one of a protective circuit, data line and control line.

15. The anti-tampering protection assembly according to claim 1 and wherein at least part of said at least one conductor forms part of at least one of an integrated circuit and a printed circuit board.

16. The anti-tampering protection assembly according to claim 1 and wherein said tampering sensing circuitry comprises a library of stored expected received signals.

17. The anti-tampering protection assembly according to claim 1 and wherein said tampering sensing circuitry comprises calculation functionality for calculating expected received signals.

18. The anti-tampering protection assembly according to claim 17 and wherein said calculation functionality employs Simulation Program with Integrated Circuit Emphasis (SPICE) functionality.

19. The anti-tampering protection assembly according to claim 1 and wherein said tampering sensing circuitry includes a comparator which ascertains a difference between an expected received signal and an actual received signal.

20. The anti-tampering protection assembly according to claim 19 and wherein said difference is applied to a threshold which represents a difference which is indicative of tampering.

21. The anti-tampering protection assembly according to claim 20 and wherein said assembly is operative in response to exceedance of said threshold to generate a tampering alarm.

22. The anti-tampering protection assembly according to claim 1 and wherein said at least one conductor is physically arranged to at least partially surround an object to be protected and to impede physical access thereto.

23. The anti-tampering protection assembly according to claim 1 and wherein said at least one conductor is connected to said tampering sensing circuitry.

24. The anti-tampering protection assembly according to claim 1 and wherein said at least one conductor is arranged on a protective enclosure in which or on which are located at least one of security-sensitive components storing sensitive data and data lines carrying security-sensitive information.

25. The anti-tampering protection assembly according to claim 1 and wherein said unpredictably varying signal generating circuitry is embodied in circuitry which includes discrete active components.

26. The anti-tampering protection assembly according to claim 1 and wherein said unpredictably varying signal generating circuitry is embodied in circuitry which includes discrete passive components.

27. The anti-tampering protection assembly according to claim 1 and wherein said unpredictably varying signal generating circuitry is embodied in circuitry which includes analog components.

28. The anti-tampering protection assembly according to claim 1 and wherein said unpredictably varying signal generating circuitry is embodied in circuitry which includes digital components.

29. The anti-tampering protection assembly according to claim 1 and wherein said unpredictably varying signal generating circuitry is embodied in a secure keypad device.

30. The anti-tampering protection assembly according to claim 29 and wherein at least part of said unpredictably varying signal generating circuitry is embodied in circuitry which is incorporated in a controller which controls the operation of said secure keypad device.

31. The anti-tampering protection assembly according to claim 1 and wherein said topography generation circuitry includes at least two of said ASLS circuitry, said CS circuitry, said CVS circuitry, said VLLS circuitry, said USOLS circuitry, said USSLS circuitry and said RSLS circuitry.

32. The anti-tampering protection assembly according to claim 1 and wherein said topography generation circuitry includes at least three of said ASLS circuitry, said CS circuitry, said CVS circuitry, said VLLS circuitry, said USOLS circuitry, said USSLS circuitry and said RSLS circuitry.

33. The anti-tampering protection assembly according to claim 1 and wherein said topography generation circuitry includes at least four of said ASLS circuitry, said CS circuitry, said CVS circuitry, said VLLS circuitry, said USOLS circuitry, said USSLS circuitry and said RSLS circuitry.

34. The anti-tampering protection assembly according to claim 1 and wherein said topography generation circuitry includes at least five of said ASLS circuitry, said CS circuitry, said CVS circuitry, said VLLS circuitry, said USOLS circuitry, said USSLS circuitry and said RSLS circuitry.

35. The anti-tampering protection assembly according to claim 1 and wherein said topography generation circuitry includes at least six of said ASLS circuitry, said CS circuitry, said CVS circuitry, said VLLS circuitry, said USOLS circuitry, said USSLS circuitry and said RSLS circuitry.

36. The anti-tampering protection assembly according to claim 1 and wherein said topography generation circuitry includes said ASLS circuitry, said CS circuitry, said CVS circuitry, said VLLS circuitry, said USOLS circuitry, said USSLS circuitry and said RSLS circuitry.

37. The anti-tampering protection assembly according to claim 1 and wherein:
   said topography generation circuitry includes said ASLS circuitry; and
   said ASLS circuitry provides an applied signal location selection output to at least one applied signal selection switch.

38. The anti-tampering protection assembly according to claim 37 and wherein said at least one applied signal selection switch includes a demultiplexer.

39. The anti-tampering protection assembly according to claim 1 and wherein:
   said topography generation circuitry includes said CS circuitry; and
   said CS circuitry provides a component selection output to at least one component selection switch.

40. The anti-tampering protection assembly according to claim 39 and wherein said at least one component selection switch includes at least one of a Field-Effect Transistors (FETs), a multiplexer and a demultiplexer.

41. The anti-tampering protection assembly according to claim 1 and wherein:
   said topography generation circuitry includes said CVS circuitry; and
   said CVS circuitry provides a component value selection output to at least one component value selection switch.

42. The anti-tampering protection assembly according to claim 41 and wherein said at least one component value selection switch includes at least one of a multiplexer and a demultiplexer.

43. The anti-tampering protection assembly according to claim 1 and wherein:
   said topography generation circuitry includes said VLLS circuitry; and
   said CVS circuitry provides a voltage level/location selection output to at least one voltage level/location selection switch.

44. The anti-tampering protection assembly according to claim 43 and wherein said at least one voltage level/location selection switch includes at least one of an FET and a demultiplexer.

45. The anti-tampering protection assembly according to claim 1 and wherein:
   said topography generation circuitry includes said USOLS circuitry; and
   said one or more locations include one or more grid elements.

46. The anti-tampering protection assembly according to claim 1 and wherein:
   said topography generation circuitry includes said USOLS circuitry; and said USOLS circuitry provides an unpredictable signal origin location selection output to at least one unpredictable signal origin selection switch.

47. The anti-tampering protection assembly according to claim 46 and wherein said at least one unpredictable signal origin selection switch includes a multiplexer.

48. The anti-tampering protection assembly according to claim 1 and wherein:
said topography generation circuitry includes said USSLS circuitry; and
said one or more locations include at least one of one or more data lines and one or more grid elements.

49. The anti-tampering protection assembly according to claim 1 and wherein:
said topography generation circuitry includes said USSLS circuitry; and
said USSLS circuitry provides an unpredictable signal supply location selection output to at least one unpredictable signal supply selection switch.

50. The anti-tampering protection assembly according to claim 49 and wherein said at least one unpredictable signal supply selection switch includes a multiplexer.

51. The anti-tampering protection assembly according to claim 1 and wherein:
said topography generation circuitry includes said RSLS circuitry; and
said RSLS circuitry provides a received signal location selection output to at least one received signal selection switch.

52. The anti-tampering protection assembly according to claim 51 and wherein said at least one received signal selection switch includes a multiplexer.

\* \* \* \* \*